United States Patent
Ge et al.

(10) Patent No.: US 11,361,223 B2
(45) Date of Patent: Jun. 14, 2022

(54) HYBRID MESSAGE-PASSING-ALGORITHM-BASED DEEP LEARNING NEURAL NETWORK FOR A MASSIVE BEAM-FORMING SYSTEM

(71) Applicants: Yiqun Ge, Kanata (CA); Wuxian Shi, Kanata (CA); Wen Tong, Ottawa (CA)

(72) Inventors: Yiqun Ge, Kanata (CA); Wuxian Shi, Kanata (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 41 days.

(21) Appl. No.: 16/937,863

(22) Filed: Jul. 24, 2020

(65) Prior Publication Data

US 2022/0036171 A1 Feb. 3, 2022

(51) Int. Cl.
*G06N 3/08* (2006.01)
*H04B 7/06* (2006.01)

(52) U.S. Cl.
CPC .............. *G06N 3/08* (2013.01); *H04B 7/0617* (2013.01)

(58) Field of Classification Search
CPC ................................ G06N 3/08; H04B 7/0617
USPC ....................................................... 375/267
See application file for complete search history.

(56) References Cited

U.S. PATENT DOCUMENTS

| 10,425,878 | B2 | 9/2019 | Cezanne et al. |
| 2008/0051150 | A1 | 2/2008 | Tsutsui |
| 2017/0279500 | A1 | 9/2017 | Zhao et al. |
| 2021/0119713 | A1* | 4/2021 | O'Shea ................ H04B 17/373 |
| 2021/0266875 | A1* | 8/2021 | Namgoong ......... H04W 64/003 |

FOREIGN PATENT DOCUMENTS

WO   2019100220 A1   5/2019

* cited by examiner

*Primary Examiner* — Juan A Torres

(57) ABSTRACT

A multi-beam transmission method is provided for transmitting using an N-beam transmitter to a receiver having K receive beams. In the transmitter, a non-linear encoder implemented by a machine learning block, and a linear encoder are trained using gradient descent back propagation that relies on feedback from the receiver. For each input to be transmitted the machine learning block is used to process the input to produce N/K sets of L outputs. The linear encoder is used to perform linear encoding on each set of L outputs to produce a respective set of K outputs so as to produce N/K sets of K encoded outputs overall and N encoded outputs overall. One of the N/K sets of K outputs from each set of K beams. In order to allow a generalization to different SNRs, and to allow for time varying channel conditions, the non-linear layers, implemented in the non-linear encoder, are responsible for extracting features and regenerating the features, while the linear layers implemented in the linear encoder, are responsible for more generalization.

21 Claims, 55 Drawing Sheets

HYBRID MESSAGE-PASSING-ALGORITHM-BASED DEEP LEARNING NEURAL NETWORK FOR A MASSIVE BEAM-FORMING SYSTEM

FIELD

The application relates to machine learning, and more particularly machine learning applied to beam-forming systems.

BACKGROUND

Deep Learning for Wireless Systems

Deep learning is a subset of machine learning where there are more than two layers of non-linear neurons between inputs and outputs. Deep learning is a branch of artificial intelligence which has seen significant advances in terms of its application to very complex problems.

There are several fundamental problems when deep learning techniques are applied to wireless systems. A first problem is the inability to generalize over different signal-to-noise ratios (SNRs). A deep neural network is heavily related to the statistical properties (e.g. expectation and variance and so on) of the information data, that is, the signal, and random hostilities in wireless system. Once the SNR changes, the neurons of the deep neural network need to be tuned to adapt to the different noise, often leading to a complete re-training. In practice, because the radio channel including signal-to-noise ratio and signal-to-interference ratio is varying and hard to estimate reliably, it is impractical to use a deep learning neural network to process the time-variant signal.

Wireless mmWAVE Communication 5G proposes to use millimeter wave (mmWAVE) communication to provide over Gbps-level throughput. Strictly speaking, 5G mmWAVE communications may use cm or mm wavelengths.

A typical mmWAVE or high-frequency communication has different channel conditions and landscapes from those below 6 GHz. A path loss at mmWAVE bands is far more severe than those below 6 GHz. To address this, a technique called beam-forming was adopted by 5G systems to "concentrate" signal energy by a number of transmission antennas onto one spot or area (in cm or in mm order) so as to yield a sufficiently high SNR signal within the targeted spot or area. In wireless terms, the signal intensity should meet the receiver's sensitivity level.

However, the higher the frequencies of a band used by a wireless system, the greater the path loss a radio beam is subjected to. Future wireless systems might possibly adopt bands over 100 GHz in frequency. The receiving sensitivity of a future radio beam would be significantly constrained by path loss over the air. To compensate for the path loss, one option is to increase the transmission power over a radio beam. On one hand, the use of a higher frequency band results in shorter wavelength, and a smaller antenna size; and on other hand, a greater path loss due to the higher frequency band would increase the signal receiving sensitivity level over each radio beam.

To address these issues, a beams-on-chip system may be used which accommodates many (e.g. thousands) of radio beams simultaneously on one chip die area. When artificial intelligence is used to perform beamforming in such systems, retraining is generally necessary when the receiver moves. It may be that retraining cannot be performed quickly enough to keep up with the changing channels, in particular where there are a large number of beams. In addition, the signaling overhead associated with training is very large.

SUMMARY

To achieve generalization to different signal to noise ratios, some linear layers are inserted into an auto-encoder framework. These linear layers strengthen the generalization for different signal-to-noise ratios. In the provided deep learning architecture, the non-linear encoding layers $f(\cdot)$ behave as a feature extractor that extracts N/K different features from one image or a symbol or sample of a distribution. The linear layers are N/K phase (w)/bias (b)/power(c) linear encoders. The N/K features can be regarded as the different N/K perspectives or observations of a symbol, and the linear layers would encode them in parallel. N radio signals would naturally summate N/K different coded features up over the air, which forms a K-rank composer. The non-linear decoding layers $g(\cdot)$ is a full-connective synthesizer that regenerates the symbols from the K-dimensional signal following distortion and the addition of noise.

In order to allow a generalization to different SNRs, and to allow for time varying channel conditions, the non-linear layers are responsible for extracting features and regenerating the features, while the linear layers are responsible for more generalization. The non-linear layers on their own may have a low-degree tolerance to time varying channel uncertainties such as SNR and attenuations that would normally require a complete retraining of the non-linear layers with change in such conditions. The inclusion of the linear layers has the effect, upon the system as a whole, of introducing additional tolerance (more generalization); the linear layers can be easily adjusted when there is a change in channel uncertainties such as SNR or attenuation, without requiring a retraining of the linear layers.

In some embodiments, the non-linear layers are implemented using machine learning. More specifically, in some embodiments a deep neural network is used for the non-linear layers. The overall solution may approach an optimal solution. In some embodiments, the system is receiver-transparent.

In some embodiments, a message-passing algorithm (MPA) or belief propagation algorithm is applied before each transmission to tune the power control factors.

For varying channel attenuation: In some embodiments, an additional power control layer is added to allow factoring in of varying channel attenuation. During an initial training, a tandem training is performed that includes both back-propagation for of the layers including the nonlinear layers and the linear encoding layers ($<f(\ )g(\ )w,b>$) and a message passing algorithm for power control $<c>$. In order to apply MPA, a virtual user concept is introduced. Useful information about the symbol is directed to "true" user; whereas the useless information is directed to "virtual" user. During the inference (transmission), before each symbol transmission, MPA at the transmitter runs to tune $<c>$ based on the current input symbol and current channel attenuations, but other encoding layers ($<f(\ )g(\ )w,b>$) remain. During training, the attenuations are sampled from a distribution. During actual transmission, the estimated channel coefficients with some uncertainties are used to update the distribution.

To address channel mismatch and uncertainty, in both initial training and MPA of inference, the attenuation $<h>$ is inserted into the deep neural network, and $<h>$ are samples from the distributions. The non-linear decoding layers $g(\cdot)$ have a power to learn these <h>. In reality, if a true attenuation drops in the distribution or even outside the distribution a little bit, the g( ) can still handle this situation. In some case, no pilots are needed, or alternatively, fewer pilots are needed than would otherwise be required.

In some embodiments, the provided approaches are applied to implement a massive-beam-system.

In some embodiments, the provided systems and methods are further adapted to provide a coding gain and incremental redundancy-hybrid automatic repeat request (IR-HARQ). It is well known that there is no coding gain but there is power gain to encode one symbol with a coding rate in coding theory. The coding rate would bring about only power gain in an additive white Gaussian noise (AWGN) channel and may result in some MRC gain in a selective channel. A system and method are provided to realize a codec to encode one symbol with a given coding rate to achieve coding gain.

Selective attenuation is a hostile. The provided codec can learn the large-scale attenuation and tolerate the small-scale random attenuation by a built-in logic so that no or less pilots are needed.

Incremental-Redundancy has been valid with linear system. A system and method are provided for including IR coding gain through the use of IR transmission with the provided codec.

BRIEF DESCRIPTION OF THE DRAWINGS

Embodiments of the disclosure will now be described with reference to the attached drawings in which.

DETAILED DESCRIPTION

Figure 1:
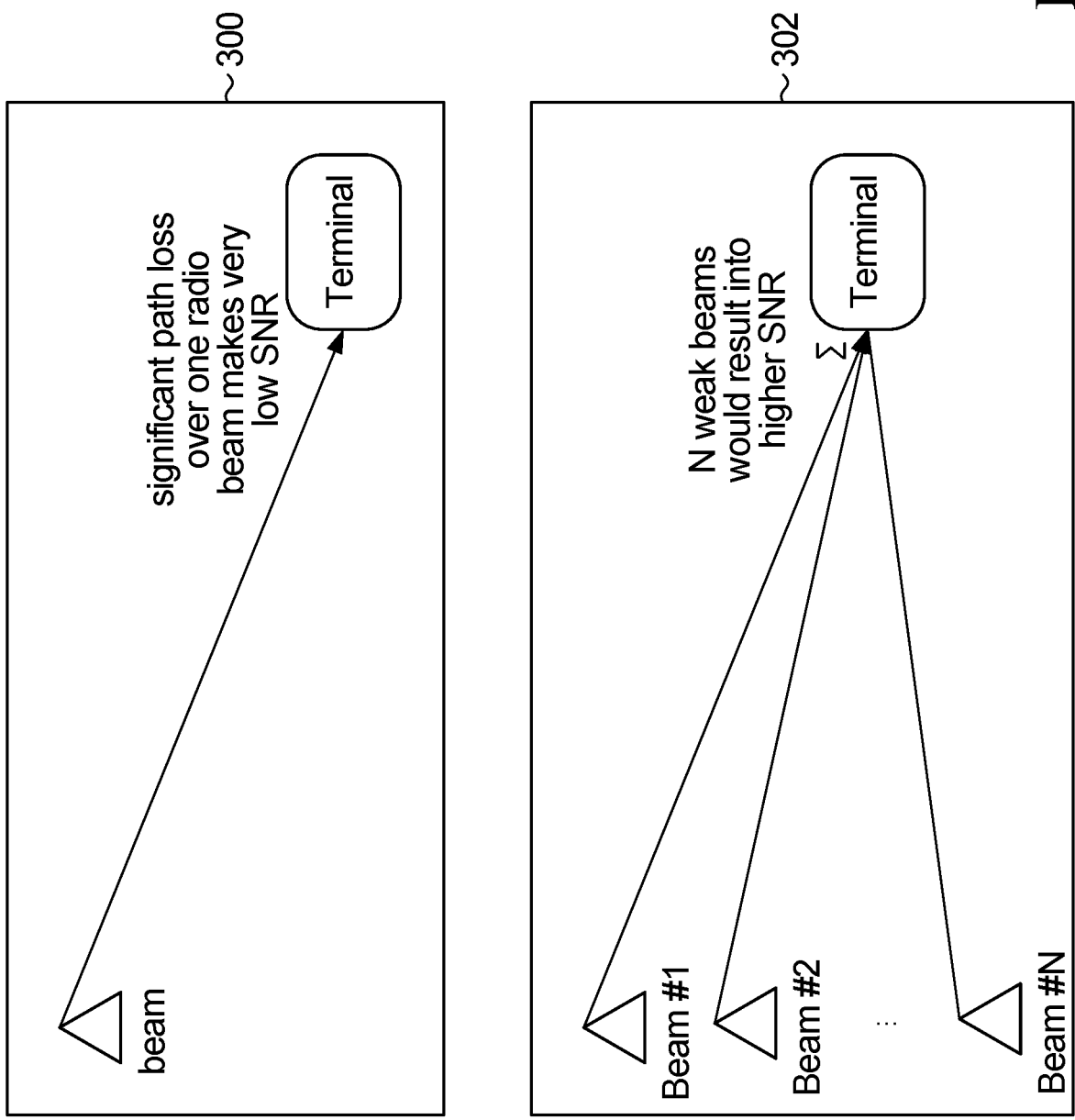
FIG. 1 is a block diagram depicting a Large Number of Beams compensating for significant path loss on mmWAVE bands.
Figure 2A:
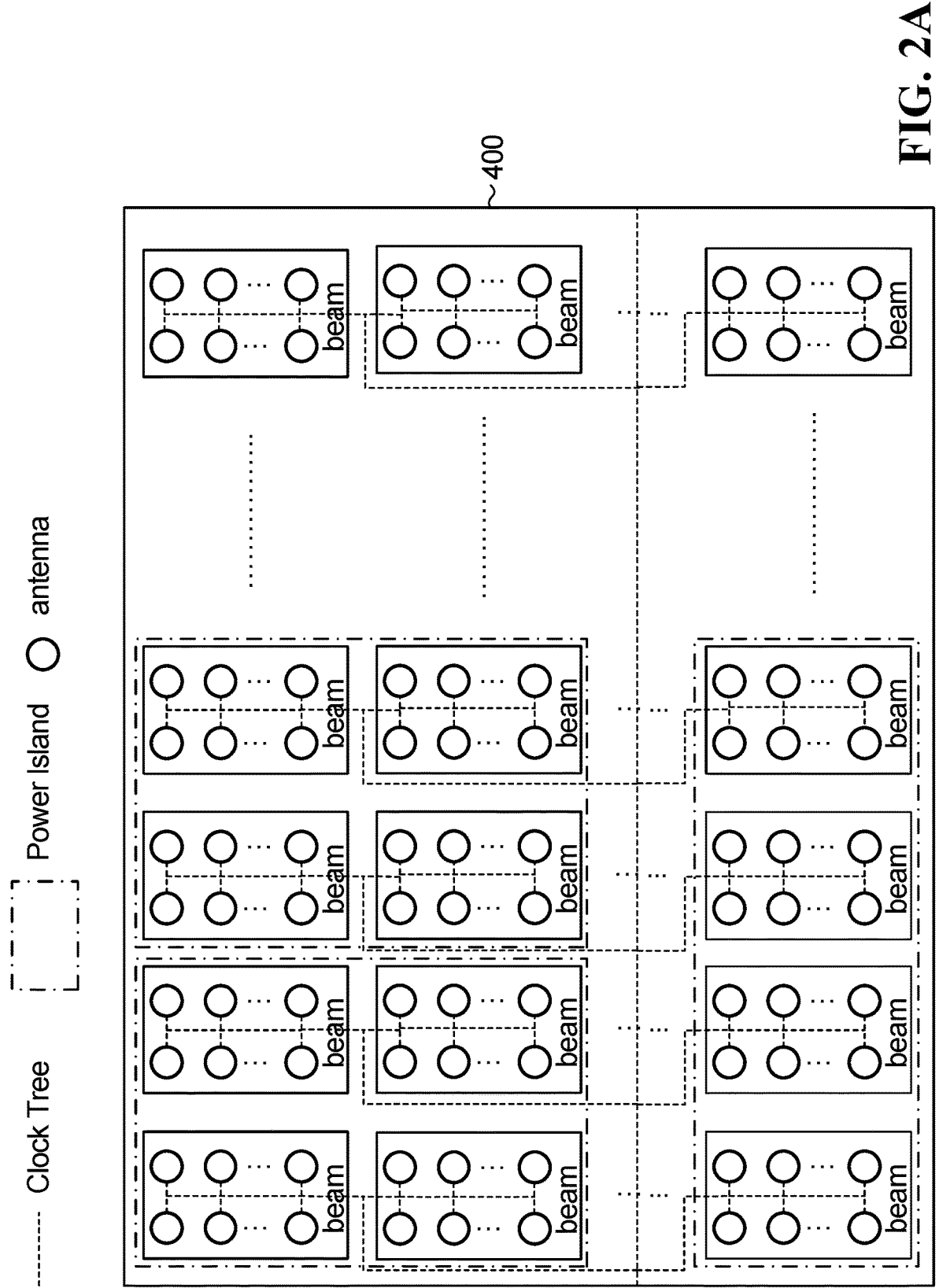
FIG. 2A is a block diagram illustrating configurations of Beams-on-Chip.
Figure 2B:
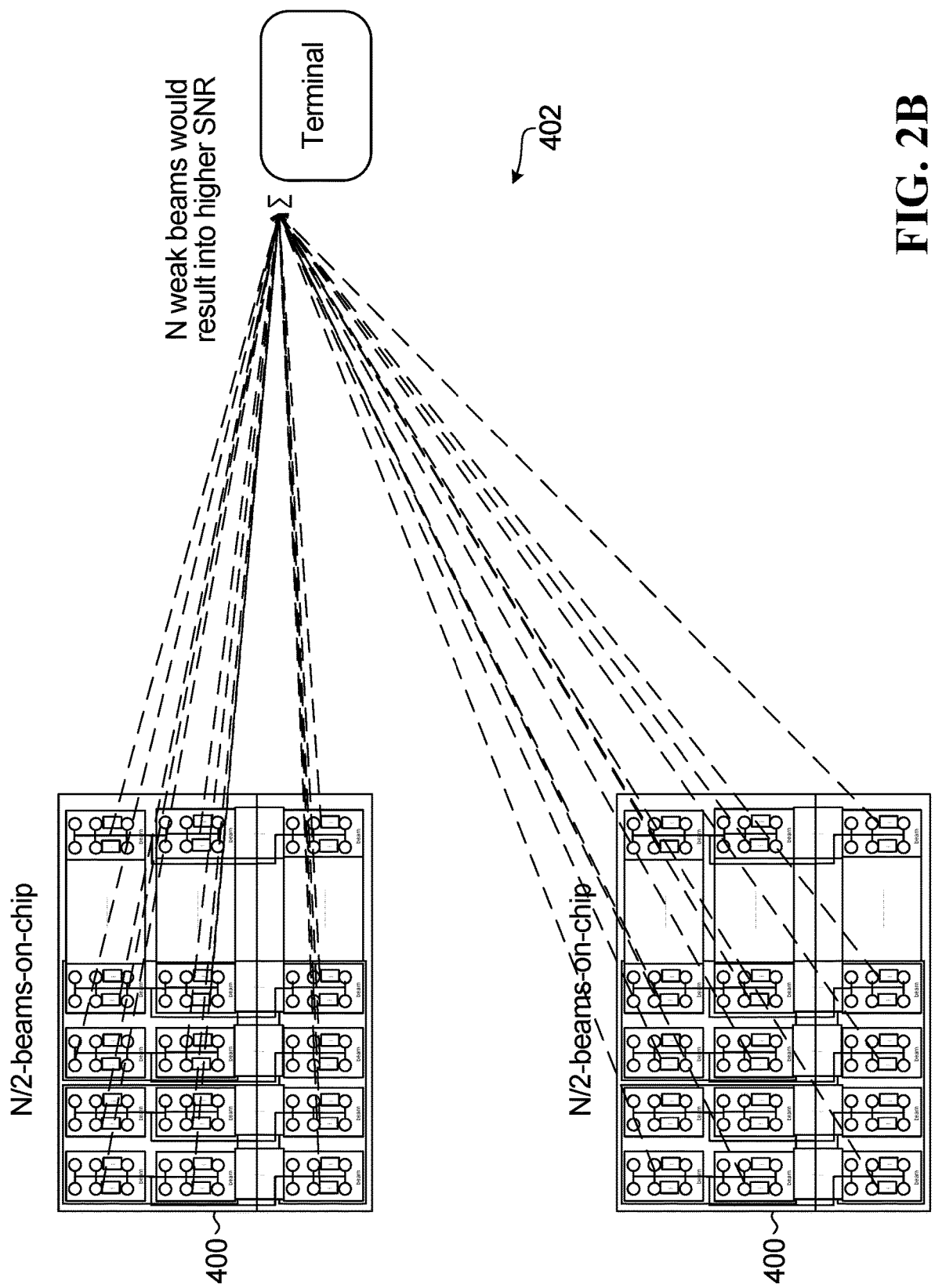
FIG. 2B is a block diagram illustrating configurations of Joint 2 Beams-on-Chip for delivery of a Good Quality Signal.

The applicability of a system that uses a very large number of antennas is based on the Law of Large Numbers (LLN): even if one attenuated beam is quite weak, hundreds or thousands of them could accumulate up to a strong enough signal energy to reach the receiver's sensitivity level. An example is illustrated in FIG. 1. In a first example 300, when there is a single beam from an antenna to a terminal, a significant path loss over the single radio beam results in a very low SNR at the terminal. In a first example 302, when there is a large number N of beams from an antenna array to a terminal, even if many of the beams are weak due to path loss, they may accumulate to result in an acceptable SNR at the terminal. FIG. 2A shows an example of multiple beams-on-chip, generally indicated at 400. FIG. 2B shows two of the chips 400 are used in a joint 2 Beams-on-Chip system, generally indicated at 402, for delivery of an acceptable receiving sensitivity. The two chips 400 may be located in a single base station, or in separate cooperating base stations.

The design of such a high-density-beam-on-chip brings about several major design, manufactory, and scheduling challenges. First of all, power density becomes so critical that the transmission energy of each beam needs to be reduced to tradeoff the increasing number of radio beams on the chip, because total energy of that chip is limited by semiconductor technology.

Secondly, routing (clock tree, power line) is so difficult that the system will need to tolerate some time offsets among different beams, due to the limitation of semiconductor technology. Thirdly, a scheduling algorithm (power control and time advance) is needed for all the beams.

A massive beam-forming system's capacity is bounded by the transmission signal power equally on each radio beam ($P_{beam}$) and total signal power ($P_{total}$). If the total number of effective radio beams is N, then $P_{total}=N \cdot P_{beam}$.

Figure 3:
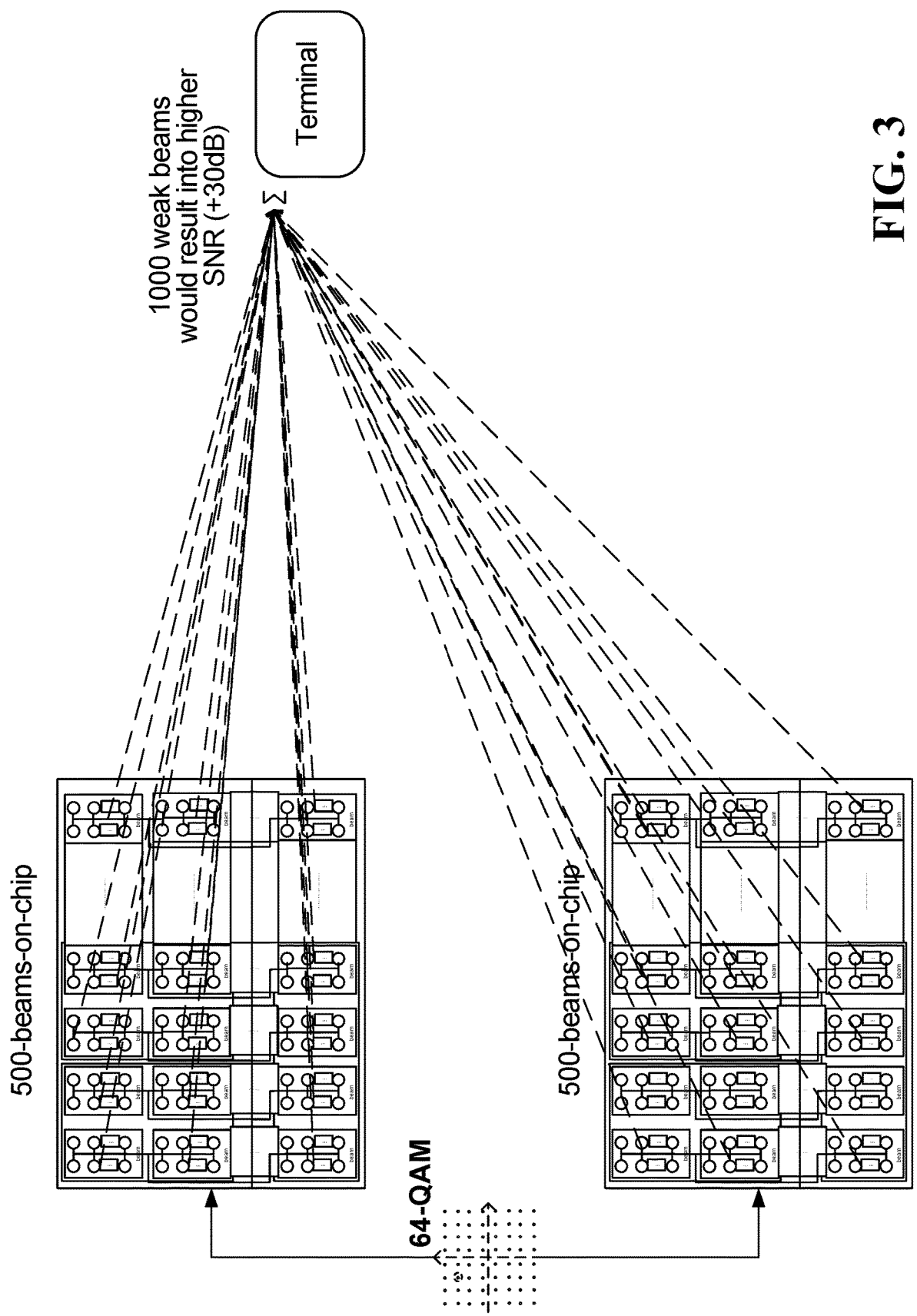
FIG. 3 is a block diagram depicting an example transmission of one 64QAM symbol by 1000 beams using a Beams-on-Chip configuration of FIG. 2B.

In an AWGN channel, this bound of N equal-powered radio beams is power gain. For example, N=2 would boost 3 dB (=10*log 10(3)) at the received signal power; N=3 would boost 4.77 dB (=10*log 10(3)); N=100 would boost 20 dB; and N=1000 would boost 30 dB. In future mmWAVE applications, there is an interest in high throughput applications so that higher order modulation scheme will likely be used. For example, although a single beam produces about −5 dB SNR ($P_{beam}$), N=1000 radio beam-forming system could theoretically decrease it to 25 dB (=−5 dB+30 dB) SNR at the receiver sensitivity level, sufficient for this receiver to decode a 64QAM symbol. FIG. 3 is a block diagram depicting an example transmission of one 64QAM symbol by 1000 beams using the Beams-on-Chip configuration of FIG. 2A.

Figure 4:
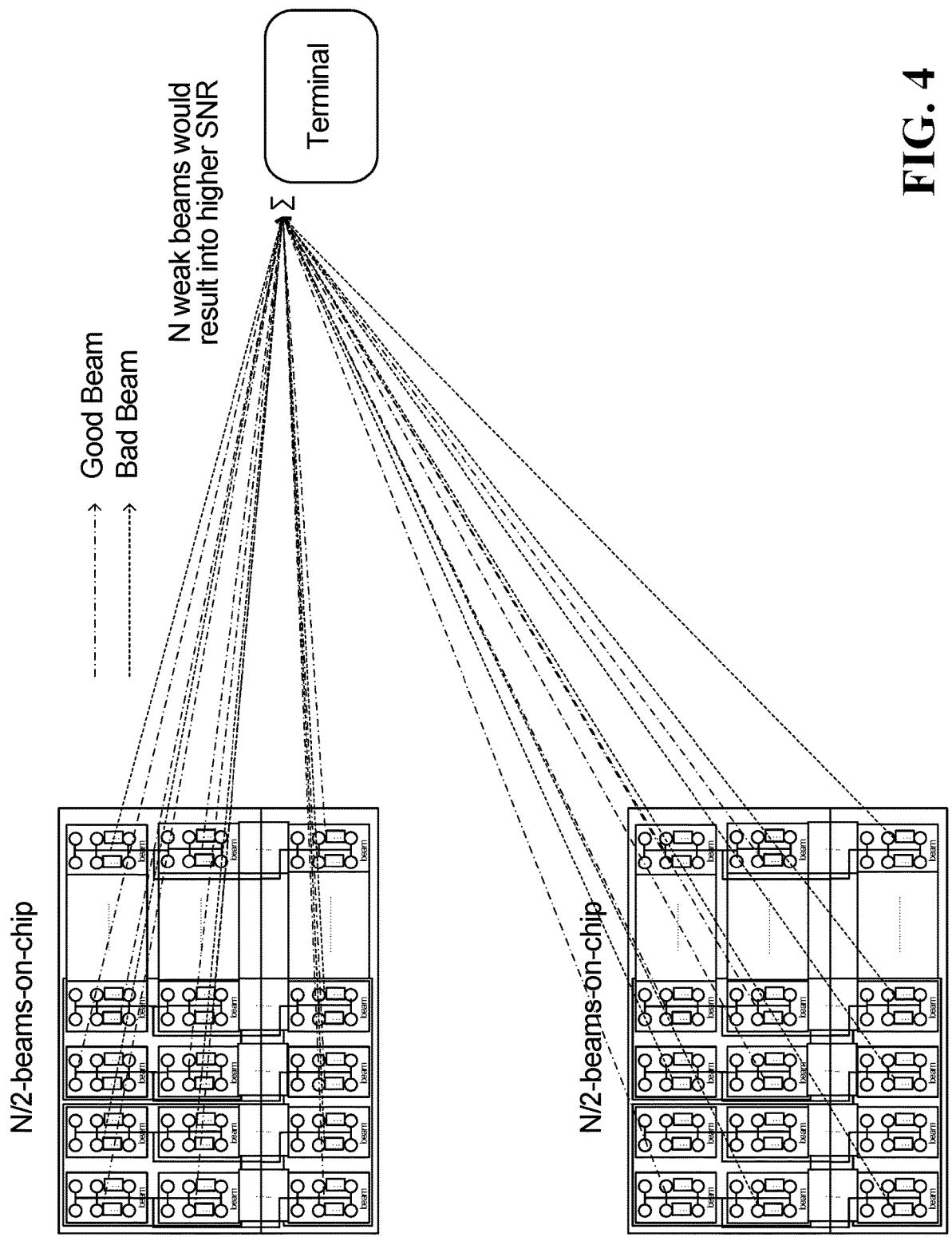
FIG. 4 is a block diagram depicting propagation of unequal-attenuated beams from a Beams-on-Chip configuration of FIG. 2B.

However, a true environment is much more complex than ideal equal-attenuated AWGN. Not all beams are subjected to equal channel attenuation (distortion), resulting in different channel uncertainty on different paths. Especially in the mmWAVE band, a non-line-of-sight (NLoS) beam is typically subjected to a very high attenuation (i.e. signal over that path hardly reaches the receiver). Even among the line-of-sight (LoS) beams, their channel attenuations vary significantly from one to another, usually in terms of angles of transmission and angle of arrival. Furthermore, not all beams reach their common receiver synchronously. The delays resulting from the routing of the beams-on-chip plus different radio paths would be different from one path (or beam) to another. In a non-AWGN channel, it is better to use maximum ratio combining (MRC) gain instead of power gain to indicate this capacity bound according to information theory. Roughly speaking, the system should favor the "good" beams (less channel hostilities mean more the transmitted signals are more likely to reach the receiver) over the "bad" beams (more channel hostilities mean the transmitted signals are less likely to reach the receiver) when scheduling N beams. FIG. 4 is a block diagram depicting propagation of unequal-attenuated beams from a Beams-on-Chip configuration of FIG. 2B. Clearly, in order to set up a MRC strategy, the transmitter (herein the beam-forming base-station) needs to estimate the channel condition on each beam before doing the proportional resource allocation.

Figure 5:
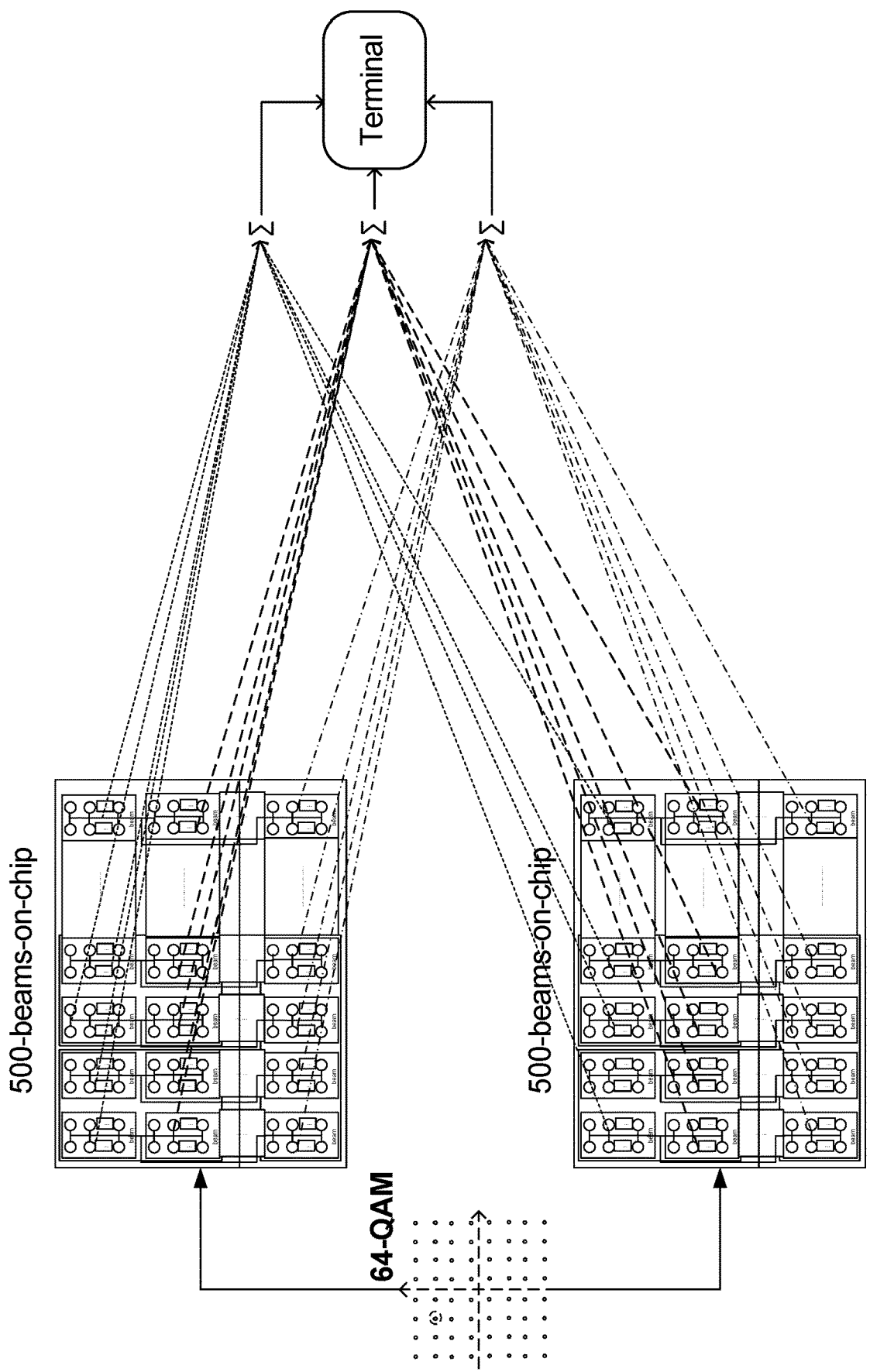
FIG. 5 is a block diagram illustrating an example configuration of a receiver with K=3 uncorrelated receiving dimensions.

Because the antenna size is in function of wavelength, the number K of uncorrelated receiving antennas that a terminal could accommodate (K is the rank in wireless terminology) is related to wavelength, and this number can be increased when the wavelength is reduced to cm or mm level in mmWAVE bands. Accordingly, an N-beam base-station could group its beams into N/K groups, each with K beams. One group has K uncorrelated beams, [beam-1, beam-2, ..., beam-K], targeted at the K receiving antennas respectively. N/K groups would summate together at the receiver. FIG. 5 is a block diagram illustrating an example configuration of a receiver with K=3 uncorrelated receiving dimensions or K independent channel usages (it can be time, space, code and any other method for a receiver to exploit the channel independently).

In this disclosure, different receiving antennas in a multiple input multiple output (MIMO) configuration are used as a specific example of independent (uncorrelated) channel usages. However, this provided approach is open for any other independent channel usages too.

Figure 6:
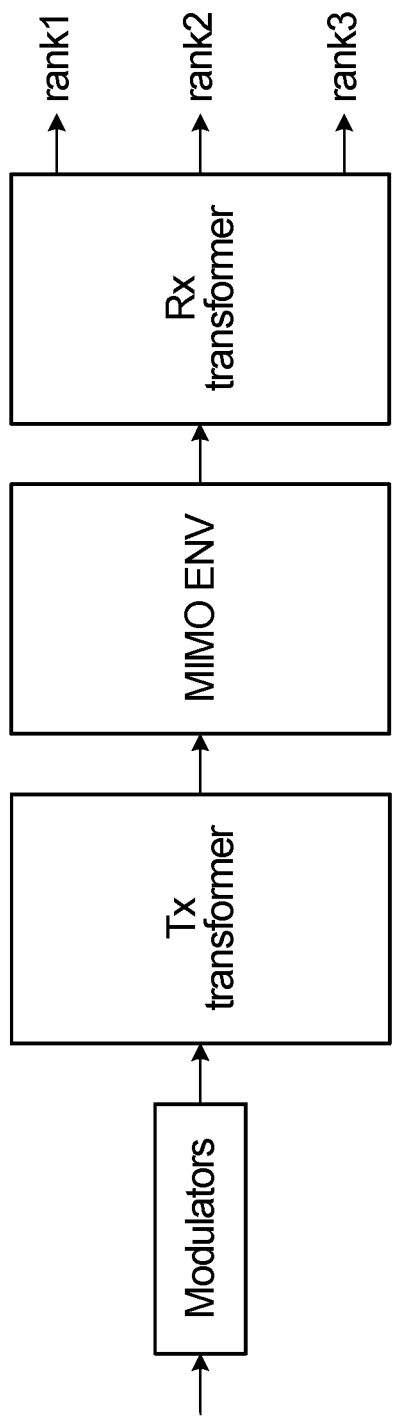
FIG. 6 is a block diagram illustrating a Generic Example of MIMO system to Allocate MCS in terms of Ranks.

In an existing method employed in some MIMO systems, K independent channel usages are estimated with channel measurement ($H_{m\text{-}by\text{-}n}$ m<n) and by single value decomposition (SVD) on the m-by-m covariance matrix $(H \cdot H^H)$ of the estimated channel. The K most important eigenvalues ordered and determined through SVD indicate the importance degrees or weights of the K ranks or components of this channel. Based on the determined qualities, modulation and coding schemes (MCS) are adaptively selected for the ranks. For example, if rank #1 is the best, a higher modulation and higher coding rate would be chosen for this rank. The performance realized in making use of the K ranks depends on the granularity of the MCS. For a simplified example of transmitting 6 bits along 3 ranks:

If there is one rank after SVD, one 64QAM symbol is transmitted on that rank;
If there are two ranks (similar to each other), two 8QAM symbols are transmitted, one over each rank;
If there are three ranks (similar to each other), three QPSK symbols are transmitted, one over each rank;

FIG. 6 is a block diagram illustrating a generic example of a MIMO system to that allocates MCS in terms of ranks.

This system is inefficient for a number of reasons. Firstly, the quality of ranks must be reliably estimated and tracked. A high pilot density is needed for this, which results in significant pilot overhead. For pilot transmission, a transmitter transmits reference signals over some percentage of the overall resources, and a receiver should measure them over each receiving port and send feedback to the transmitter, such as channel state information (CSI). Secondly, a large number of MCSs are defined as candidate MCSs (thousands of MCSs are defined in a 5G system), which means both BTS and UE have to store these tables, parameters, and the ways to fetch them. Thirdly, control signaling must be used to make sure that both transmitter and receiver follow the same arrangement. Both transmitter and receiver must know which MCS is being used on which rank. More importantly, once the channel attenuations vary to some extent, the quality of the ranks may change so much that every established arrangement (MCS) becomes outdated.

In mmWAVE, the attenuations over beams are polarized. More specifically, one beam is created by a set of antennas. This set of the antennas are configured to point their energy to one particular direction so that it can largely compensate the path loss over that direction to form a strong transmission signal in that direction. For reception, this set of the antennas has the effect of lowering the receiving sensitivity too. The operation is sometimes referred to as polarization. LoS beams would have over-air-path-loss attenuation in terms of distance; some NLoS beams would be subjected to severe attenuation; and other NLoS beams might be positively strengthened by metal reflections. Generally speaking, an attenuation model (distribution) is sensitive to its geographic position. By statistics, the attenuation model in terms of the space positions can become available for a coherent time window, called a coherent time. However, when a high frequency band is used for signal transmission, a small mobility would lead to severe Doppler shifts and time offsets. Its coherent window time is small.

A very large number of beams could be used to hedge the coding gain from these hostilities. For example, if some beams were blocked (infinite attenuation, dead beam), a system would adjust the transmission power among the "survival" beams and the "dead" beams to compensate for the loss. Because Doppler shifts and time offsets depend on the angles of the moving trajectory, their hostility could be compensated by adjusting the transmission power among the "advantageous" and "disadvantageous" beams.

Figure 7:
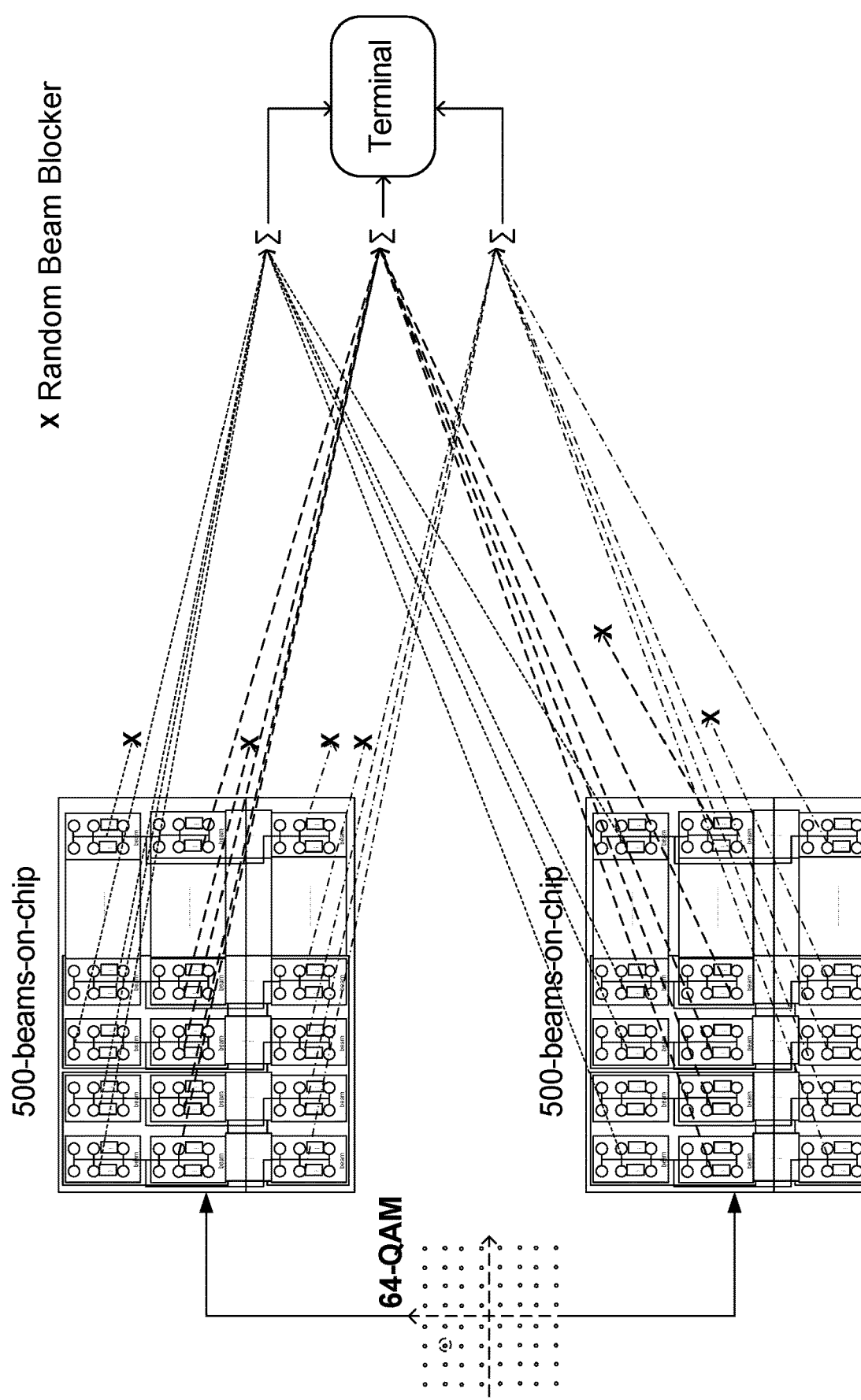
FIG. 7 is a block diagram depicting the ability of transmission of large number of beams to tolerate the complete blocking of some beams by random blockers.
Figure 8:
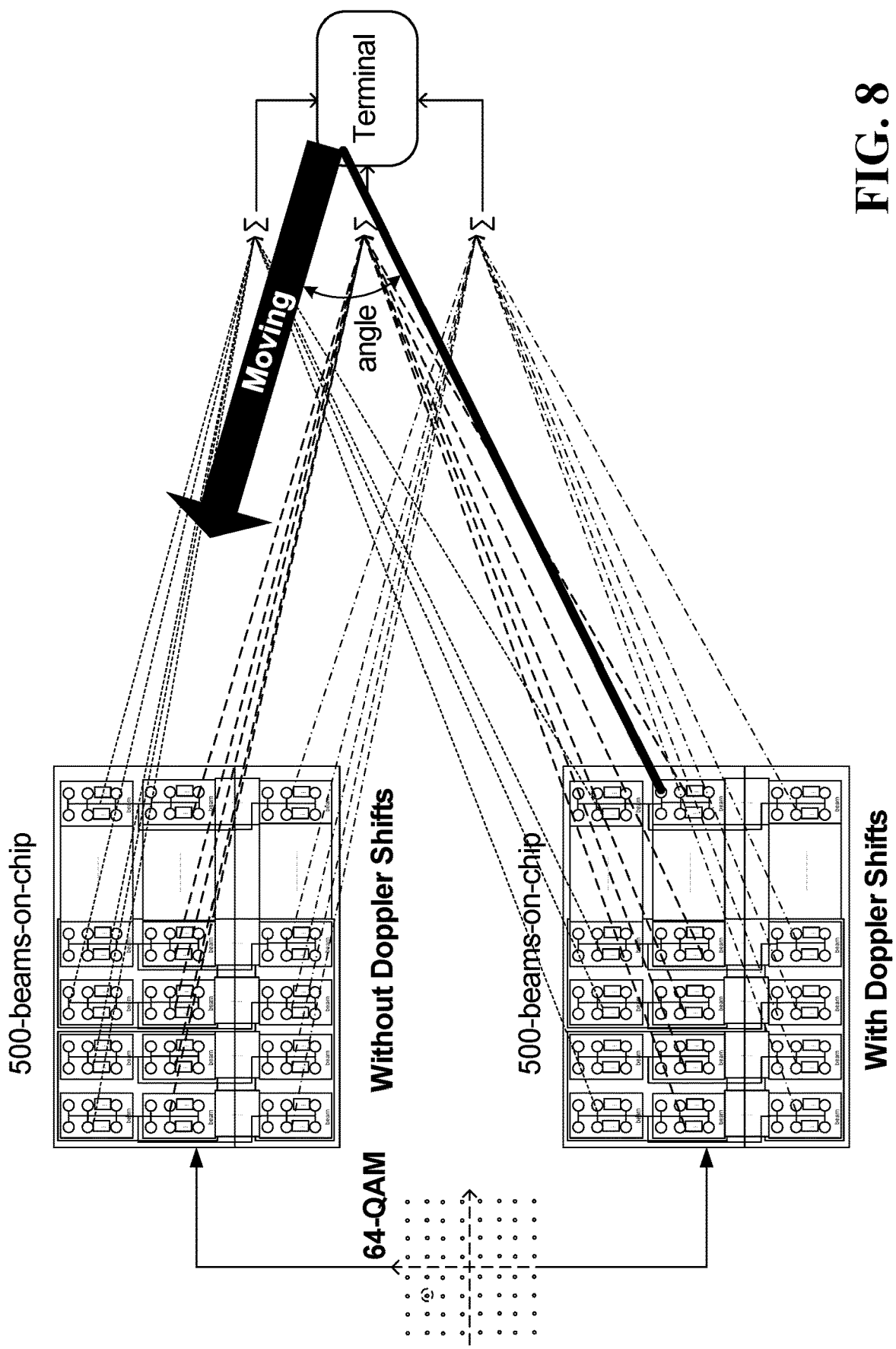
FIG. 8 is a block diagram depicting the ability of transmission of large number of beams to tolerate the Doppler Effect.

FIG. 7 is a block diagram depicting how the transmission of a large number of beams can be used to provide tolerance to some beams being completely blocked by random blockers. FIG. 8 is a block diagram depicting the ability of transmission of large number of beams to tolerate the Doppler Effect.

Figure 9A:
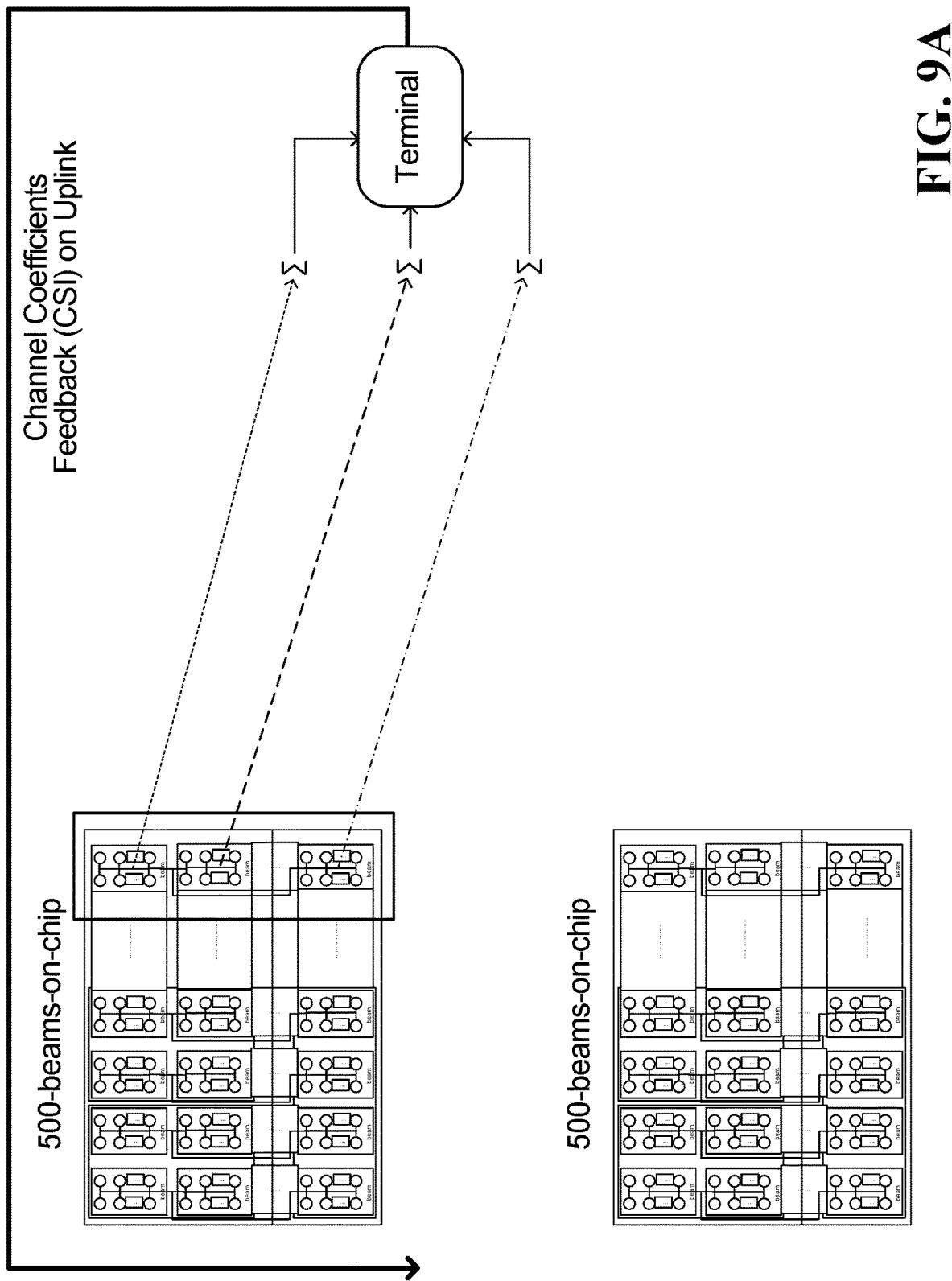
FIG. 9A is a block diagram depicting a Round-Robin transmission to measure channel coefficient.
Figure 9B:
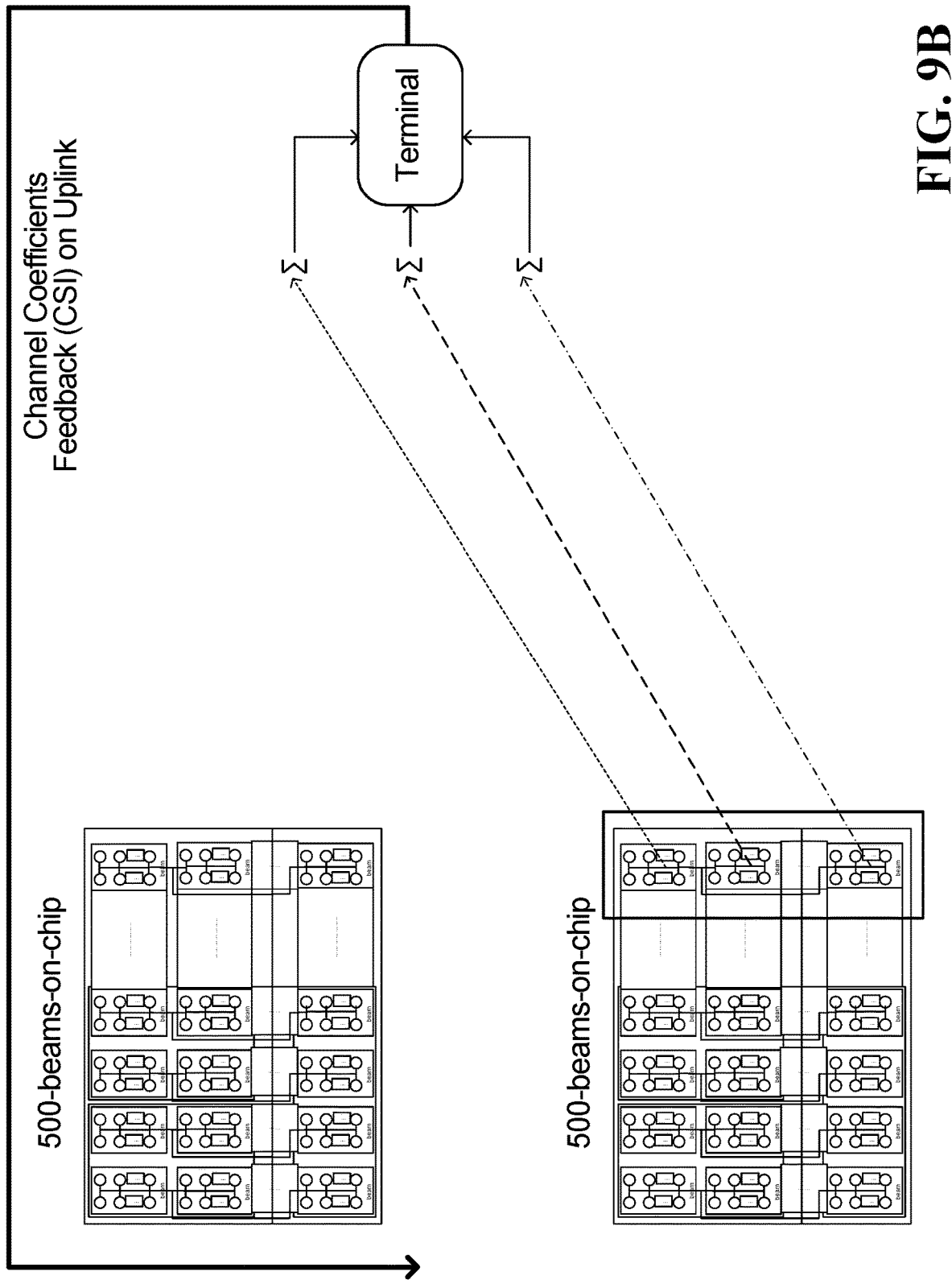
FIG. 9B is a block diagram depicting a Round-Robin transmission to measure channel coefficient.

Power control and synchronization among the N beams would be of the most critical in a mmWAVE scenario. But it is extremely difficult to achieve. First of all, the attenuations need to be known. Although the statistic distribution model of the attenuation in term of a spacious position can be known, the attenuation itself is a random variable. To catch the instant attenuation, the system needs to measure the channels of N/K-by-K, total N paths, which means a large number of downlink reference resources (because a receiver only sees K dimension resulting from N beams overlapping on the air, one receiving dimension needs to measure the N/K beams in a in round robin fashion to avoid pilot interferences.) and a corresponding large amount of uplink reporting resources which function as overhead. FIGS. 9A and 9B are a block diagrams depicting a Round-Robin transmission to measure channel coefficients. At measurement moment t depicted in FIG. 9A only K beams are allowed to send their pilots on downlink. At measurement moment t+1 depicted in FIG. 9B, another K beams are allowed to send their pilots on downlink.

Another method is based on an assumption that downlink and uplink channels are reciprocal. But there is always some offset between the reciprocity in reality. Secondly, even if the system knew perfectly had perfect knowledge of the channel attenuation, it would be challenging to compute the proportional maximum ratio combined (MRC) power offsets for N/K beams in a short time interval.

Performance Gain with Dimensional Extension
Coding Gain

In a modern communication system, redundancy is widely used to overcome channel attenuation and noise. For example, forward error correction (FEC) is a kind of dimension-extended method that not only injects some redundant bits but also creates some dependency among the coded bits (of the code-word). For another example, a MIMO encoder is a dimension-extended method that extends several complex symbols onto multiple spatial dimensions to have a coding gain. In general, although a dimension extension would bring about a dimensional gain, such a dimensional gain must include a power gain but may not necessarily result into any coding gain.

Figure 10:
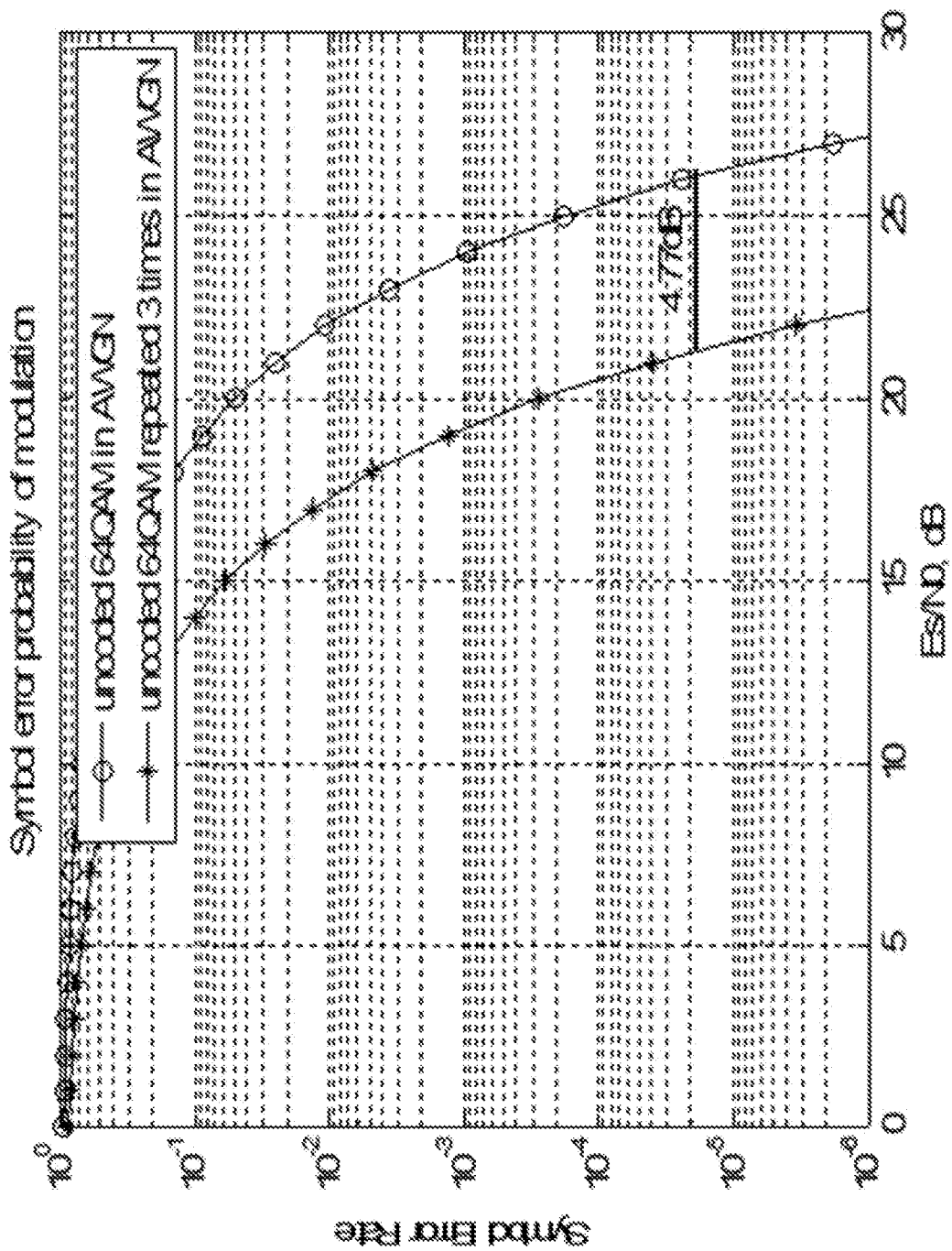
FIG. 10 is a plot measuring Symbol-Error-Rate (SER) vs Es/N0 of 64QAM on AWGN.

A power gain is an equal-gain-combination (EGC) gain in an AWGN channel. In an equal-attenuated AWGN channel, if a piece of information (one bit or one QAM symbol for example) is repeated (or linearly combined) onto the K dimensions, this naturally results a power gain of 10*log 10(K) dB. As example, an EGC gain of repeated transmissions over 3 equal-attenuated dimensions gains equals to 4.77 dB (=10*log 10(3)) as shown in FIG. 10.

Figure 11:
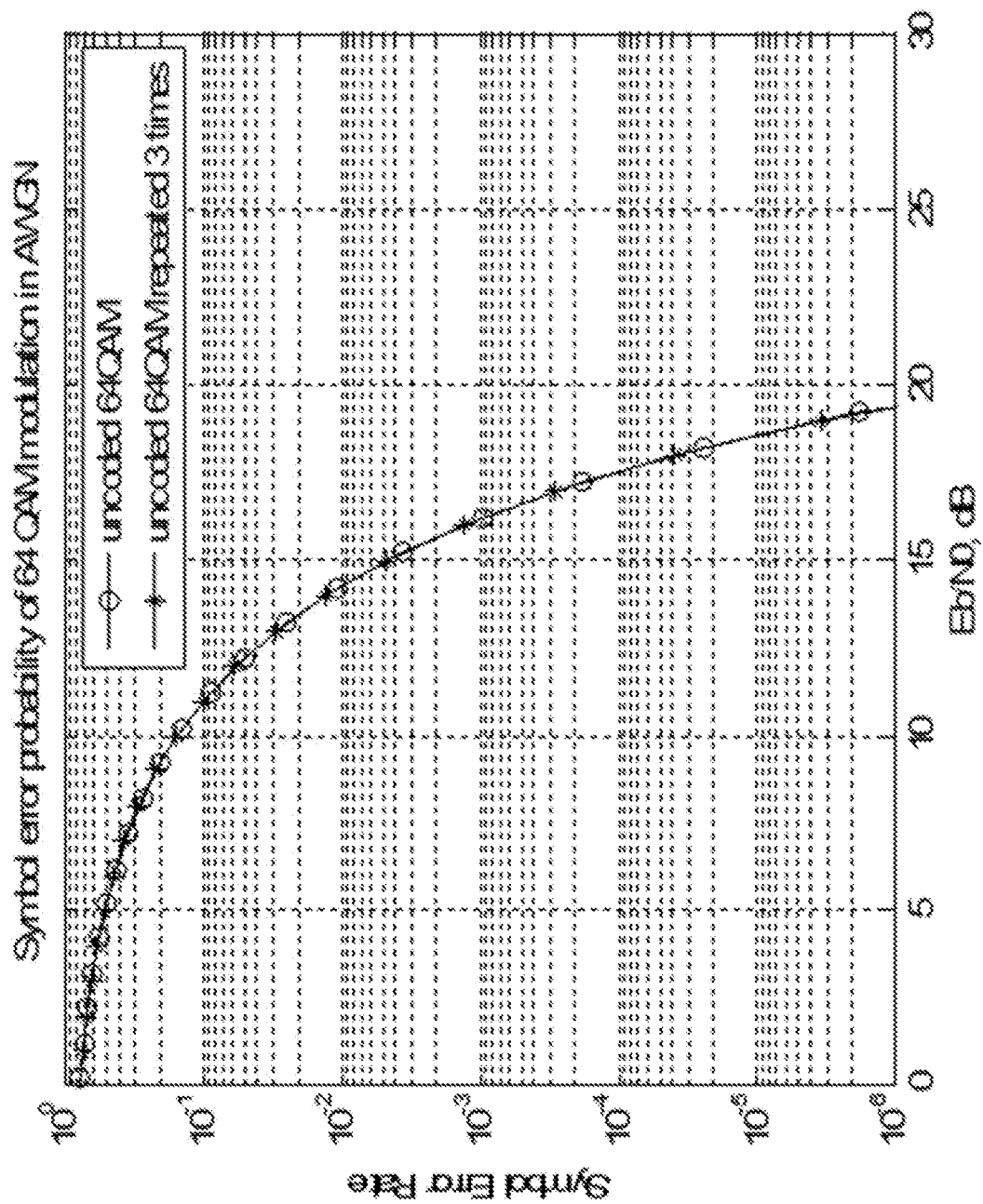
FIG. 11 is a plot measuring Symbol-Error-Rate (SER) vs Eb/N0 of 64QAM on AWGN.

A coding gain is beyond the EGC gain. For example, encoding one symbol over 3 dimensions to achieve a 3 dB gain in addition to ECG gain would allow the transmitter either to cut power by half or to double the coverage distance. To demonstrate a coding gain, it is better to measure symbol error rate (SER) in terms of a ratio of energy per Bit (Eb) to the spectral noise density (No) (Eb/No) instead of a ratio of energy per symbol (Es) to the spectral noise density (Es/No) A simple repetition (or any linear combination) scheme leads to zero coding gain as shown in FIG. 11.

To have a coding gain, a conventional channel encoder (FEC) injects (K−M) redundant bits for M information bits, or extends N (K>M>1) dimensions to K dimensions. Essentially, the coding gain is in terms of coding rate: M/K. A lower coding rate brings about more coding gain. When (M=1) dimension is extended to K dimensions resulting into a coding rate of 1/K, according to coding theory, there is no coding gain if the input dimension is one (M=1) in an equal-attenuated AWGN channel. It would be advantageous to achieve a coding gain in for such a system in an equal-attenuation channel AWGN channel.

Figure 12:
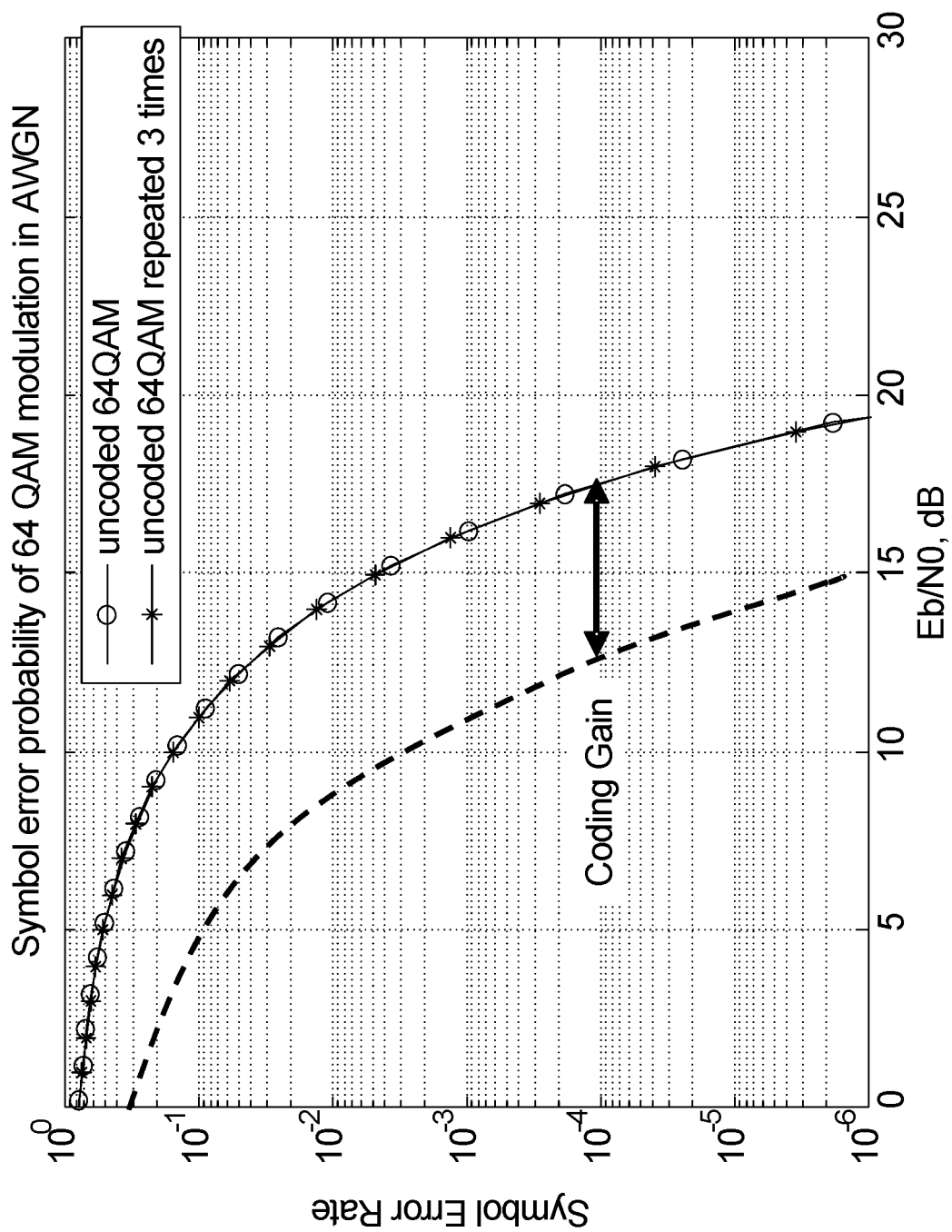
FIG. 12 is a plot depicting the Expected Coding Gain in plot of FIG. 11 when using K=3 dimensions to transmit input bits of one 64 QAM symbol.

Unlike MRC gain, the availability of coding gain with an AWGN channel is well understood. If there was a coding gain for a 1→K dimension extension in FIG. 12, it would be possible to realize advantages on the system level in more complex channel conditions.

Diversity Gain

The input bits for 64QAM symbol can be transmitted using K=3 dimensions by transmitting 3 independent QSPK symbols each carrying 3 bits. It is well known that a QPSK constellation is optimal with respect to coding distance (Hamming distance for example) due to both constant Euclidean distance between any two neighboring constellation points and constant magnitude of the constellation points. There are other ways that the 6 bits could be transmitted using K=3 dimensions, and the QPSK curve could serve as a theoretical bound for the potential coding gain of using K=3 dimensions.

Figure 13:
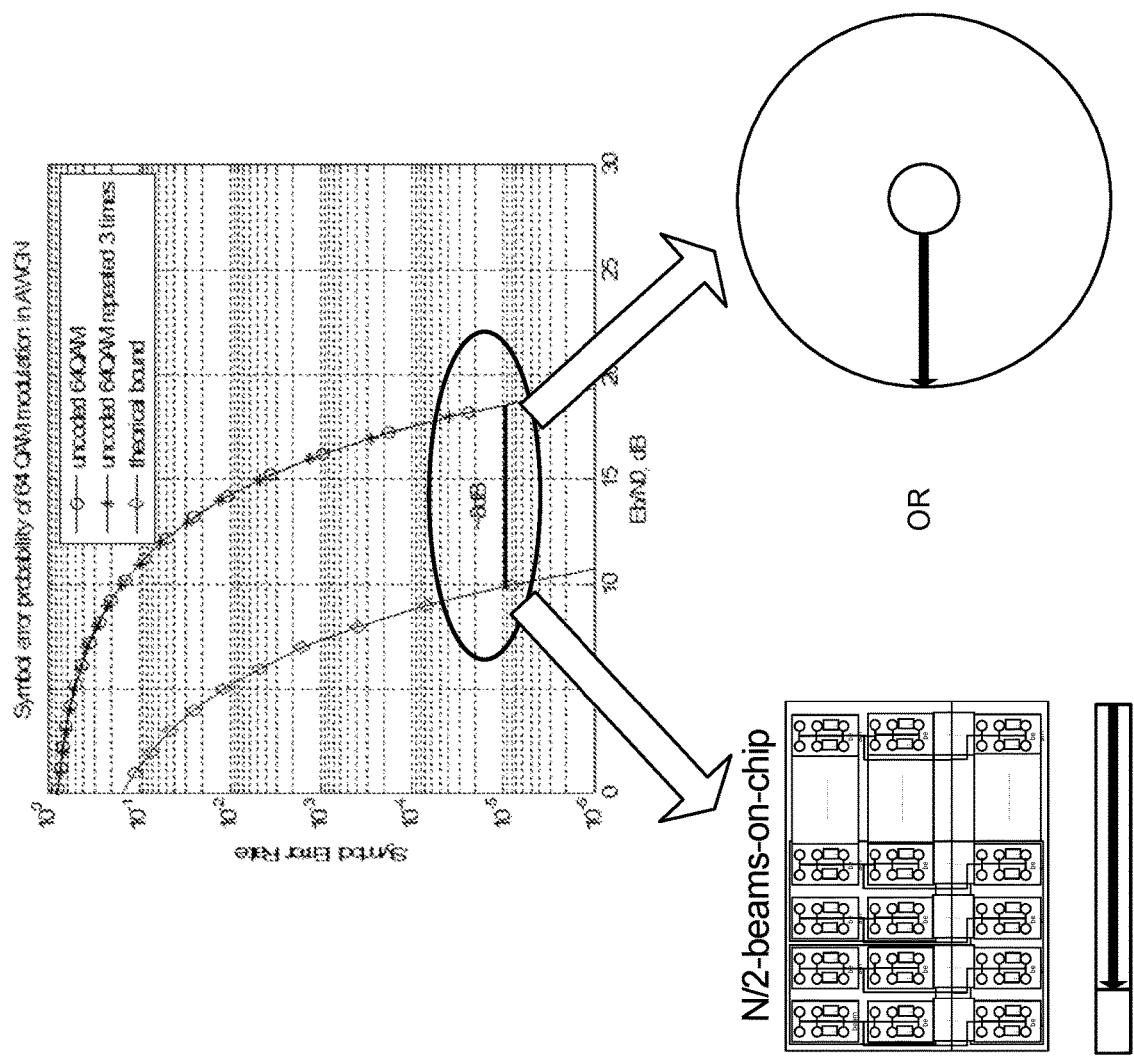
FIG. 13 is a block diagram depicting the theoretical bound and effects of the coding gain when using K=3 dimensions to transmit input bits of one 64-QAM symbol.

FIG. 13 shows a potential coding gain room of ~8 dB for using K=3 dimensions to transmit 6 bits compared to transmitting one 64QAM symbol on one dimension. The coding gain room is equivalent to cutting the transmission power down to ~16%, or enlarging the coverage by ~36 times. It is noted that the example of transmitting 6 bits of one 64QAM symbol using three dimensions was chosen simply to make the example comparable with the QPSK constellation that is proven as optimal in a 2D complex Hilbert space. However, this is not a general case: it remains unproven and unknown what the theoretical boundaries are with higher modulation orders (512-QAM, 1024-QAM or 4096-QAM etc.) with an arbitrary coding rate of 1/K. The provided method is demonstrated to be optimal solution for QPSK, 16QAM. The provided method can also be applied for higher order modulations. It is speculated that the provided method, when applied for higher order modulation, can approach an optimal solution. This is contrast to conventional higher order modulation schemes which were designed not for the optimal performance but for easy implementation.

It cannot be guaranteed that given a modulator order and arbitrary coding rate, this would lead to log 2(Modulator-order)/K being an integer. In case of using 3 symbols to transmit 6 bits, this is equivalent to a 1/3 code rate, and log 2(64)/3=2 (→QPSK); whereas in another case of applying 1/3 coding rate to the input bits (10) of a 1024-QAM symbol, this leads to log 2(1024)/3=10/3 bits per dimension, which is not an integer. In practice, there may be varying numbers of the receiving dimensions K. For example, it is very likely that only 3 receiving antennas remain uncorrelated for a terminal equipped with maximum 4 receiving antennas. In reality, the number of uncorrelated channels available at a given instance is a function of environmental conditions and is not readily controllable in a precise manner.

Figure 14:
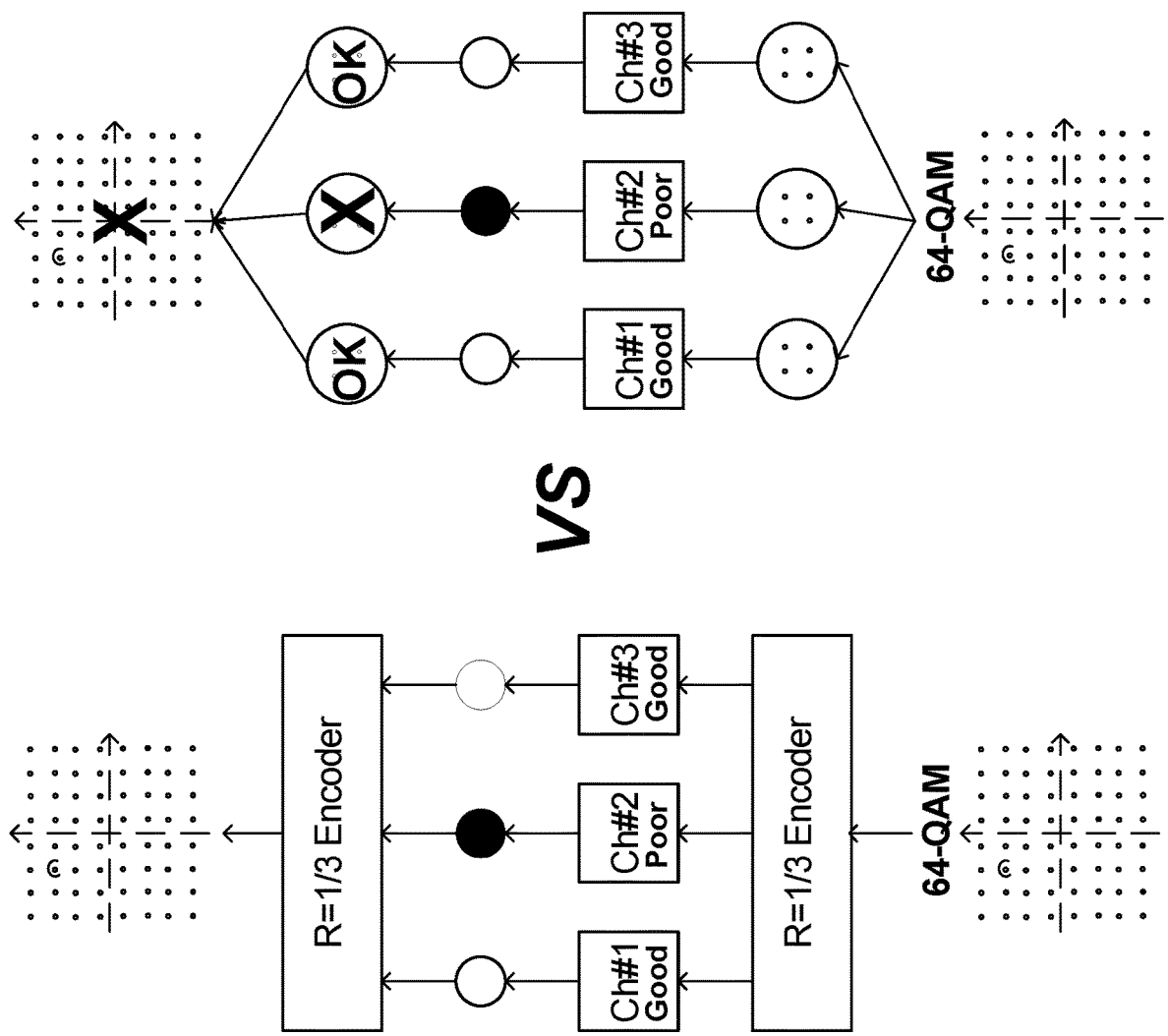
FIG. 14 is a block diagram depicting the ability of Symbol-Coding Scheme to tolerate selective attenuation.

It would be advantageous to achieve a diversity gain or MRC gain in a multipath channel condition. K uncorrelated dimensions may be subjected to K independent and different attenuations. Suppose that the transmitter divides the 6 bits of one 64QAM symbol into 3 sets of 2 bits for transmission on 3 QPSK symbols and sends them through 3 uncorrelated dimensions respectively. If one of the three dimensions suffers from a severe negative attenuation (weakened) and the other two dimensions are strengthened, the QPSK symbol on the weakened dimension may be lost, making it impossible to recover the original 64QAM symbol. In contrast, if one 64QAM symbol was encoded into the 3 dimensions in some way, the receiver might recover this 64QAM symbol mostly from the remaining two strengthened dimensions by the radio channel as shown in FIG. 14. This is diversity gain or MRC gain.

Incremental Redundancy Retransmission

In a wireless system, IR-HARQ has been widely used with the channel code to increase the reliability (or enlarge the coverage) at the cost of the average throughput. Some channel codes like Turbo codes, Convolutional codes, and low density parity check (LDPC) allow the transmitter to transmit a partial code-word (coded block) to a receiver at one transmission interval. If the current channel condition is good enough, a receiver may be able to recover the entire the information block even from this partial code word; otherwise, the receiver may send a feedback to the transmitter for a re-transmission. Instead of re-transmitting what has been transmitted previously (chase-combination retransmission), the transmitter would transmit an incremental redundant part of the code-word so that the receiver would combine the incremental redundant part with the previously received one into a longer code-word for its channel decoder. In this way, additional coding gain can be realized beyond the pure power (repetition) gain.

IR-HARQ is an opportunistic method that is sensitive to time-varying channel conditions (sometime channel usage exhibits a positive condition, sometime it shows a negative condition). If the first transmission happens with a positive condition, the retransmission resource is saved. Furthermore, in some latency-critical and reliability-critical applications like ultra-reliable low latency communications (URLLC), a transmitter tends to do a blind re-transmission instead of waiting for the feedback, because a feedback cycle may be too long for their latency requirement. In both scenarios, the most essential or helpful information should be included in the incremental retransmission(s) to yield a coding gain.

So far, the incremental-redundancy-based re-transmission is done only with some channel code schemes, for example schemes that use specific channel codes such as Turbo, convolutional and low density parity check (LDPC). No other dimensional extension based algorithms such as MIMO, spreading code, have reported similar retransmission (most of them support only chase-combination, i.e. power gain).

Along with the development of the 5G system, there has been an increase in the number of dimensions of channel usage, such as frequency (sub-carrier, different bands), space (MIMO, dual connectivity), time, and code (PN codes, pseudo-random codes). A good system should be able to integrate multiple available dimensions to deliver an overall system gain that is efficient in terms of use of the available resources. Among the sources of system gain, the coding gain is the most sought in terms of its effect on system spectrum efficiency.

Nevertheless, one of the reasons why only some channel code schemes could achieve the incremental redundancy (IR) retransmission with some coding gain is due to the orthonormalities of these dimensions. Such an IR-supported channel code scheme benefits from its assumption that M information bits are independent and identically distributed (IID) and K coded bits are subjected to AWGN noise. In other words, the input is an orthonormal M-dimensional entity and the output is an orthonormal K-dimensional entity too. In fact, efforts are typically made to "maintain" this ideal environment for a channel code through the use of pilots, channel estimation, and equalization. Unfortunately, this is NOT case for most dimensional extension algorithms, in orthonormalities on both input and output at all times cannot be ensured at all times. For example, it cannot be ensured that the two antennas remain uncorrelated at all times. In another example, two sub-carriers may be subjected to very different channel attenuations in a frequency selective channel due to multi-path fading or Doppler effect.

In face of these difficulties, most prior art systems resort to maximum ratio combination (MRC) schemes to overcome the diversities passively. Although a MRC-based receiver may realize an MRC gain in some cases due to diversity transmission, the gain cannot be ensured all the time.

Machine Learning

It has been suggested to use Machine Learning techniques to solve the two problems above and to create a coding scheme to encode M legacy QAM symbols to K dimensions by the power-controlled N/K radio beams. The most straightforward proposal is to use an Autoencoder, in which the input is M QAM symbols, the output is decoded QAM symbols, there is a latent layer with K dimensions, attenuation is modelled by multipliers on this K-dimension latent layer, and AWGN noise is added on this K-dimension latent layer. The loss or target of this Autoencoder is to minimize the square error (MSE) between the input and output.

One issue with this solution is that the decoding neural network (after the K-dimension latent layer) will attempt to mathematically maximize likelihood probability dependent of the K-dimension latent layer. Yet, this K-dimension latent layer is subjected to varying noise and attenuation. With varying SNR and attenuations, the statistical property of the K-dimension latent layer changes so that the decoding neural network needs to be re-trained. In practice, it is impractical to re-train a complete deep neural network in situations where SNR or attenuation is time varying.

Another issue is that in order to have N beams, the autoencoder architecture would include an N-neuron layer just before a K-neuron layer (N>>K) and the connections between the two layers are multiplied by the given attenuation coefficients and added by random noise. In such a deep neural network, the training would tend to "power down" a majority of the beams and "concentrate" transmission power $P_{total}$ on very few remaining ones, which is not a desired result, because this would require each beam to be designed to have a much higher maximum transmission power, which result in a higher cost and larger chip die size.

One major reason that deep learning neural networks are difficult to apply in wireless telecommunications applications is that the deep learning neural network is a non-linear function. Compared with traditional linear functions (most wireless signal processing algorithm is linear or quasi-linear), a non-linear function has an over-fitting tendency so that its generalization is severely limited.

Another problem results from the presence of varying channel attenuations in wireless systems. A radio channel is time-varying, frequency selective and fading. Its existence makes the statistical property of the received signal (transmitted signal distorted by channel) time-varying and frequency-selective too. The neurons of the deep neural network need to be tuned to adapt to the varying and selective channel attenuations, often leading to a complete re-training.

Embodiment 1

Model of N-Beam-to-K-Receiving System

Figure 15:
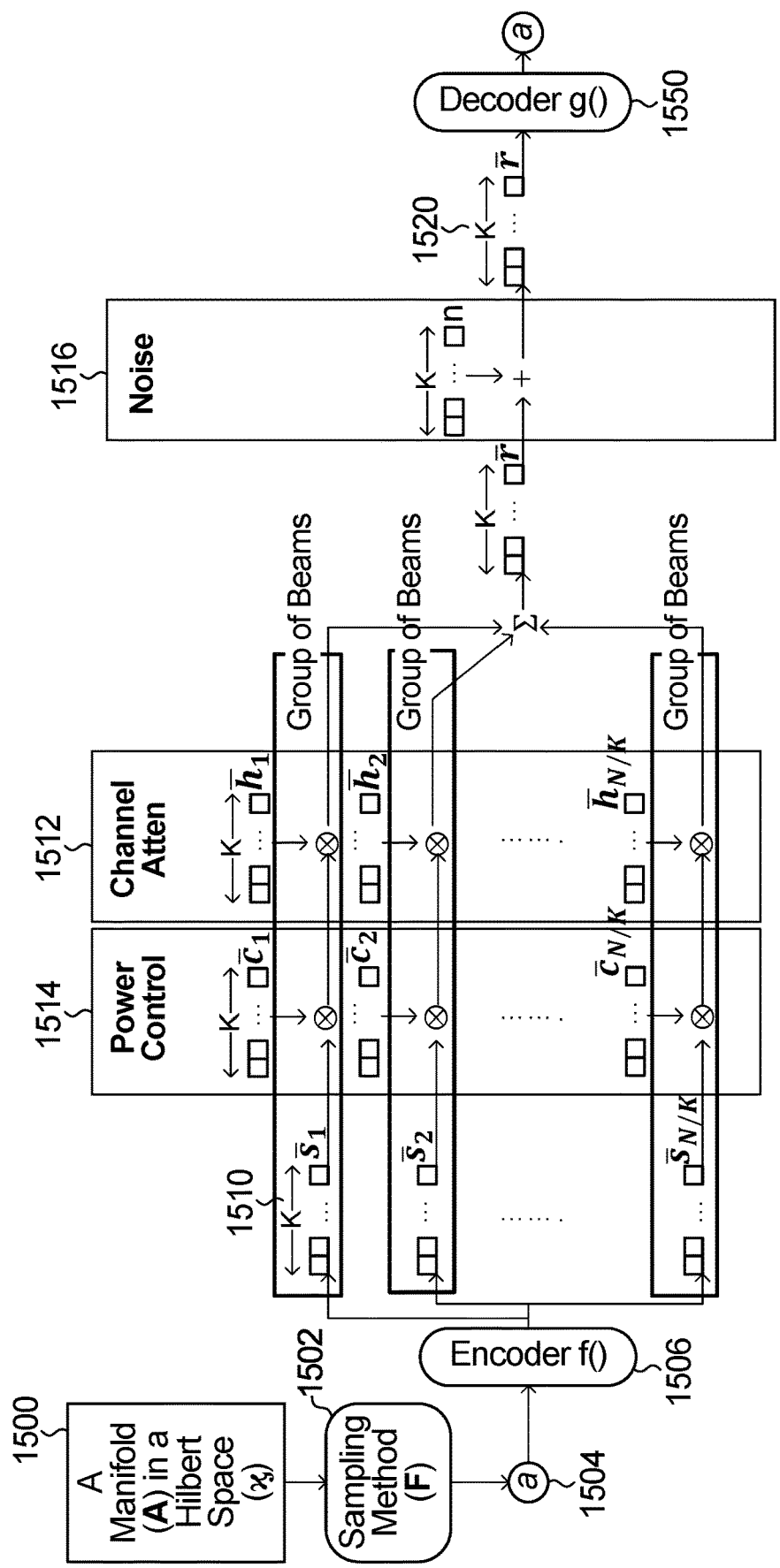
FIG. 15 is a block diagram depicting an N-dimensional transmitter and a K-dimensional receiver.

Referring now to FIG. 15, shown is a model of a transceiver scenario. An N-dimensional transmitter sends one specific sample "a" 1504, sampled using sampling method F 1502 from a manifold A (a probability distribution) 1500 over a Hilbert space ꓧ through a hostile environment, and a K-dimensional receiver including decoder 1550 estimates that sample "a" from the distorted and noised received signals. The transmitter encodes the sample with encoder 1506 to produce K×N/K outputs (i.e. N/K K-dimensional vectors), where N is the dimensionality of the transmitter, and K is the dimensionality of the receiver (i.e. these N/K K-dimensional vectors are accumulated into one K-dimensional vector for the receiver). In a specific example, the N transmit dimensions are achieved with N transmit beams from N transmit antenna elements, and the K receive dimensions are achieved with K receive antenna elements.

More specifically, the transmitter samples from manifold A to obtain symbol a using sampling method F 1502, and encodes the symbol a with encoder 1506 into the vector $[s_1, s_2, \ldots, s_N]$: $\vec{s} = f(a)$, where $f(\cdot)$ is the transmitter encoder unknown to the receiver. The vector $[s_1, s_2, \ldots, s_N]$ is transmitted over N transmission paths, naturally summed up over the air, and results in received vector a $\vec{r'} = [r_1', r_2', \ldots, r_K']$ 1520 at the receiver. The receiver uses decoder $g(\cdot)$ 1550 to decode the received signals to produce: $\hat{a} = g(\vec{r'})$.

The topology including the space ꓧ, manifold A, and sampling method F are specified and standardized and known to both the transmitter and receiver.

The transmitter has N independent or uncorrelated transmission dimensions $\vec{S} = [s_1, s_2, \ldots s_N]$, each of which transmits a sine wave, represented by a complex value. The N components of $\vec{S} = [s_1, s_2, \ldots s_N]$ are grouped into N/K groups: $\vec{s}_1, \vec{s}_2, \ldots, \vec{s}_{N/K}$. Each group has K components: $\vec{s}_i = [s_{i,1}, s_{i,2}, \ldots s_{i,k}]$ and is targeted at the K uncorrelated receiving dimensions of a receiver. Without loss of generality, a transmission dimension $s_{i,1}$ represents a connection from the i-th transmit group to the $1^{st}$ receiving port; $s_{i,2}$ represents a connection from the i-th transmit group to the $2^{nd}$ receiving port, and so on. For example, FIG. 15 shows $\vec{s}_1$ transmitted on a first K transmit dimensions at 1510.

There are a total of N connections that connect the N transmission dimensions to the K receiving dimensions. Each connection has its own attenuation coefficients $\vec{H} = [h_1, h_2, \ldots h_N]$, each of which is represented by a complex value (I,Q), and its amplitude $(I^2+Q^2)$ represents the power attenuation and the angle (inner product <I,Q>) represents the phase offset, i.e. time offset. Following the grouping of $\vec{S} = [s_1, s_2, \ldots s_N]$, $\vec{H} = [h_1, h_2, \ldots h_N]$ can be grouped into N/K groups, each of which has K complex elements: $\vec{H} = [\vec{h}_1, \vec{h}_2, \ldots, \vec{h}_{N/K}]$ and $\vec{h}_i = [h_{i,1}, h_{i,2}, \ldots h_{i,K}]$. The attenuations are generally indicated at 1512 in FIG. 15.

Similarly, each connection has a normalized power control coefficient (real-value) $\vec{C} = [c_1, c_2, \ldots c_N]$ to avoid transmission power saturation. Following the grouping of $\vec{S} = [s_1, s_2, \ldots s_N]$, $\vec{C} = [c_1, c_2, \ldots c_N]$ can be grouped into N/K groups, each of which has K real elements: $\vec{C} = [\vec{c}_1, \vec{c}_2, \ldots, \vec{c}_{N/K}]$ and $\vec{c}_i = [c_{i,1}, c_{i,2}, \ldots c_{i,K}]$. To avoid excessive power concentration, we limit:

$$\forall i: \sum_{k=1}^{K} c_{i,k} \leq 1,$$

which implies that the total power is less than N/K, that is, $$\sum_{j=1}^{N/K} \hat{c}_j \leq N/K.$$

The maximum total power of a group is N/K to ensure no damage due to excess power concentration. The power control coefficients are applied at 1514 in FIG. 15. The output of power control 1514 is what is transmitted over the air.

At the k-th receiving dimension, the N/K connections are summed up over the air:

$$r_k = \sum_{i=1}^{N/K} s_{i,k} \cdot c_{i,k} \cdot h_{i,k}.$$

For the receiver, it receives a K-element complex vector $\vec{r} = [r_1, r_2, \ldots, r_K]$, each of which transmits a sine wave, represented by a complex (I,Q):

$$\vec{r} = \sum_{i=1}^{N/K} \vec{s}_i \otimes \vec{c}_i \otimes \vec{h}_i,$$

$\otimes$ is element-wise multiplication.

An AWGN noise n is added on $\vec{r} = [r_1, r_2, \ldots, r_K]$: $r_k' = r_k + n_k$. The addition of noise is indicated at 1516 in FIG. 15.

Note that if K=1, the model is reduced to N independent transmission dimensions to 1 receiving dimension. In this case, there is no coding gain any longer but there may still be power gain.

A specific example of the model of FIG. 15 will now be described with reference to FIG. 16. In this example, the Hilbert space)s is a 2-dimensional space having real and imaginary parts. 64-QAM constellation is a standardized manifold A that defines non-zero-probability positions (called support) on this ϰ. Gray coding F is a method to sample that manifold, ensuring that every constellation point is sampled with an equal probability, i.e. 1/64. When sampled, a 64-QAM symbol $a = (a_I, a_Q)$ (because sampled from 2-dimensional space ϰ) is encoded into $\vec{s} = [s_1, s_2, \ldots s_N]$, N=768 by $\vec{u}_i = f(a)$. The transmitter in this example has 768 independent beams. The receiver has 3 (K=3) independent receiving antennas so that the 768 beams are grouped into 256 groups (each group has 3 beams). One group of the 3 beams is targeted at the 3 receiving antenna ports respectively and in parallel. Because there are 256 groups, the significant path loss for one single group can be compensated (256→24 dB SNR improvement on this receiving antenna). As result, the receiver has $\vec{r}' = [r_1', r_2', r_3']$ and uses a decoder g( ) to estimate the symbol: $\hat{a} = g(\vec{r}')$. This example is used in the description below, but it should be understood that the provided systems and methods are valid for any Hilbert space, manifold, and sampling method.

Coding Gain Problem

For the purpose of finding f(·) and g(·), the channel attenuation coefficients are fixed (e.g. set $\vec{H} = [h_1, h_2, \ldots h_N] = 1$) and the power control is fixed (e.g. by fixing $\vec{C} = [c_1, c_2, \ldots c_N] = 1$ to 1). The problem is reduced to:

$$\tilde{r} = \sum_{i=1}^{N/K} \tilde{s}_i + n.$$

Given a ϰ, A, and F as well as N and K, find f(·) and g(·) to deliver the maximum coding gain.

Figure 16:
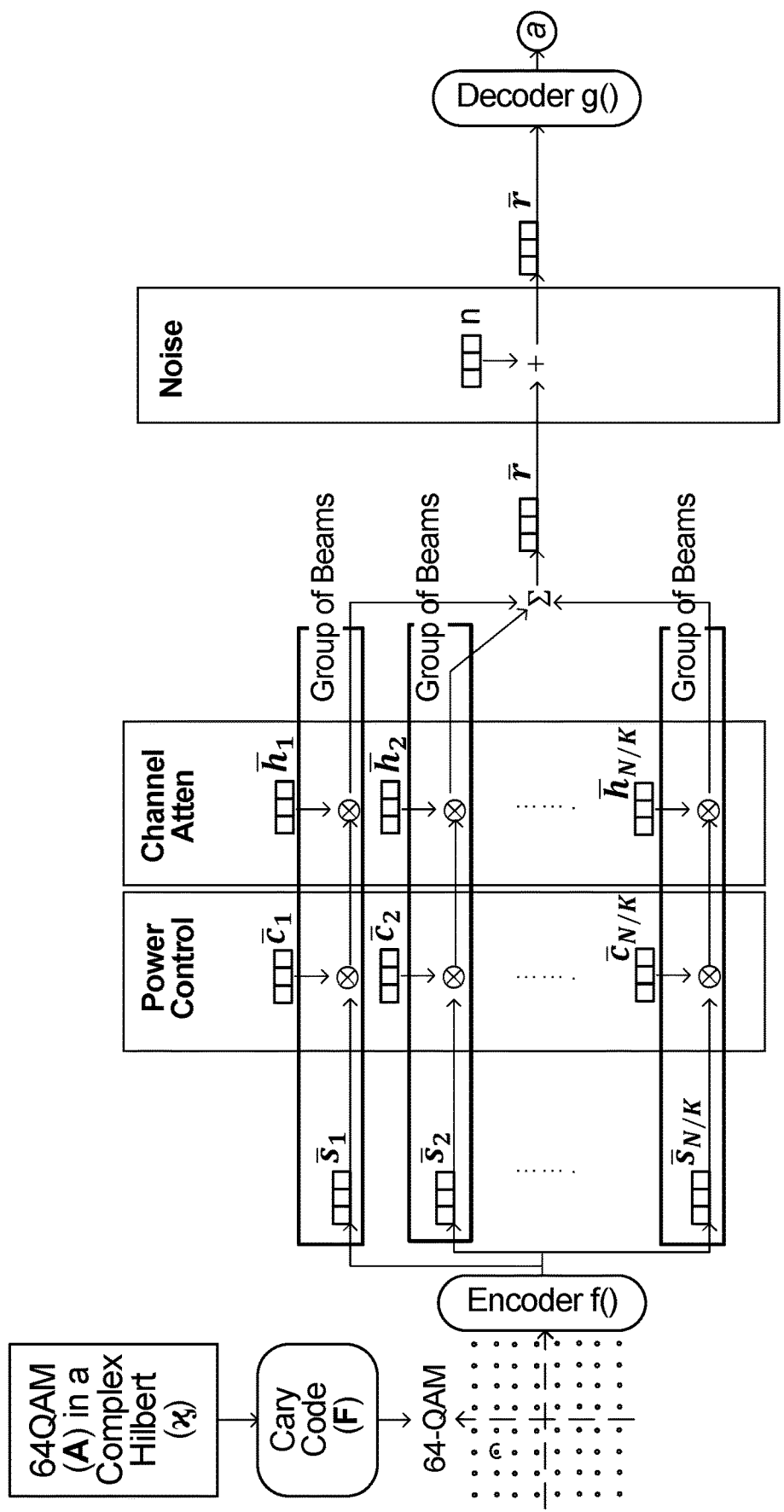
FIG. 16 is a block diagram depicting an example transmission of one 64 QAM using the transmitter and receiver of FIG. 15.

Using the previous example of FIG. 16, a transmitter would like to transmit one 64QAM symbol to a receiver. It knows that the receiver has 3 independent receiving antennas. The transmitter has a very large number of the beams available for this transmission. It is known that repetition or other linear expansion from 1 symbol to 3 over N beams would bring about no more than power gain (EGC) gain in an equal-attenuated AWGN channel. It would be desirable to find a symbol-level coding scheme that can achieve maximum coding gain in addition to EGC gain in an equal-attenuation K-dimensional AWGN channel.

Power Control Problem

Another problem concerns setting the power control on N beams in a context where there are varying attenuations and time offsets. An attenuation (h) over one beam is composed of three components: static ($h_s$), dynamic uncertainty ($\Delta h_d$) and mismatch uncertainty ($\Delta' h_m$): $h = h_s + \Delta h_d + \Delta' h_m$. The static component has a strong correlation with a terminal's spatial position and surrounding characteristics, for example buildings, trees, mountains, some fixture environmental factors. $\Delta h_d$ is mainly due to the random events such as mobility and blockage, a random jitter over $h_s$. $\Delta' h_m$ is an inevitable measurement uncertainty, a random jitter over $\Delta h_d$. It can be assumed that the jitters $\Delta h_d$ and $\Delta' h_m$ are less significant than $h_s$. Dynamic power control over N beams can be used to compensate for the varying attenuation uncertainties. The power controls can be tracked and adapted but with significant coding gain. The problem model is:

$$r_k' = \sum_{i=1}^{N/K} s_{i,k} \cdot c_{i,k} \cdot h_{i,k} + n_k \quad \text{i.e.} \quad \vec{r}' = \sum_{i=1}^{N/K} \vec{s}_i \otimes \vec{c}_i \otimes \vec{h}_i + \vec{n}$$

($\otimes$ is element-wise multiplier)

An overall solution addresses both the coding problem and the power control problem, and can be divided into the sub-tasks:

First task: Given a ϰ, A, F, N, K and static attenuation $\vec{h}_{s\_s} = [h_{s_1}, h_{s_2}, \ldots h_{s_N}]$, find a codec, f(·) and g(·) to deliver the maximum coding gain and find a power control $[c_1, c_2, \ldots c_N]$ to compensate for the static attenuation.

Second task: Given a time-varying attenuation ($\overrightarrow{\Delta h_d} + \overrightarrow{\Delta' h_m}$, $\overrightarrow{\Delta h_d} = [\Delta h_{d_1}, \Delta h_{d_2}, \ldots \Delta h_{d_N}]$, $\overrightarrow{\Delta' h_m} = [\Delta' h_{m_1}, \Delta' h_{m_2}, \ldots \Delta' h_{m_N}]$, dynamically adjust the power control $\vec{C} = [c_1, c_2, \ldots c_N]$ to compensate for the dynamic attenuation without changing g(·).

It is important to keep the same decoder g(·) for the time-varying channel attenuation and SNR for high throughput and short latency.

Continuing with the previous example, a base-station would like to transmit one 64QAM symbol to a receiver. It knows that the receiver has 3 receiving antennas that it can take advantage. The base-station has a very large number N of beams available for this transmission. The channel attenuations over the N beams are not equal and they are time-varying random variables. The base station may estimate the distributions of the channel attenuations; the conventional view would be that this would only be possible by transmitting pilots. However, this would require a large number of pilots in a system with large dimensionality. It would be advantageous to avoid transmission of large numbers of pilots.

A third problem concerns how to get the codec, f(·) and g(·) and power control $\vec{C}$ =[$c_1$, $c_2$, ... $c_N$] in terms of time varying channel attenuation $\overline{\Delta h}_d + \overline{\Delta' h}_m$ and given ⋊, A, F, N, K, and static attenuation $\vec{h}_s$ =[$h_{s_1}$, $h_{s_2}$, ... $h_{s_N}$]. Machine learning techniques can be used, but time-consuming back propagation algorithms are impractical for real-time communication in mmWAVE applications.

Another problem with the above described example is that targeted receivers need to be updated, and there is not a practical efficient way to do this. This involves transmitting the new coefficients of g( ) to the receivers again, which consumes significant radio resources.

Decomposer and Recomposer

To investigate the pure coding gain problem, an equal-attenuated K-dimensional AWGN channel condition is considered firstly, i.e. channel attenuation $\vec{H}$ =[$h_1$, $h_2$, ... $h_N$]≡1 as a constant 1+0j. AWGN noise is added on the $$r_k' : r_k' = \sum_{i=1}^{N/K} s_{i,k} + n_k.$$

For the purpose of the comparison and practical implementation, $r_k'$ is normalized as:

$$r_k' = \frac{\sum_{i=1}^{N/K} s_{i,k}}{\left\| \sum_{i=1}^{N/K} s_{i,k} \right\|} + n_k,$$

to make sure that the average energy of $$\frac{\sum_{i=1}^{N/K} s_{i,k}}{\left\| \sum_{i=1}^{N/K} s_{i,k} \right\|}$$

is 1/K, so that the average energy of $\vec{r}'$ =[$r_1'$, $r_2'$ ..., $r_K'$] is 1 (=1/K*K).

Figure 17:
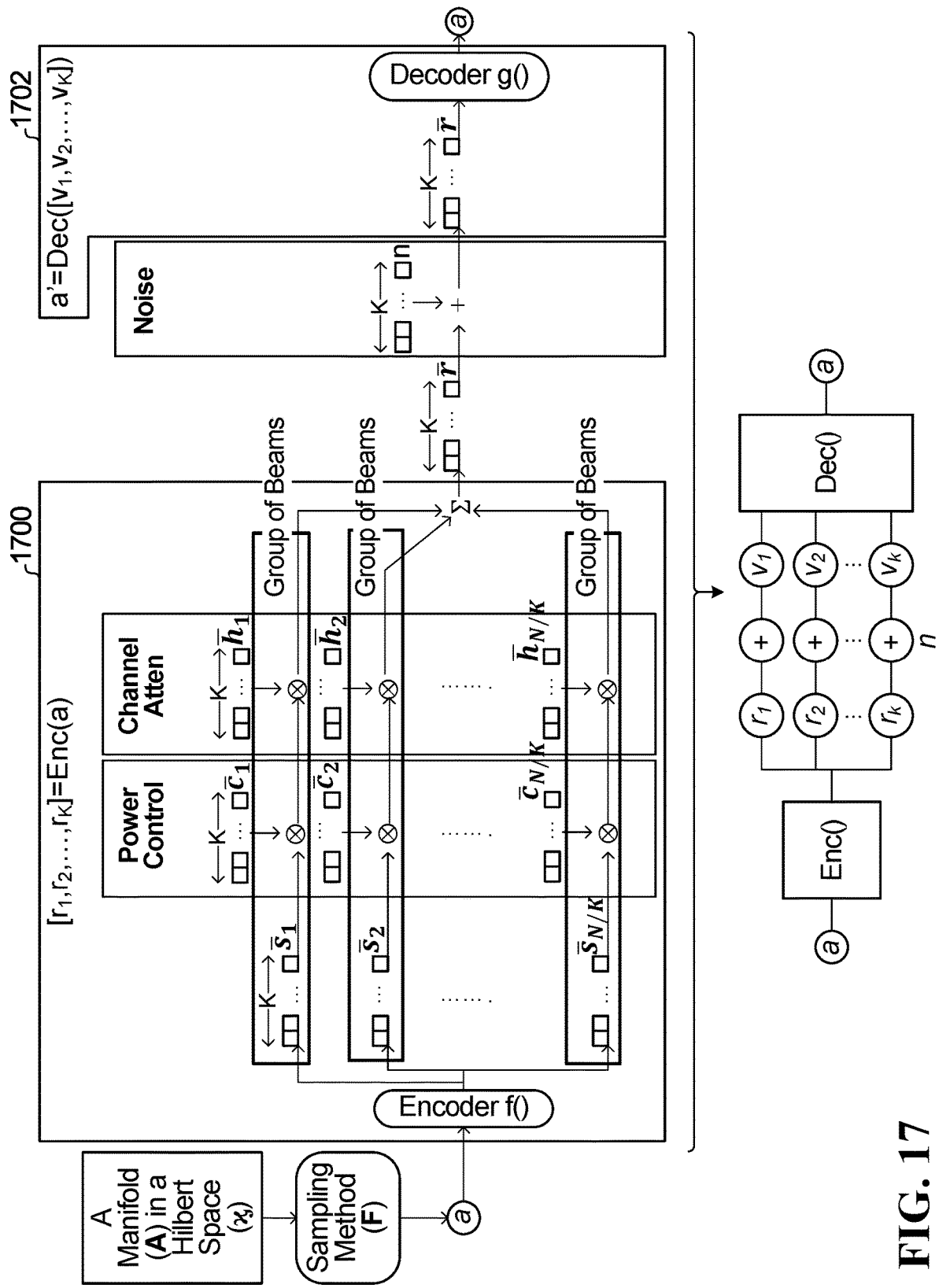
FIG. 17 is a block diagram illustrating a high-level view of a transceiver.

Referring now to FIG. 17, the encoder f(·) and N beams can be viewed as a black box encoder 1700; this black box encoder inputs one symbol a and outputs a K-element complex vector $$\vec{v} = \left[ v_1 = \frac{\sum_{i=1}^{N/K} s_{i,1}}{\left\| \sum_{i=1}^{N/K} s_{i,1} \right\|}, v_2 = \frac{\sum_{i=1}^{N/K} s_{i,2}}{\left\| \sum_{i=1}^{N/K} s_{i,2} \right\|}, \ldots, v_k = \frac{\sum_{i=1}^{N/K} s_{i,K}}{\left\| \sum_{i=1}^{N/K} s_{i,K} \right\|} \right]$$

with an average energy of 1. After being combined with white noise n in terms of Es/N0, $\vec{r}'$ =[$r_1'$, $r_2'$, ... $r_K'$]=$\vec{v}$ + $\vec{n}$ is output to the decoder g(·). From this perspective, one symbol a is encoded into K $v_k$. Following the previous detailed example, one 64QAM symbol may be encoded into 3 complex symbols. Also shown is black box decoder 1702.

In some prior art systems (such as those that use MIMO precoding) $\vec{v}$ =f(a)=w·a, where w is K-by-1 encoder matrix. In an AWGN channel condition, this linear combination has no coding gain but does deliver a power (EGC) gain (10*log 10(K) dB). A coding gain exists when a set of symbols is encoded into a set of 2K complex values. This is a channel coding scheme. However, the focus here is on encoding one symbol over multiple dimensions.

Figure 18:
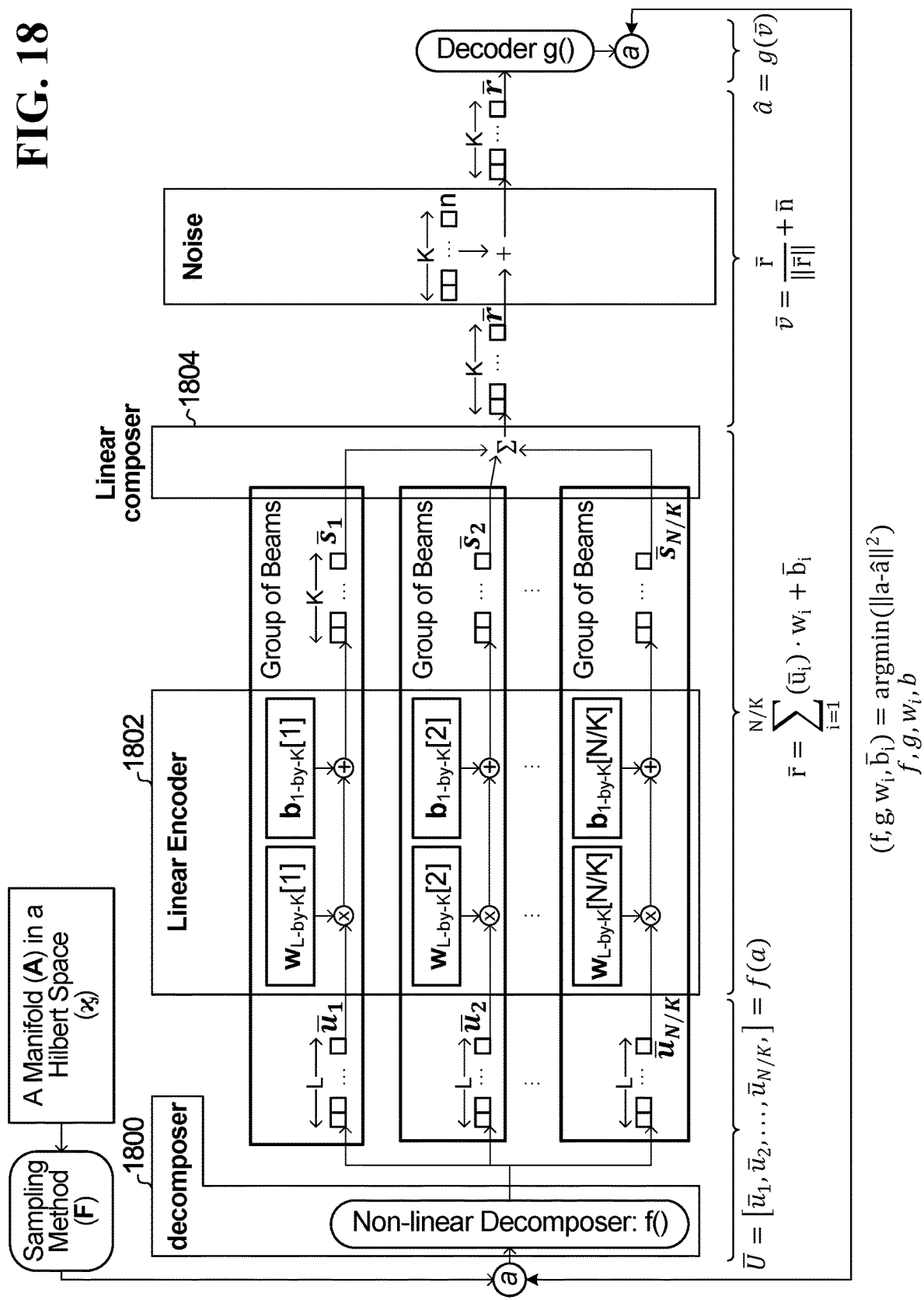
FIG. 18 is a block diagram depicting a deep neural network formed by a transceiver comprising a three stage encoder.

Referring now to FIG. 18, the black box "encoder" of FIG. 17 is divided into three stages: non-linear decomposer 1800, linear encoder 1802, and linear composer 1804, based on two notions:

the symbol a is considered as an information carrier rather than information itself. In prior art approaches, the transceiver uses all means to maximize the received signal power of the symbol a. As a result, the traditional transceiver has power gain. However, in the system described herein, the focus is instead information-oriented, where emphasis is placed on the information carried by the symbol a at the receiver side, because the decoder g( ) can do decoding.

the K-element $\vec{v}$ =[$v_1$, $v_2$, ... $v_K$] is viewed as a K-dimensional atomic entity rather than a divisible vector composed of the K complex elements. In prior art systems, a decoder is a redundancy reducer that recovers or deduces the symbol a from $\vec{r}$ =[$r_1'$, $r_2'$, ... $r_K'$].

Based on the two notions, encoder f(·) is a decomposer that extracts N/K features $\vec{U}$ =[$\vec{u}_1$, $\vec{u}_2$, ..., $\vec{u}_{N/K}$] from a symbol a. Each feature is an L dimensional complex entity: $\vec{u}_i$ =[$u_{i,1}$, $u_{i,2}$, ... $u_{i,L}$]. The function f(·) is a non-linear function implemented by a machine learning block. In a specific example, the machine learning block is a deep neural network with specific kernels and non-linear activation like ReLU, Sigmoid, and so on. The machine learning block, e.g. Deep neural network, f(·) is open for individual implementations given different ⋊ (Hilbert Space), A (manifold), and F (sampling method), N (number of uncorrelated transmission dimensions) and K (number of uncorrelated receiving dimensions).

After the encoder f( ) dissembles one symbol a into N/K L-dimensional entities $\vec{U}$, each entity is encoded by its own linear code independently (in parallel):

$$\vec{s}_i = (\vec{u}_i) \cdot w_i + \vec{b}_i$$

where $w_i$ is a L-by-K complex matrix and $\vec{b}_i$ is a 1-by-K complex matrix. The result $\vec{s}_i$ is a K-dimensional complex entity: $\vec{s}_i$ =[$s_{i,1}$, $s_{i,2}$, ... $s_{i,K}$]. In total, we have N/K K-dimensional complex entities: $\vec{S}$ =[$\vec{s}_1$, $\vec{s}_2$, ..., $\vec{s}_{N/K}$].

An N-beam transmitter recomposes N/K K-dimensional complex entities into one $\vec{r}$ =[$r_1$, $r_2$, ..., $r_k$] simply by a summation:

$$\vec{r} = \sum_{i=1}^{N/K} \vec{s}_i$$

After the normalized $\vec{r} = [r_1, r_{21}, \ldots, r_K]$ and added noise, the unitary $$\vec{v} = [v_1, v_2, \ldots v_K] = \hat{v} = \frac{\vec{r}}{\|\vec{r}\|} + \vec{n}$$

is input to the decoder g(·) to estimate â. The g(·) is a machine learning block, such as a deep neural network with specific kernels and non-linear activation like ReLU, Sigmoid, and so on. The machine learning block g(·) is open for individual implementation, given different ℋ (Hilbert Space), A (manifold), and F (sample method), N (number of uncorrelated transmission dimensions) and K (number of uncorrelated receiving dimensions). In FIG. 18, the overall procedure in AWGN channel is:

$$\begin{cases} U = [\vec{u}_1, \vec{u}_2, \ldots, \vec{u}_{N/K}] = f(a) \\ \vec{r} = \sum_{i=1}^{N/K} (\vec{u}_i) \cdot w_i + \vec{b}_i \\ \vec{v} = \frac{\vec{r}}{\|\vec{r}\|} + \vec{n} \\ \hat{a} = g(\vec{v}) \end{cases}$$

Figure 19:
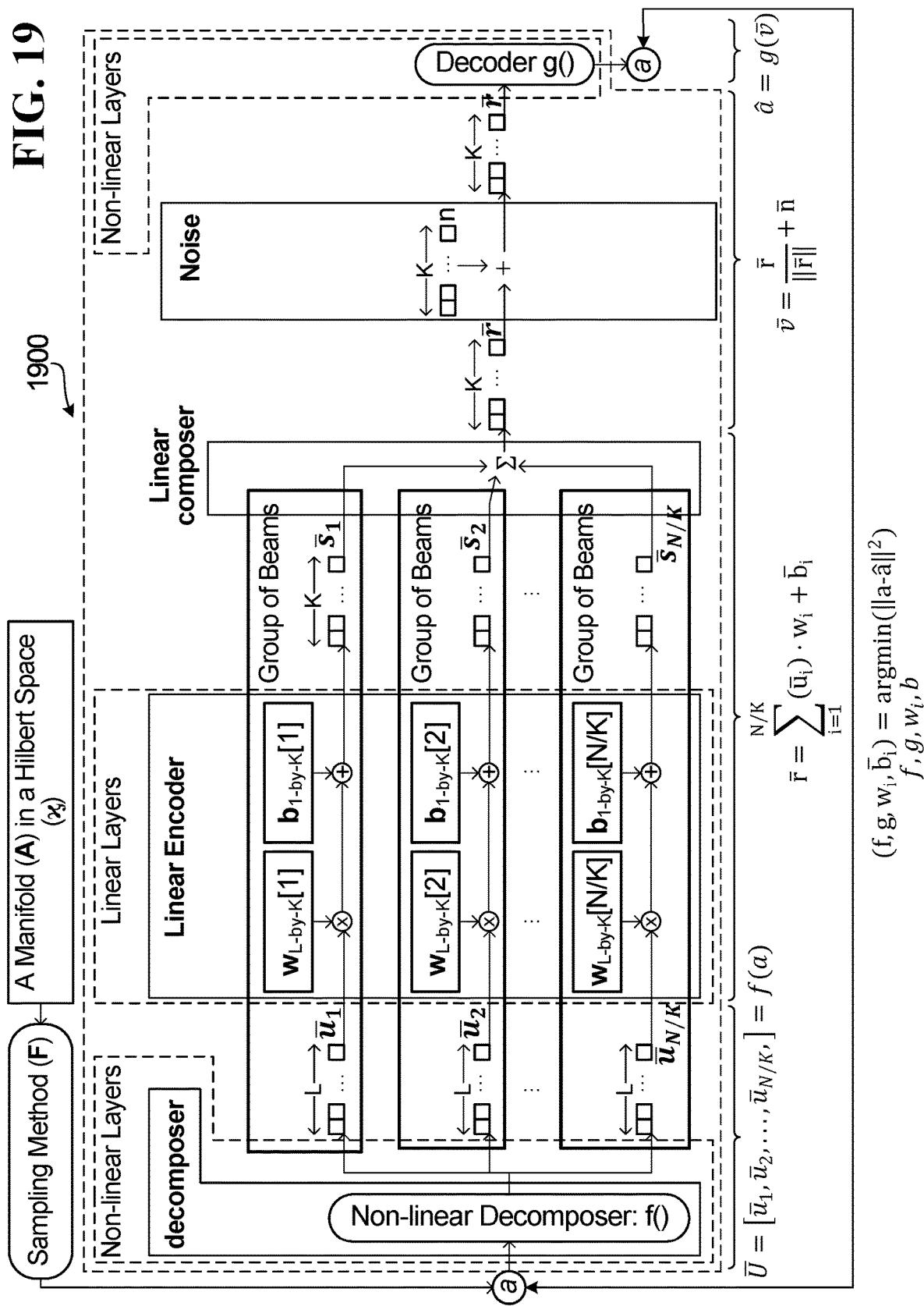
FIG. 19 is a block diagram depicting the linear and non-linear layers of a linear/non-linear hybrid deep neural network.

The overall procedure can be viewed as one complete deep neural network 1900 as depicted in FIG. 19. Input samples a are sampled from a given ℋ (Hilbert Space), A (manifold), and F (sample method), N (number of uncorrelated transmission dimensions) and K (number of uncorrelated receiving dimensions). Encoder f(·) and decoder g(·) are the non-linear layers of this deep neural network. $w_i$ and $\vec{b}_i$ are linear layers of this deep neural network. The training loss or reward is to minimize the square error (MSE):

$$(f, g, w_i, \vec{b}_i) = \underset{f,g,w,b}{\operatorname{argmin}}(\|a - \hat{a}\|^2).$$

The neural network is differentiable. In this embodiment, gradient-descend back propagation is used to tune f(·) layers, g(·) layers, $w_i$ layer and $\vec{b}_i$ layer to approach the MSE optimal point.

Since f(·) and g(·) are non-linear neural network layers and $w_i$ and $\vec{b}_i$ are linear layers, this deep neural network is a linear/non-linear hybrid neural network architecture, different from traditional non-linear deep neural networks. The linear layers ($w_i$ and $\vec{b}_i$) are used to assist f(·) and g(·) in being more tolerant to varying channel conditions and noise levels.

Embodiment 2—Weighting the Outputs

In this embodiment, various approaches to weighting the outputs of the linear encoder are provided, with the objective of increasing the amount of useful information transmitted to the receiver.

Referring again to FIG. 18, in the set of the decomposed N/K features $\vec{U} = [\vec{u}_1, \vec{u}_2, \ldots, \vec{u}_{N/K}]$, not every $\vec{u}_i$ is equally important. Some features would be more important than others in the sense that they carry more essential information than others for the receiver g( ) to recover the transmitted information. The distribution of the importance depends on the given ℋ (Hilbert Space), A (manifold), and F (sample method), N (number of uncorrelated transmission dimensions) and K (number of uncorrelated receiving dimensions). It is hard to segregate out the more important features.

In the above described embodiment, the convergence is $$\hat{r} = \sum_{i=1}^{N/K} \vec{s}_i,$$

which implies that the features are being combined in an equal way or equally importantly. In another embodiment, the system is modified so as to allow for less emphasis to be placed on these less important features and more emphasis to be placed on the more important features.

For this embodiment, an additional power control vector $\vec{C} = [c_1, c_2, \ldots c_N]$ is introduced, and in a specific embodiment, this is simplified to include one power control factor (real-value) per feature: $\vec{C} = [c_1, c_2, \ldots c_{N/K}]$. When the power control vector has a larger value for a given feature, relatively more emphasis is placed on that feature, whereas when the power control vector has a smaller value for a given feature, relatively less emphasis is placed on that feature. Then the convergence becomes $$\hat{r} = \sum_{i=1}^{N/K} c_i \cdot \vec{s}_i \text{ and } \sum_{i=1}^{N/K} c_i \leq N/K.$$

Figure 20:
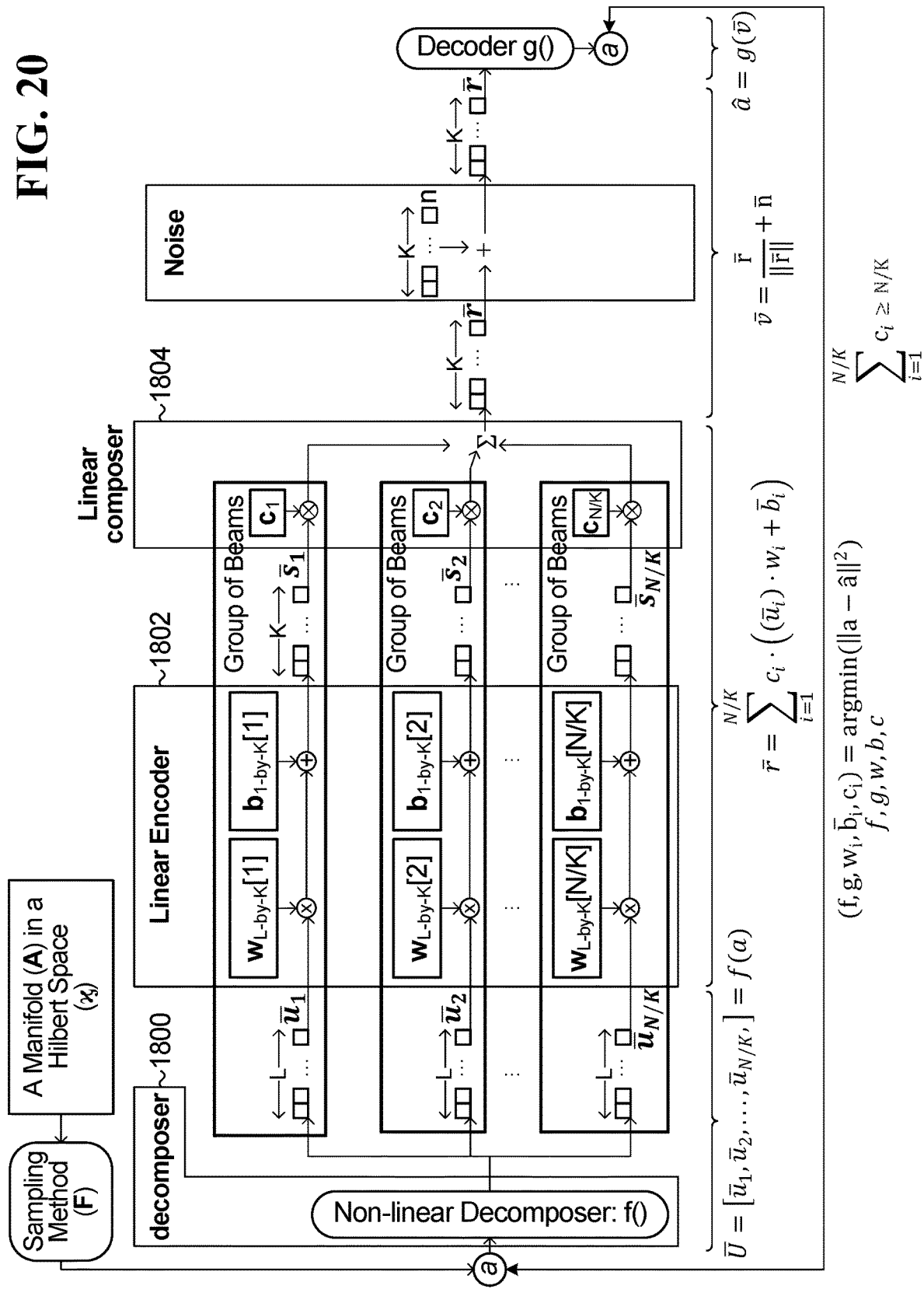
FIG. 20 is a block diagram depicting a deep neural network with power control.

An example implementation is shown in FIG. 20, which is the same as FIG. 18, except that whereas in FIG. 18 the linear composer did not apply any weighting, such that the composed function was the sum of the inputs, in FIG. 20, the set of weights from the power control vector: $\vec{C} = [c_1, c_2, \ldots c_{N/K}]$ are applied to the outputs of the linear encoder 1802.

Therefore, in FIG. 20, the overall procedure can be summarized by:

$$\begin{cases} U = [\vec{u}_1, \vec{u}_2, \ldots, \vec{u}_{N/K}] = f(a) \\ \vec{r} = \sum_{i=1}^{N/K} c_i \cdot ((\vec{u}_i) \cdot w_i + \vec{b}_i) \\ \vec{v} = \frac{\vec{r}}{\|\vec{r}\|} + \vec{n} \\ \hat{a} = g(\vec{v}) \end{cases}$$

The goal is to determine $$(f, g, w_i, \vec{b}_i, c_i) = \underset{f,g,w,b,c}{\operatorname{argmin}}(\|a - \hat{a}\|^2)$$

with a training constraint $$\sum_{i=1}^{N/K} c_i \leq N/K.$$

How well power control works mostly depends on the given ℋ (Hilbert Space), A (manifold), and F (sampling method). If the samples concentrate into one area of the space ℋ, $\vec{C} = [c_1, c_2, \ldots c_{N/K}]$ would be relatively static and easy to be trained. If the samples disperse onto one "wider" area of the space ℋ, $\vec{C} = [c_1, c_2, \ldots c_{N/K}]$ would be dynamic, leading to difficulty or longer time in training.

In wireless systems, it is better if the samples are widely dispersive; a larger average distance among the samples performs better against the noise. The distribution of the feature importance may be dramatically varying from one sample (symbol) to another.

Third Embodiment—Virtual User

In accordance with another embodiment, the system is further modified to implement a virtual user such that in effect, rather than directing the entire output to a single receiver, the outputs of linear encoding $\vec{s}_i$ are split as between a true user and the virtual user by using different power control vectors for the true user and the virtual user. The system is trained to direct the more important features (also referred to herein as "useful" information) to the true user and less important features (also referred to herein as "useless" information) to the virtual user by appropriately setting the two power control vectors.

Weighted encoder outputs $\alpha_i \cdot \vec{s}_i$ are sent to the true user and weighted encoder outputs $\beta_i \cdot \vec{s}_i$ are sent to the "virtual" user. The two users share the power: $\alpha_i + \beta_i = c_i$. If $\vec{s}_i$ carries more important information about the symbol a, then $\alpha_i > \beta_i$; otherwise, $\alpha_i < \beta_i$. The original power control vector in the case can be set to $\vec{C} = [c_1, c_2, \ldots c_{N/K}] \equiv 1$. Every $\vec{s}_i$ has two connections: one connection with the true user with a power control real factor $\alpha_i$ and another with the virtual user with a power control real factor $1 - \alpha_i$. With this setting of the original power control vector, $$\sum_{i=1}^{N/K} \alpha_i \leq N/K.$$

is satisfied.

The overall system can be summarized as follows:

$$\begin{cases} \vec{U} = [\vec{u}_1, \vec{u}_2, \ldots, \vec{u}_{N/K}] = f(a) \\ \vec{r}_{true} = \sum_{i=1}^{N/K} \alpha_1 \cdot ((\vec{u}_i) \cdot w_i + \vec{b}_i) \\ \vec{r}_{virtual} = \sum_{i=1}^{N/K} (1 - \alpha_i) \cdot ((\vec{u}_i) \cdot w_i + \vec{b}_i) \\ \vec{v} = \frac{\vec{r}_{true}}{\|\vec{r}_{true}\|} + \vec{n} \\ \hat{a} = g(\vec{v}) \end{cases}$$

Figure 21A:
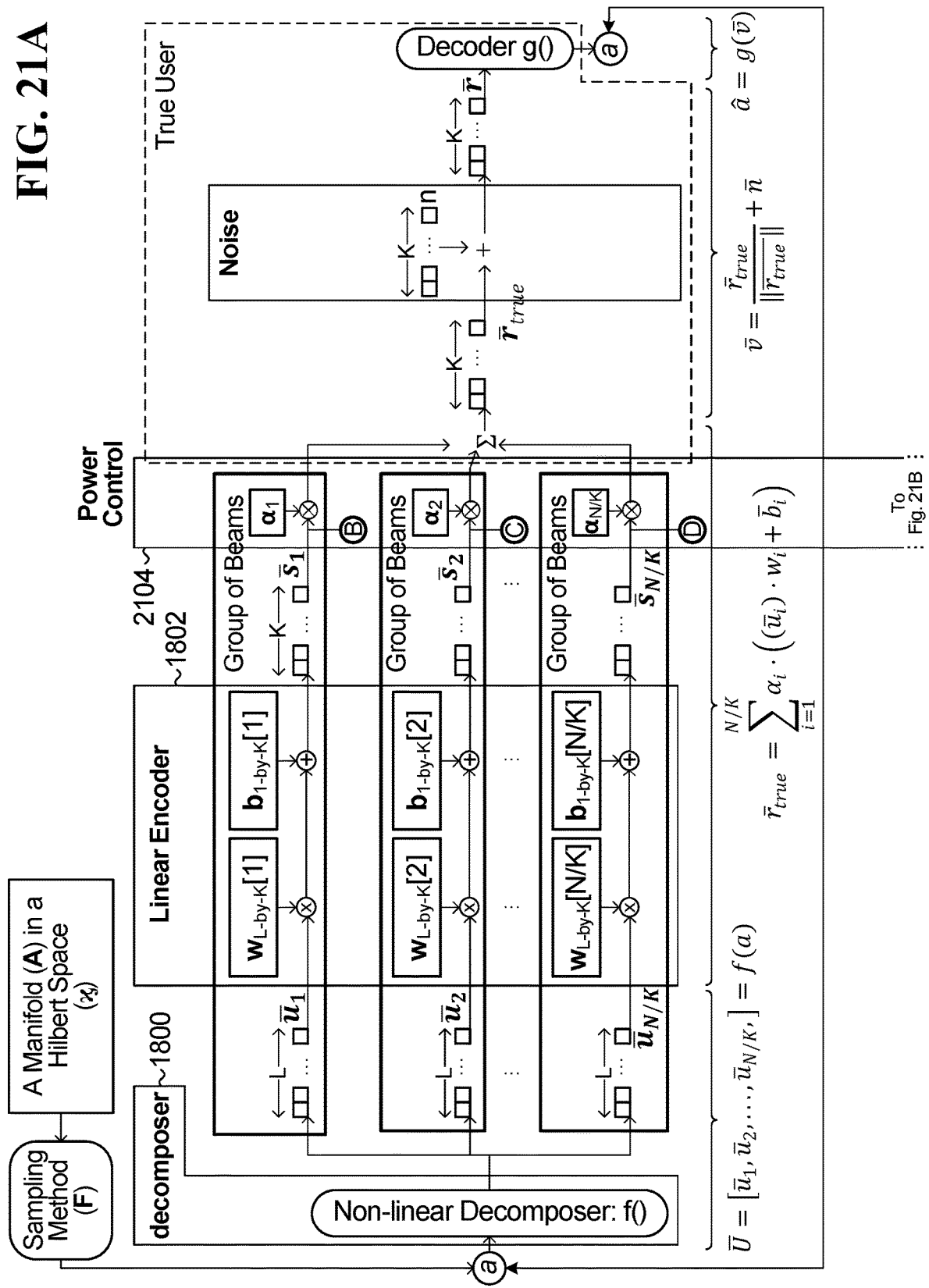
FIG. 21A is a block diagram depicting the reception of "useless" combinations by a virtual user.
Figure 21B:
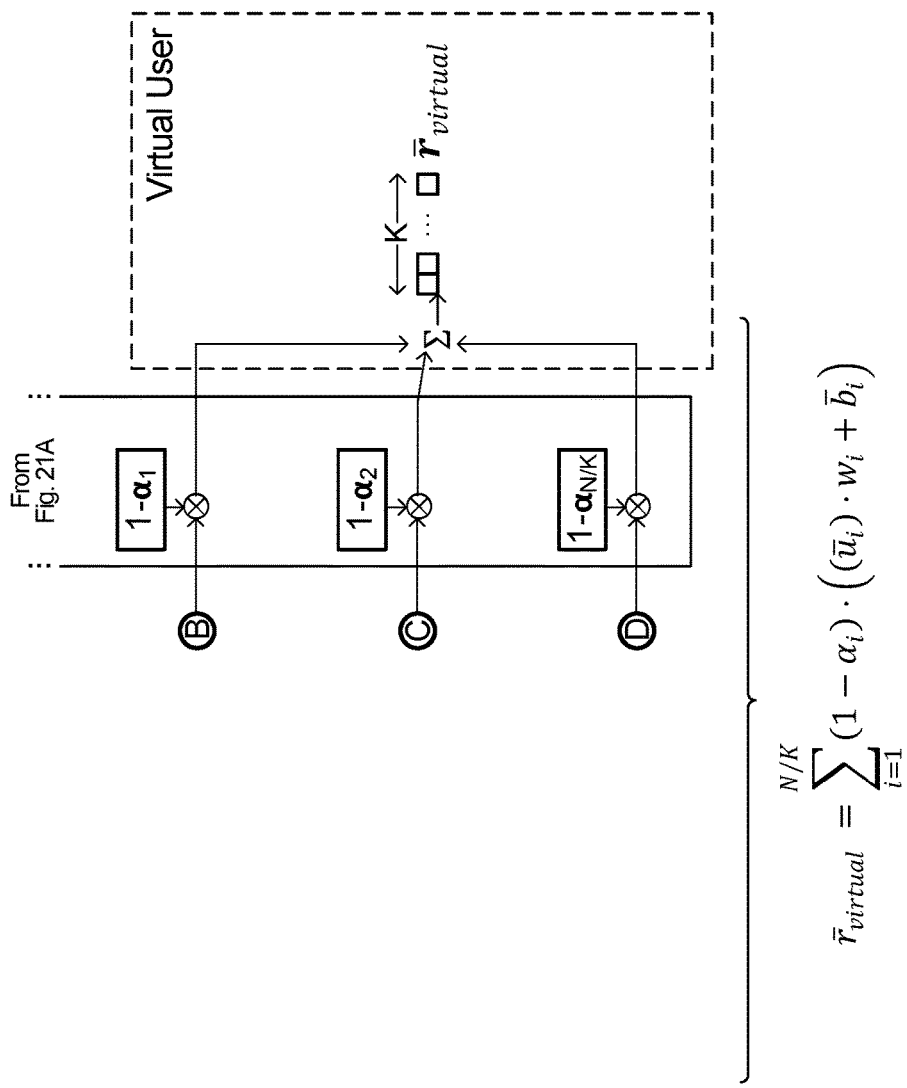
FIG. 21B is a block diagram depicting the reception of "useless" combinations by a virtual user.

FIGS. 21A and 21B together are a block diagram of such a system. FIGS. 21A and 21B are closely based on FIG. 20, but in place of linear composer 1804, there is a power control block 2104 which applies the weights $\alpha_i$ to the outputs of the linear encoder 1802 to produce the outputs directed to the true user, and applies the weights $\beta_i$ to the outputs of the linear encoder 1802 to produce the outputs directed to the virtual user.

Note that the outputs to the virtual user are not in fact transmitted. The virtual user is constructed to assist with the optimization and training.

Having constructed such a system, the goal is to train the system to determine $$(f, g, w_i, \vec{b}_i, c_i) = \underset{f,g,w,b,c}{\operatorname{argmin}}(\|a - \hat{a}\|^2)$$

with a training constraint $\alpha_i \leq 1$. If the traditional Gradient Descendent back propagation is employed, $$\vec{r}_{virtual} = \sum_{i=1}^{N/K} (1 - \alpha_i) \cdot ((\vec{u}_i) \cdot w_i + \vec{b}_i)$$

is NOT embodied in the training.

In accordance with an embodiment of the disclosure, the training is composed of two sub-trainings:

Gradient Descendent back propagation for (f, g, $w_i$, $\vec{b}_i$);
message passing algorithm for $\alpha_i$. To meet $\alpha_i + \beta_i = 1$, use is made of the following softmax function:

$$\alpha_i = \frac{e^{d\left(\frac{\vec{r}_{true}}{\|\vec{r}_{true}\|}, \vec{s}_i\right)}}{e^{d\left(\frac{\vec{r}_{true}}{\|\vec{r}_{true}\|}, \vec{s}_i\right)} + e^{d\left(\frac{\vec{r}_{virtual}}{\|\vec{r}_{virtual}\|}, \vec{s}_i\right)}}$$

where $$d\left(\frac{\vec{r}_{true}}{\|\vec{r}_{true}\|}, \vec{s}_i\right)$$

is the metric distance between $\vec{r}_{true} = [r_1, r_2, \ldots r_K]$ and $\vec{s}_i = [s_{i,1}, s_{i,2}, \ldots s_{i,K}] = (\vec{u}_i) \cdot w_i + \vec{b}_i$, and $$d\left(\frac{\vec{r}_{virtual}}{\|\vec{r}_{virtual}\|}, \vec{s}_i\right)$$

is the distance between $\vec{r}_{virtual} = [r_1, r_2, \ldots, r_K]_{virtual}$ and $\vec{s}_i = [s_{i,1}, s_{i,2}, \ldots s_{i,K}] = (\vec{u}_i) \cdot w_i + \vec{b}_i$.

In order to minimize average metric distance between $$\frac{\vec{r}_{true}}{\|\vec{r}_{true}\|}$$

and $$\vec{s}_i: \sum_{i=1}^{N/K} \min\left(d\left(\frac{\vec{r}_{true}}{\|\vec{r}_{true}\|}, \vec{s}_i\right)\right),$$

the distance is defined as the inner product between $$\frac{\vec{r}_{true}}{\|\vec{r}_{true}\|}$$

and $$\vec{s}_i: d\left(\frac{\vec{r}_{true}}{\|\vec{r}_{true}\|}, \vec{s}_i\right) = \left\langle \frac{\vec{r}_{true}}{\|\vec{r}_{true}\|}, \vec{s}_i \right\rangle = \frac{\vec{r}_{true}}{\|\vec{r}_{true}\|} \cdot \vec{s}_i^H.$$

The following is an example of a message passing algorithm (MPA) that can be used to determine the weights:

Initialization:

$$\forall i: \alpha_1 = \frac{1}{2} \quad (1)$$

$$\vec{r}_{true} = \sum_{i=1}^{N/K} \alpha_i \cdot \vec{s}_i \quad (2.a)$$

$$\vec{r}_{virtual} = \sum_{i=1}^{N/K} (1-\alpha_i) \cdot \vec{s}_i \quad (2.b)$$

For iteration = 1:r $$\forall i: \alpha_1 = \frac{e^{\frac{\vec{r}_{true}}{\|\vec{r}_{true}\|} \cdot \vec{s}_i^H}}{e^{\frac{\vec{r}_{true}}{\|\vec{r}_{true}\|} \cdot \vec{s}_i^H} + e^{e \frac{\vec{r}_{virtual}}{\|\vec{r}_{virtual}\|} \cdot \vec{s}_i^H}} \quad (3)$$

$$\vec{r}_{true} = \sum_{i=1}^{N/K} \alpha_i \cdot \vec{s}_i \quad (4.a)$$

$$\vec{r}_{virtual} = \sum_{i=1}^{N/K} (1-\alpha_i) \cdot \vec{s}_i \quad (4.b)$$

End //of Iteration

Figure 22:
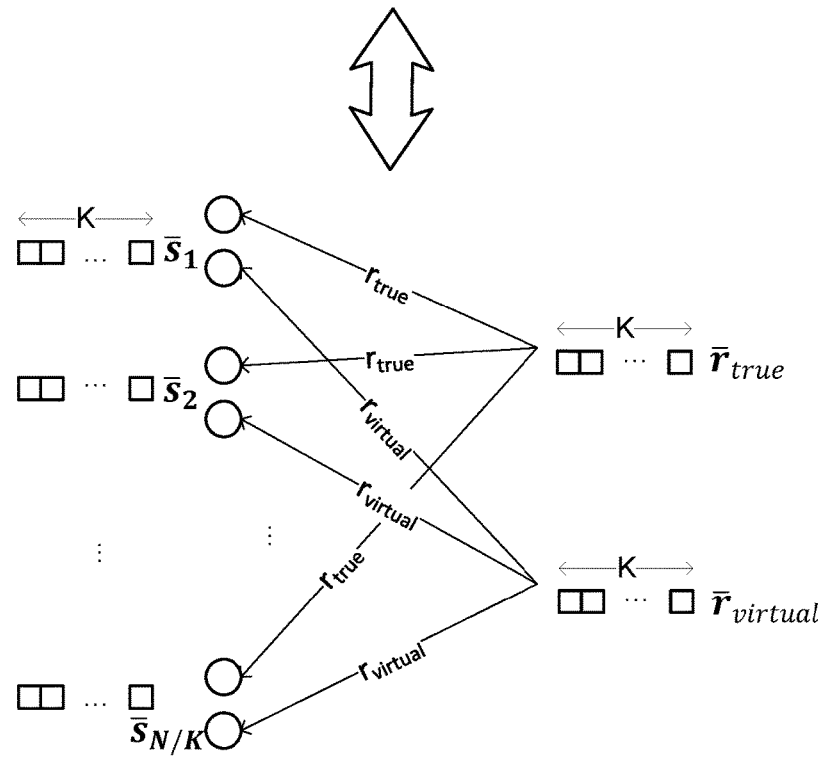
FIG. 22 is a block diagram illustrating the iterations of a Message Passing Algorithm (MPA) to train power factor.

This is depicted graphically in FIG. 22. The top part of FIG. 22 shows an iteration from N/K $\vec{s}_i$ nodes to two r nodes (true and virtual). At each $\vec{s}_i$ node, there are two inputs $\vec{r}_{true}$ and $\vec{r}_{virtual}$. Each $\vec{s}_i$ node computes $$\alpha_i = \frac{e^{\frac{\vec{r}_{true}}{\|\vec{r}_{true}\|} \cdot \vec{s}_i^H}}{e^{\frac{\vec{r}_{true}}{\|\vec{r}_{true}\|} \cdot \vec{s}_i^H} + e^{e\frac{\vec{r}_{virtual}}{\|\vec{r}_{virtual}\|} \cdot \vec{s}_i^H}},$$

the power weights, then transmits $\alpha_i \cdot \vec{s}_i$ to the true user and $(1-\alpha_i)\cdot \vec{s}_i$ to the virtual user. Note that all N/K $\vec{s}_i$-nodes do the same thing. However, their weights $\alpha_i$ are different, because their $\vec{s}_i$ are different. The bottom part of FIG. 22 shows an iteration from the two r nodes (true and virtual) to the N/K $\vec{s}_i$ nodes. The true r node sums all the $\alpha_i \cdot \vec{s}_i$ from the N/K $\vec{s}_i$-nodes, $$\vec{r}_{true} = \sum_{i=k}^{N/K} \alpha_i \cdot \vec{s}_i,$$

and transmits $\vec{r}_{true}$ back to all the N/K $\vec{s}_i$-nodes. The virtual r node sums all the $(1-\alpha_i)\cdot \vec{s}_i$ from the N/K $\vec{s}_i$ s-nodes, $$\vec{r}_{virtual} = \sum_{i=k}^{N/K} (1-\alpha_i) \cdot \vec{s}_i,$$

and transmits $\vec{r}_{virtual}$ back to all the N/K $\vec{s}_i$-nodes. Now, all the N/K $\vec{s}_i$ nodes get the updated $\vec{r}_{true}$ and $\vec{r}_{virtual}$ and then the entire process is repeated for multiple iterations.

This is a typical messaging passing algorithm. In one iteration, (3) is computed for all the groups in parallel at the transmission side. Then each transmission would adjust the power in term of the updated $\alpha_i$ and $(1-\alpha_i)$ and then update $\vec{r}_{true}$ and $\vec{r}_{virtual}$. In the next iteration. The updated $\vec{r}_{true}$ and $\vec{r}_{virtual}$ would be used to update all the $\alpha_i$ by (3). After r iterations, the resultant $\alpha_i$ is the power control factor.

This message passing algorithm is differentiable (because of softmax function in $$\forall i: \alpha_i = \frac{e^{\frac{\vec{r}_{true}}{\|\vec{r}_{true}\|} \cdot \vec{s}_i^H}}{e^{\frac{\vec{r}_{true}}{\|\vec{r}_{true}\|} \cdot \vec{s}_i^H} + e^{e\frac{\vec{r}_{virtual}}{\|\vec{r}_{virtual}\|} \cdot \vec{s}_i^H}}$$

so that it can be embedded into the deep neural network:

$$\begin{cases} \vec{U} = [\vec{u}_1, \vec{u}_2, \ldots, \vec{u}_{N/K}] = f(a) \\ \forall i: \vec{s}_i = (\vec{u}_i) \cdot w_i + \vec{b}_i \\ [\alpha_1, \alpha_2, \ldots \alpha_{N/K}] = iterative\ MPA(\vec{S} = [\vec{s}_1, \vec{s}_2, \ldots, \vec{s}_{N/K}]) \\ \vec{r}_{true} = \sum_{i=1}^{N/K} \alpha_i \cdot \vec{s}_i \\ \vec{v} = \frac{\vec{r}_{true}}{\|\vec{r}_{true}\|} + \vec{n} \\ \hat{a} = g(\vec{v}) \end{cases}$$

The goal is to determine $$(f, g, w_i, \vec{b}_i) = \underset{f,g,w,b}{\operatorname{argmin}}(\|a - \hat{a}\|^2).$$

Figure 23A:
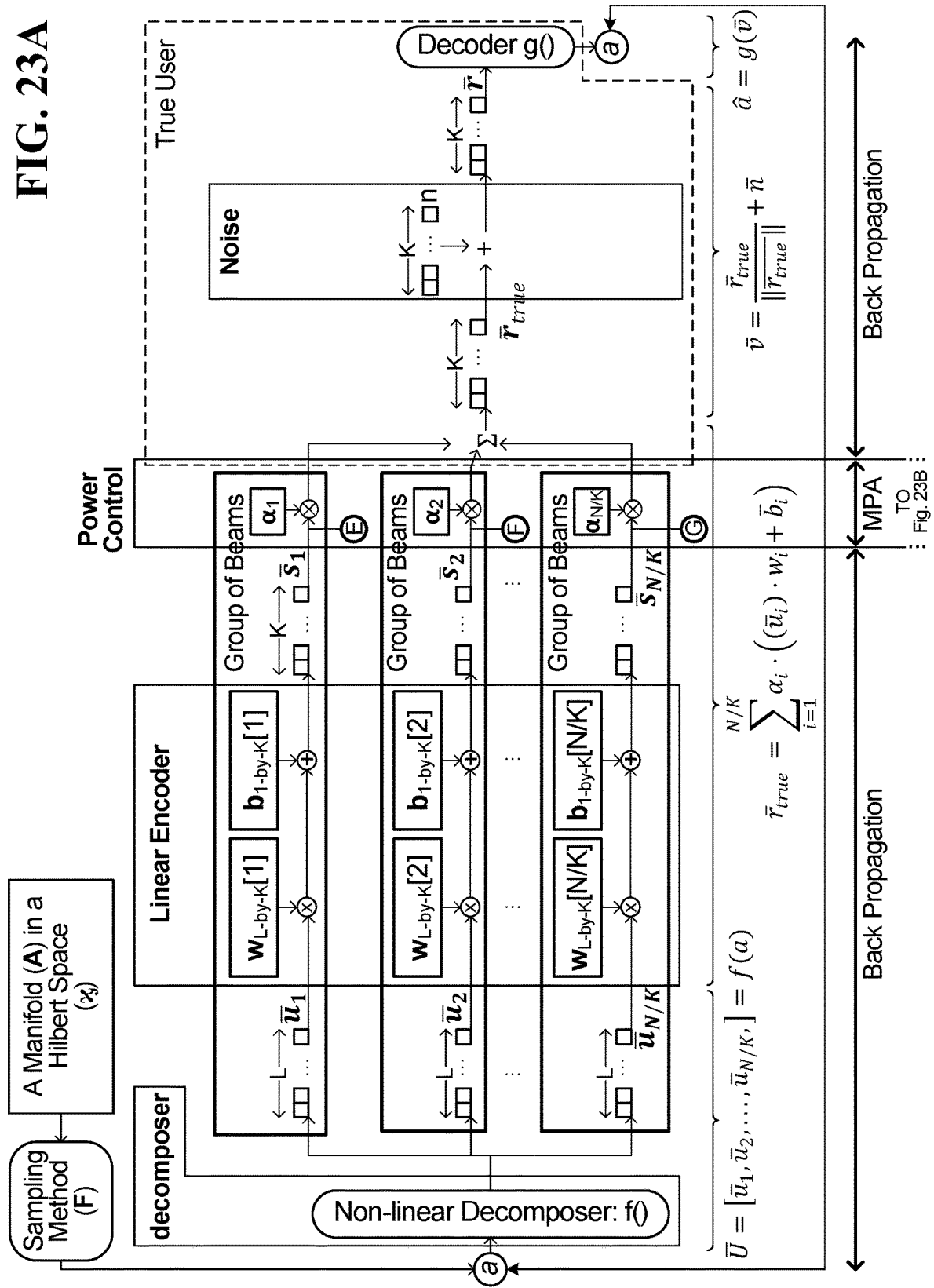
FIG. 23A is a block diagram illustrating an example configuration of Tandem Training wherein Back-Propagation tunes <f, g, w, b> and MPA tunes a (power ctrl vector)
Figure 23B:
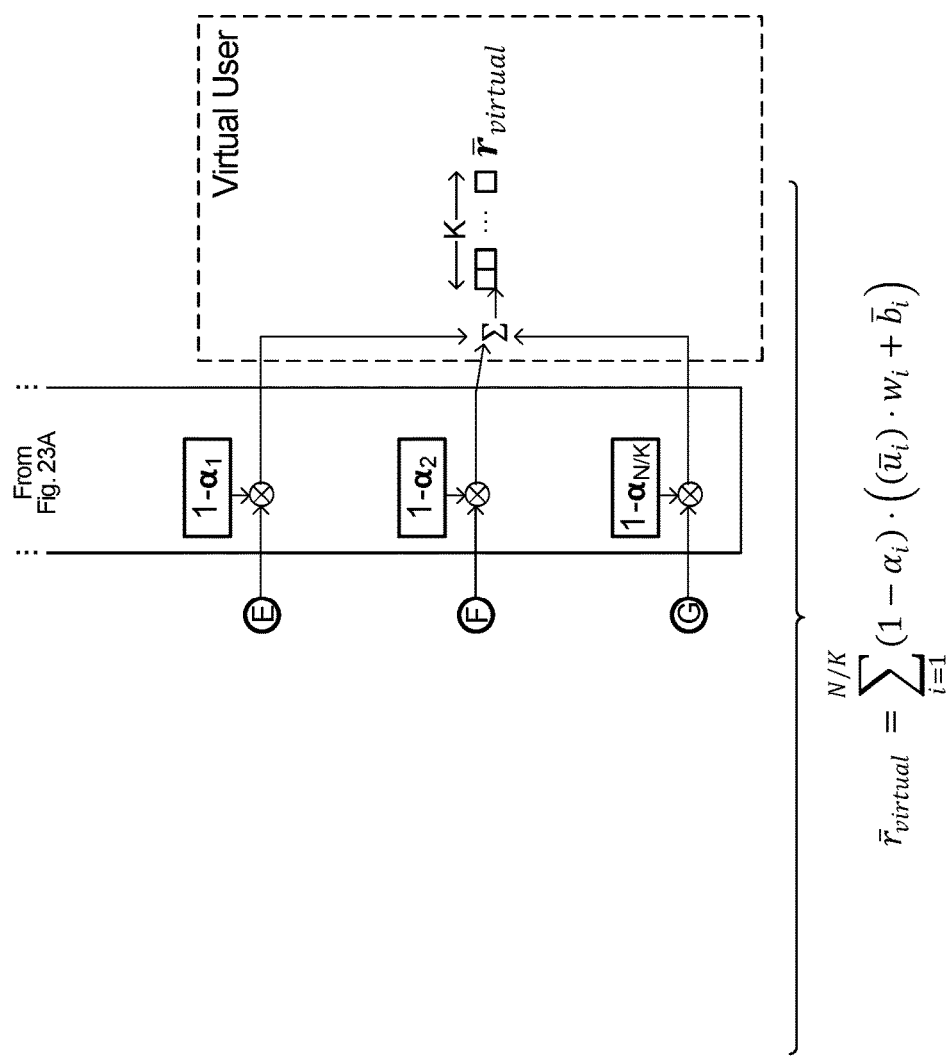
FIG. 23B is a block diagram illustrating an example configuration of Tandem Training wherein Back-Propagation tunes <f, g, w, b> and MPA tunes a (power ctrl vector)

For the gradient descendent back propagation, [$\alpha_1$, $\alpha_2$, ... $\alpha_{N/K}$] are constants. MPA trains the [$\alpha_1$, $\alpha_2$, ... $\alpha_{N/K}$] while treating f, g, w$_i$, $\vec{b}_i$ as constants. The tandem training methodologies are depicted in FIGS. 23A and 23B, which show the back propagation training and the MPA training.

Figure 24A:
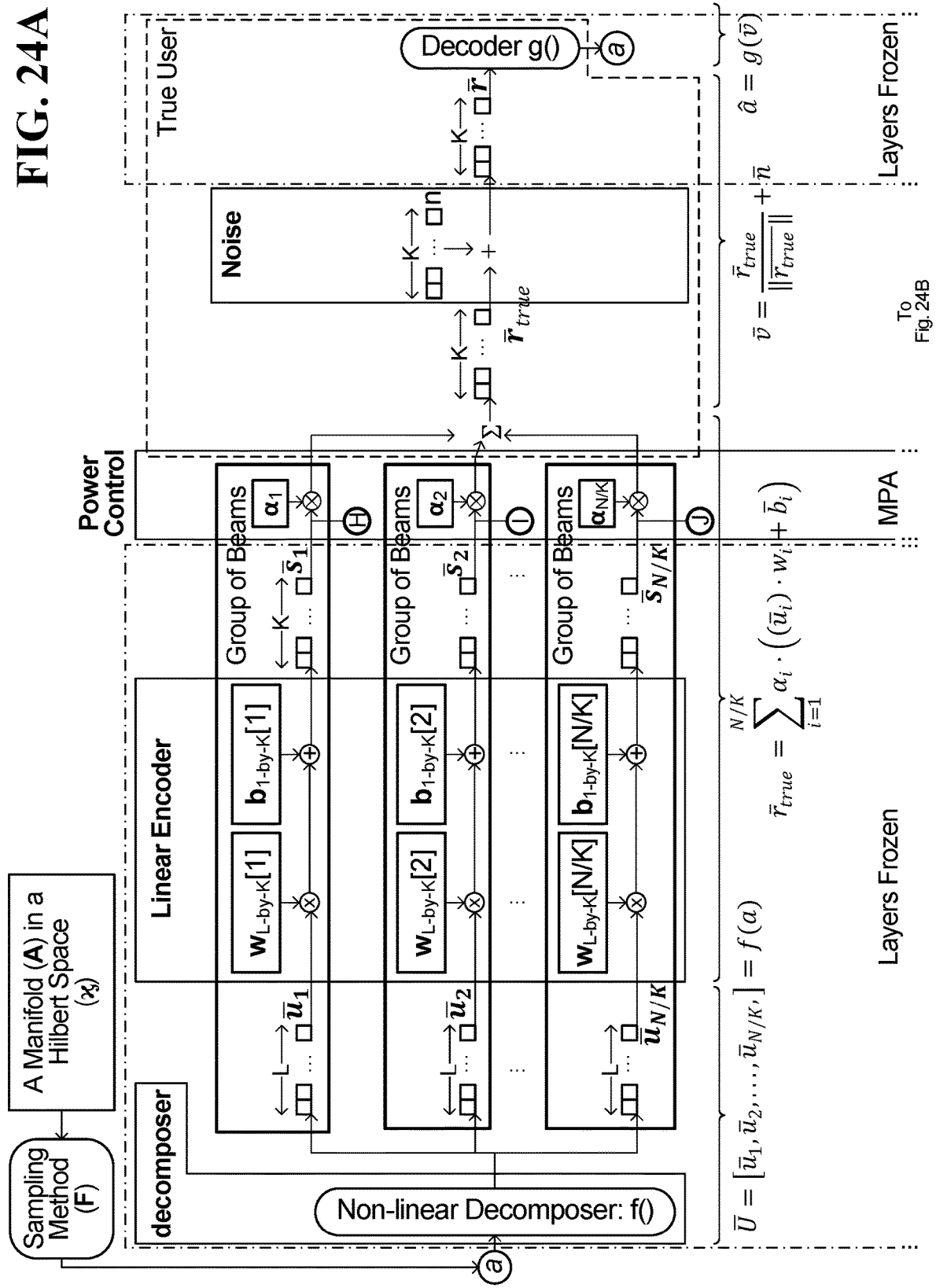
FIG. 24A is a block diagram depicting a transmission wherein the layers trained by back-propagation are frozen and layers by MPA are kept tuned.
Figure 24B:
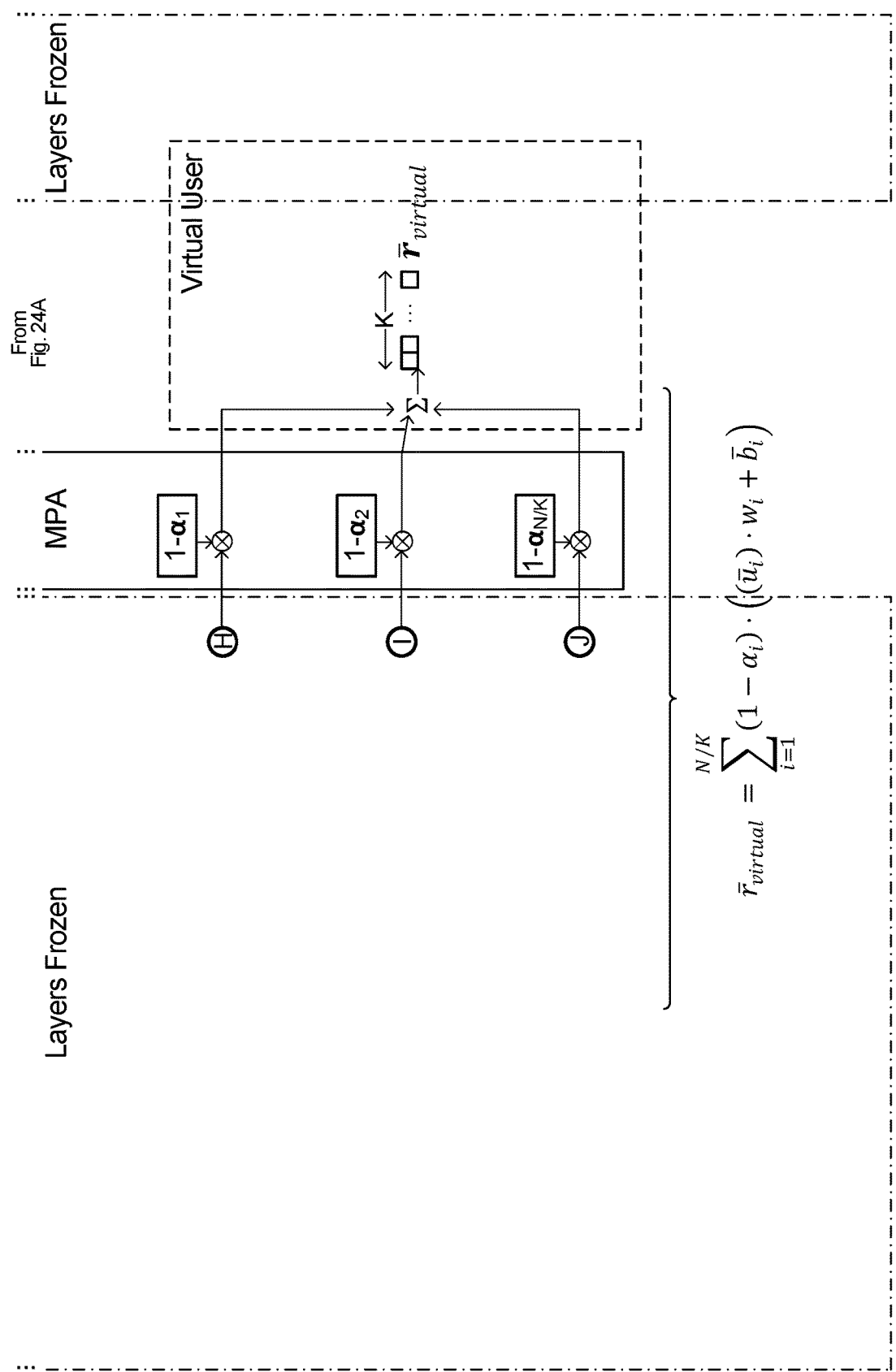
FIG. 24B is a block diagram depicting a transmission wherein the layers trained by back-propagation are frozen and layers by MPA are kept tuned.

The layers (f, g, w$_i$, $\vec{b}_i$) trained through back propagation assume fixed/frozen values for the power control layers ([$\alpha_1$, $\alpha_2$, ... $\alpha_{N/K}$]), and the layers ([$\alpha_1$, $\alpha_2$, ... $\alpha_{N/K}$]) trained through MPA (power control) assume fixed values for the layers (f, g, w$_i$, $\vec{b}_i$) trained through back propagation. In some embodiments, when transmitting, the power control layers are kept tuned on an ongoing basis, whereas the layers trained through back propagation are frozen, as depicted in FIGS. 24A and 24B.

Figure 25:
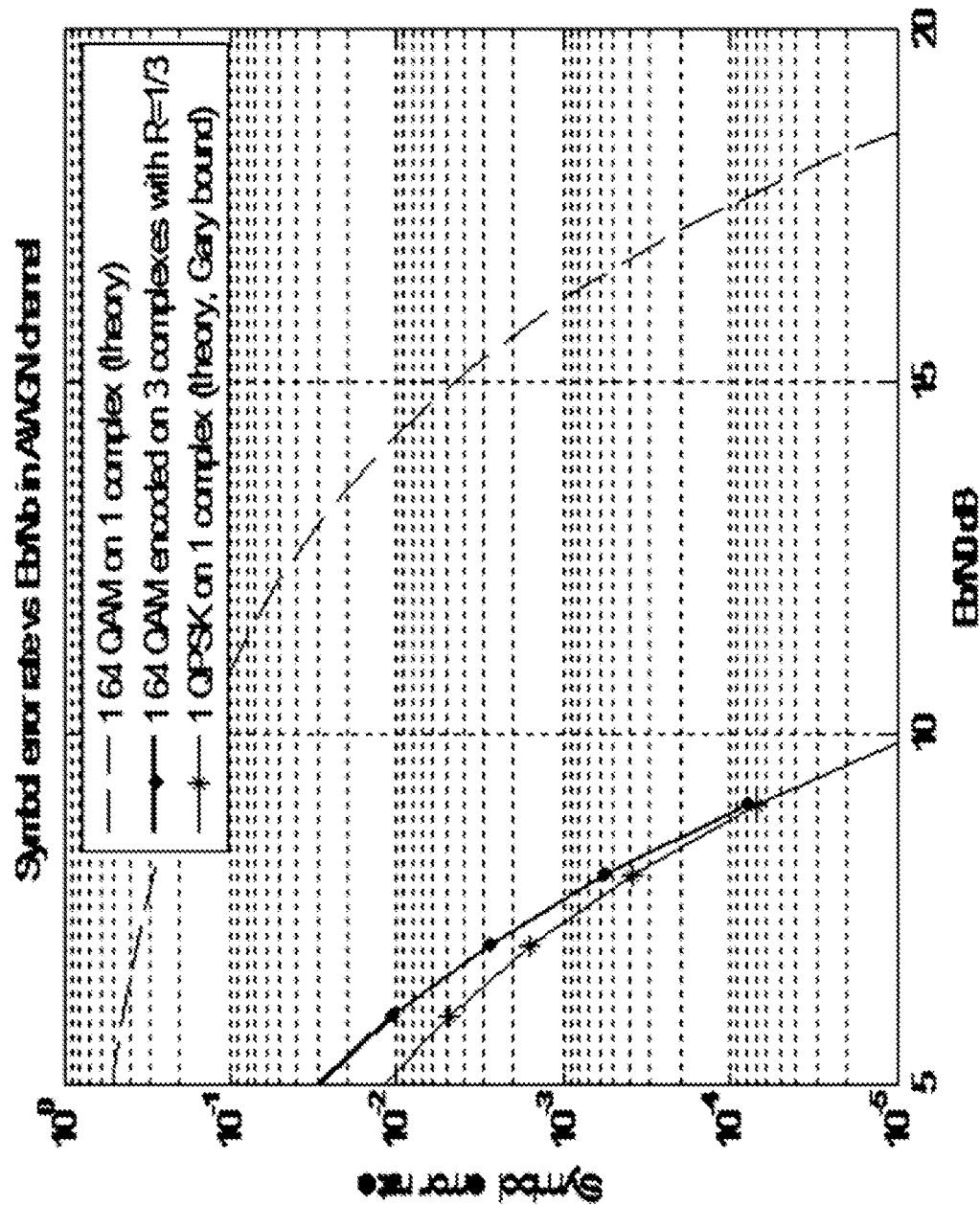
FIG. 25 is a plot measuring the SER performance of encoding one 64QAM on three complexes with R=1/3.

Referring again to the previously introduced example that encodes one 64QAM symbol into 3 dimensions in AWGN channel, in a particular implementation, the transmitter runs the message passing algorithm over 100 64QAM symbols with 3 iterations. In order to demonstrate the coding gain, symbol error rate vs Eb/N0 is determined, and plotted in FIG. 25. There is an ~8 dB coding gain on top of power gain. In FIG. 25, the curve is very close to the theoretical boundary over a wide range of SNR without error floor, although for the example, it was trained a fixed Es/N0 of 10 dB.

It can be seen that the overall system does not suffer from the problem with generalization that exists for the conventional autoencoder approach. If there are 3 equal-quality ranks for 6 bits, then the system will produce 3 QPSK symbols. Without intervening and changing the decoder g( ), the system can come close to the optimal solution over a wide range of SNR.

The example shows that this deep neural network architecture allows approaching the theoretical boundary, given the number of bits to be transmitted and number of the equal-important ranks available. In practice, the number of bits to be transmitted can be 5, 7, or other values, and in particular does not need to be a power of 2. And the number of the ranks is arbitrary. For example, in case of 7 bits over 5 ranks, there's no heuristic bound in the conventional way. The deep neural network would approach to the optimal solution.

Embodiment 4—Multi-Path Channel Applications

Detailed Description of Embodiment 3

Although there is some utility in having a coding gain over an equal-attenuated (K equal-quality ranks) AWGN channel, multiple-rank transmission makes more sense when the qualities of ranks are different. In prior art approaches, the qualities of the K ranks must be estimated by SVD and ranked; in term of qualities, one symbol is separated into K ways proportionally. This mechanism involves significant overhead (pilot, controlling messages and primitive) and a large set of standardized candidates. This is how some current MIMO systems are designed: Step-1: a transmitter transmits a number of reference signals over different paths; Step-2: a receiver measures the channel condition over the different paths and combines them into a channel quality indicator (CQI); Step-3: a receiver transmits the CQIs back to the transmitter; Step-4, the transmitter runs the SVD to find the eigenvalues and eigenvectors from the CQIs; Step-5, the transmitter ranks the eigenvalues from higher to lower and eliminates some very small eigenvalues. According to the eigenvalues (quality of the rank), it allocates the modulation and coding scheme. Step-6, the transmitter transmits the MCS for each rank and the decoding matrix (eigenvectors) to the receiver.

In a mmWAVE application scenario, an AWGN channel is an oversimplification; a multiple-path fading channel, i.e. time-varying and frequency-selective fading channels, can be used instead, which introduces additional complexity. In practice, the N beams reach the K receiving antennas independently and their received signals are summed or interfered together. The beams may be correlated somehow. Each beam has a different, frequency-selective, and time-varying fading attenuation. The selectivity is due to multiple paths over a beam, which is mainly determined by the physical surroundings. Over some period of wireless communication, the attenuation due to the selectivity can be viewed as being static: $h_s$. The time-varying attenuation is due to the mobility, not only the moving terminal but also moving blockages nearby. The time-varying attenuation can be regarded as jitter over the static attenuation: $\Delta h_d(t)$, that can be measured and estimated. Furthermore, the time-varying channel attenuation is never precisely estimated, causing an inevitable estimation mismatch. Or the time-varying channel attenuation will become outdated after some time, causing another inevitable outdated mismatch. This mismatch can be regarded as jitter over $\Delta d_m(t)$: $\Delta' d_m(t)$.

In a N-to-K scenario (N>>K), pilots (reference signals) over N/K groups of beams would add up at the receiver so that a round-robin measurement algorithm over N/K groups of beams becomes necessary. Unfortunately, for one given group of beams, its two consecutive downlink channel measurements take place at least every (N/K−1) measurement intervals. Because N may be a much larger number than K, this interval would be too long to account for the changes in $\Delta h_d(t)$. Besides, this method would require significant overhead in both downlink (pilot and sounding signals) and uplink (reporting and feedback).

An alternative approach depends on the UL/DL reciprocal property in TDD mode: a base-station (transmitter) would estimate the channel attenuation over the UL signals sent from the receiver, and then consider them as the channel attenuations over the next DL (transmitter to the receiver). This reciprocal assumption is imperfect, due to the potential mismatch between the UL and DL.

In mmWAVE applications, the reliance on UL/DL reciprocity is preferred, because it occupies less overhead than the round-robin based approach. In addition, to support extreme high throughput and ultra low latency, it is preferred to use a simple decoder $g(\cdot)$ instead of a cascade of traditional synchronization, channel estimation, and equalization.

In some embodiments, an approach to addressing attenuation $h(t)=(h_s+\Delta h_d(t)+\Delta h_m(t))$ is based on:

As a result of the recomposition $\vec{r}_{true}$, its inherent composition logic helps the transceiver to tolerate attenuation $h(t)=(h_s+\Delta h_d(t)+\Delta h_m(t))$.

Because Machine Learning is a (non-linear) fitting function, the layers (f, g, $w_i$, $\vec{b}_i$) are trained and fixed by a number of the channel attenuation samples. To some (limited) degree, they can handle channel attenuations that they have never encountered before.

After training the fixed layers ((f, g, $w_i$, $\vec{b}_i$) are the layers trained and fixed), the transmitter keeps running the MPA to update the power control vector $[\alpha_1, \alpha_2, \ldots \alpha_{N/K}]$ for $\vec{S}=[\vec{s}_1, \vec{s}_2, \ldots, \vec{s}_{N/K}]$. With the knowledge of $h_s+\Delta h_d(t)$, it can help the transceiver to adapt the time varying channel attenuation.

Figure 26:
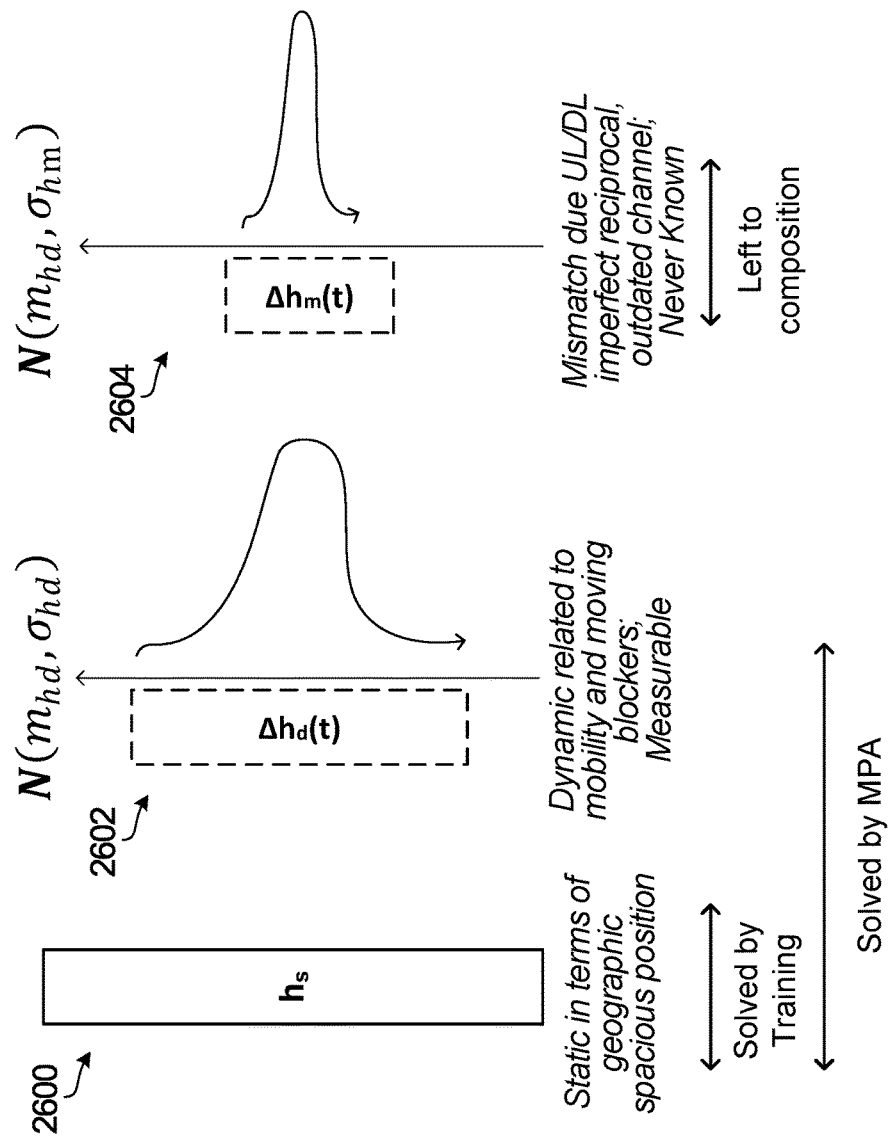
FIG. 26 is a block diagram depicting time-varying channel attenuation uncertainty decomposition.

For the purpose of training, the channel attenuation is divided into three parts, as depicted in FIG. 26:

Static (large scale) channel attenuation ($h_s$) 2600 is mainly due to the static time-offsets among different beam antennas and multi-paths over beams in terms of the receiver's position. A base-station (transmitter) typically has good knowledge of static channel attenuation.

Dynamic (medium-scale) channel attenuation ($\Delta h_d(t)$) 2602 is mainly due to the changing surroundings (e.g., a random passenger) and low mobility (e.g., a small movement). A base-station keeps measuring $\Delta h_d(t)$ on the uplink and uses these measurements for the downlink based on the UL/DL reciprocal assumption.

Mismatch (small-scale) channel attenuation ($\Delta h_m(t)$) 2604 is mainly due to the mismatch between the channel estimation and measurement. It can be the mismatch between the UL and DL channels when reciprocity is assumed, or a mismatch that accumulates over time.

These attenuations can be included in the system model as follows:

$$\begin{cases} \vec{U} = [\vec{u}_1, \vec{u}_2, \ldots, \vec{u}_{N/K}] = f(a) \\ \vec{v} = \sum_{i=1}^{N/K} \left(\overrightarrow{h\_s_i} + \overrightarrow{\Delta h\_d_i} + \overrightarrow{h\_m_i}\right) \otimes c_i \cdot \left((\vec{u}_i) \cdot w_i + \vec{b}_i\right) \\ \vec{v} = \frac{\vec{r}}{\|\vec{r}\|} + \vec{n} \\ \hat{a} = g(\vec{v}) \end{cases}$$

where $\overrightarrow{h\_s_t} = [h\_s_i(1), h\_s_i(2), \ldots, h\_s_i(K)]$ is static and always known to the transmitter $\overrightarrow{\Delta h\_d_t} = [\Delta h\_d_i(1), \Delta h\_d_i(2), \ldots, \Delta h\_d_i(K)]$ is time-varying but known to the transmitter $\overrightarrow{\Delta h\_m_t} = [\Delta h\_m_i(1), \Delta h\_m_i(2), \ldots, \Delta h\_m_i(K)]$ is time-varying but theoretically unknown to the transmitter $\otimes$ is element-wise complex multiplication.

Although $\overrightarrow{\Delta h\_d_t}$ and $\overrightarrow{\Delta h\_m_t}$ are time varying, their distributions can be known or estimated by some statistics. During a training stage, values for $\overrightarrow{\Delta h\_d_t}$ and $\overrightarrow{\Delta h\_m_t}$ are not immediately available, but an estimate for $\overrightarrow{h\_s_t}$ may be available. To address this, values are assumed for training purposes. In the following example, two known Gaussian distributions for N/K groups of beams are used, i.e. $\widetilde{\Delta h\_d_t}(k) \sim N(m_{hd}, \sigma_{hd})_{i,k}$ and $\widetilde{\Delta h\_m_t}(k) \sim N(m_{hm}, \sigma_{hm})_{i,k}$. These distributions are explained in further detail below.

Then, in the above model, $\overrightarrow{\Delta h\_d_t}$ is replaced by $\widetilde{\Delta h\_d_t}(t) \sim N(m_{hd}, \sigma_{hd})_{i,k}$ and $\overrightarrow{h\_m_t}$ is replaced by $\widetilde{h\_m_t}(k) \sim N(m_{hm}, \sigma_{hm})_{i,k}$;

$$\begin{cases} \vec{U} = [\vec{u}_1, \vec{u}_2, \ldots, \vec{u}_{N/K}] = f(a) \\ \vec{r} = \sum_{i=1}^{N/K} \left(\overrightarrow{h\_s_l} + \Delta\tilde{h}\_d_l + \Delta\tilde{h}\_m_l\right) \otimes c_i \cdot \left((\vec{u}_i) \cdot w_i + \vec{b}_i\right) \\ \vec{v} = \dfrac{\vec{r}}{\|\vec{r}\|} + \vec{n} \\ \hat{a} = g(\vec{v}) \end{cases}$$

Figure 27A:
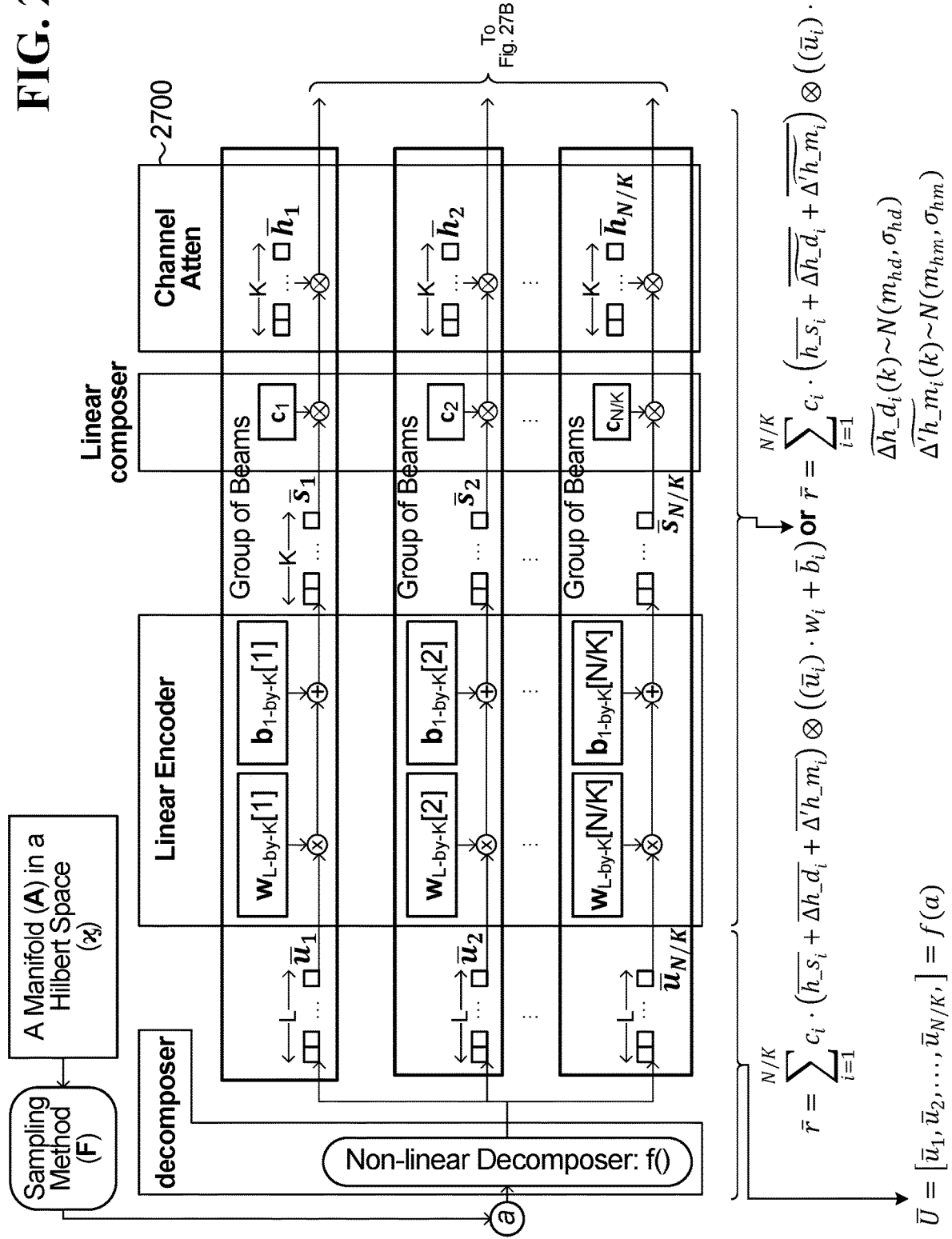
FIG. 27A is a block diagram depicting a transceiver with random channel attenuation.
Figure 27B:
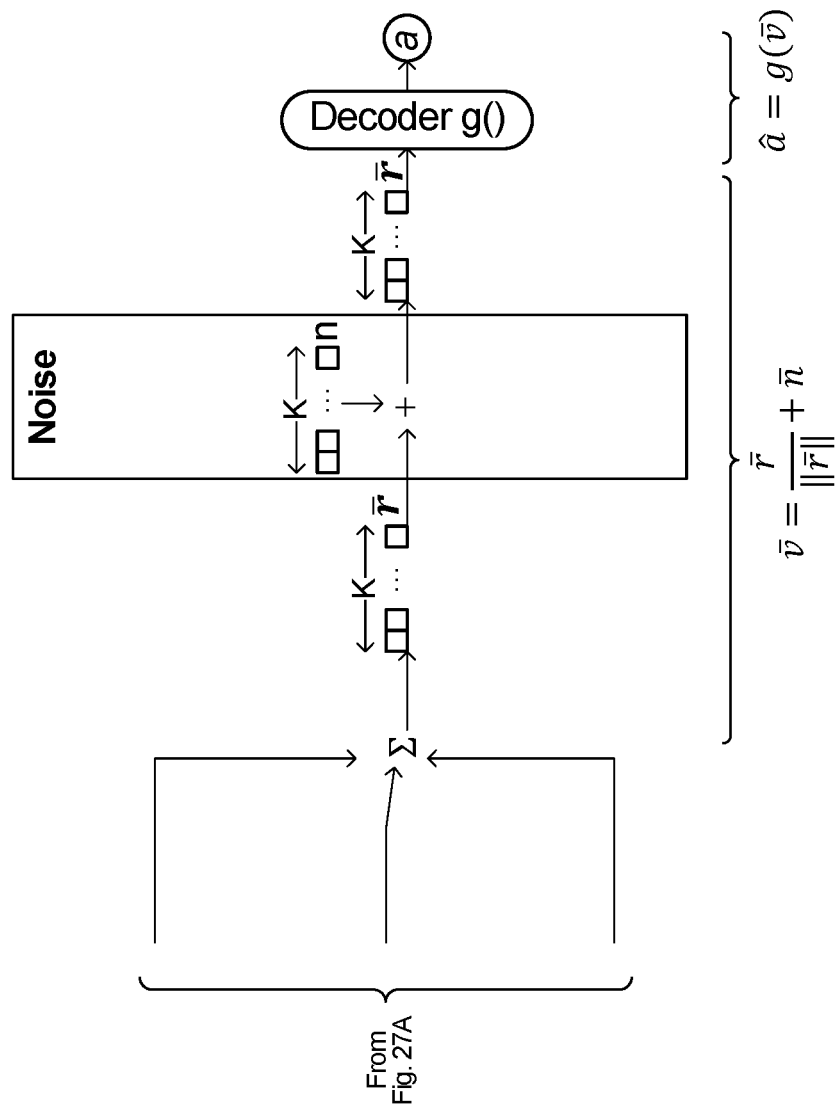
FIG. 27B is a block diagram depicting a transceiver with random channel attenuation.

The system of FIG. 20, modified to show the channel attenuation, is depicted in FIGS. 27A and 27B, where the channel attenuation component is introduced at 2700.

Figure 28A:
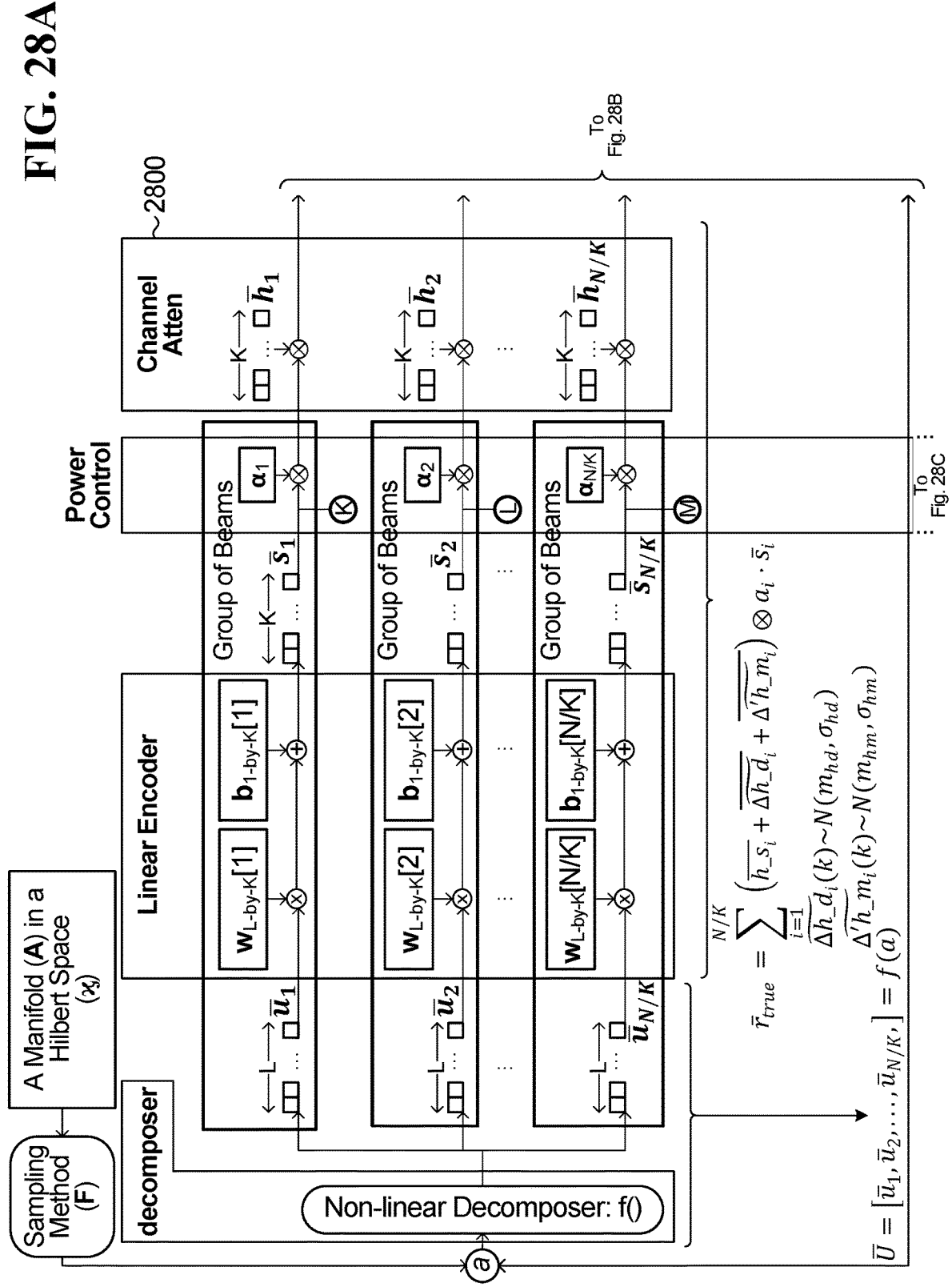
FIG. 28A is a block diagram depicting the reception of transmissions by a channel attenuated virtual user.
Figure 28B:
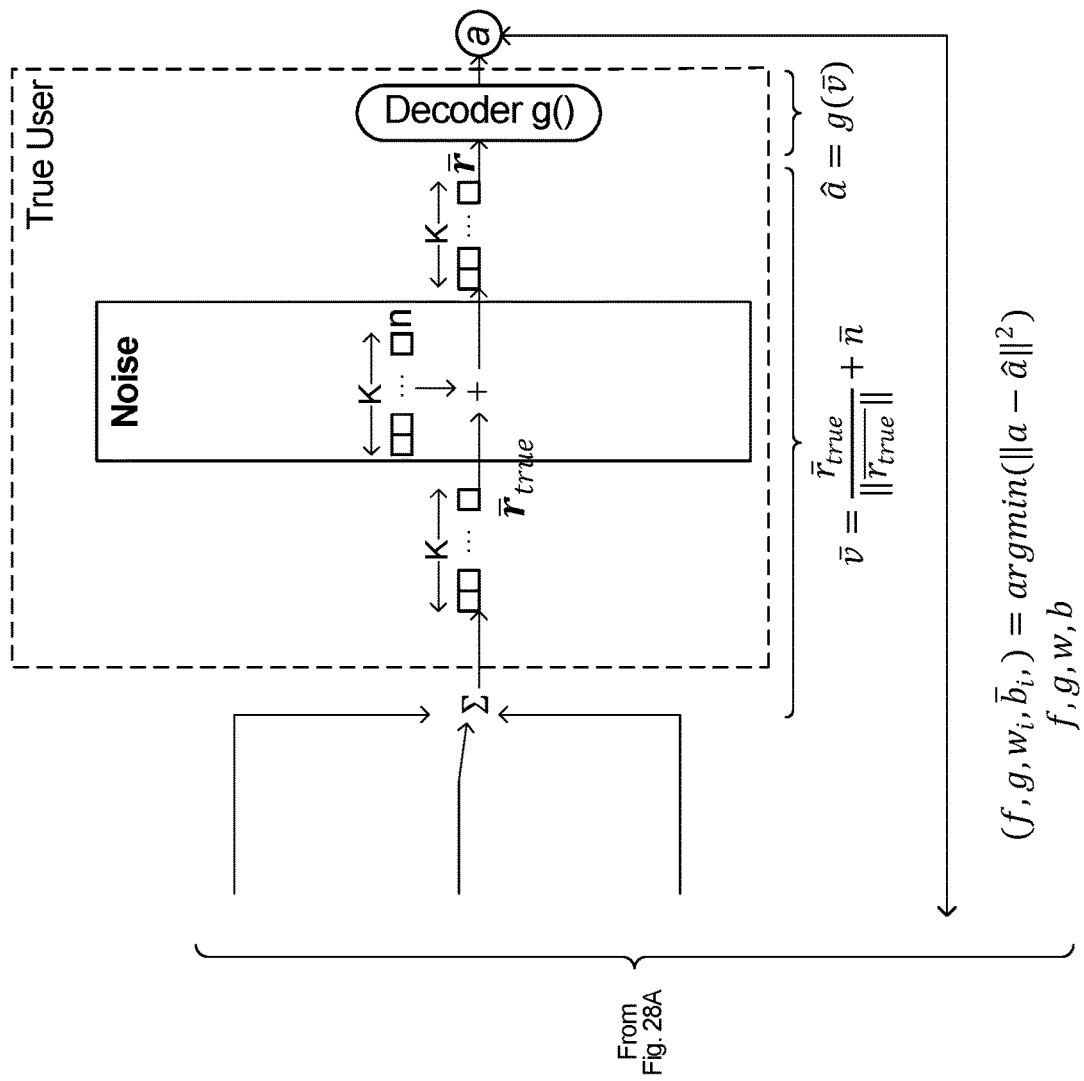
FIG. 28B is a block diagram depicting the reception of transmissions by a channel attenuated virtual user.
Figure 28C:
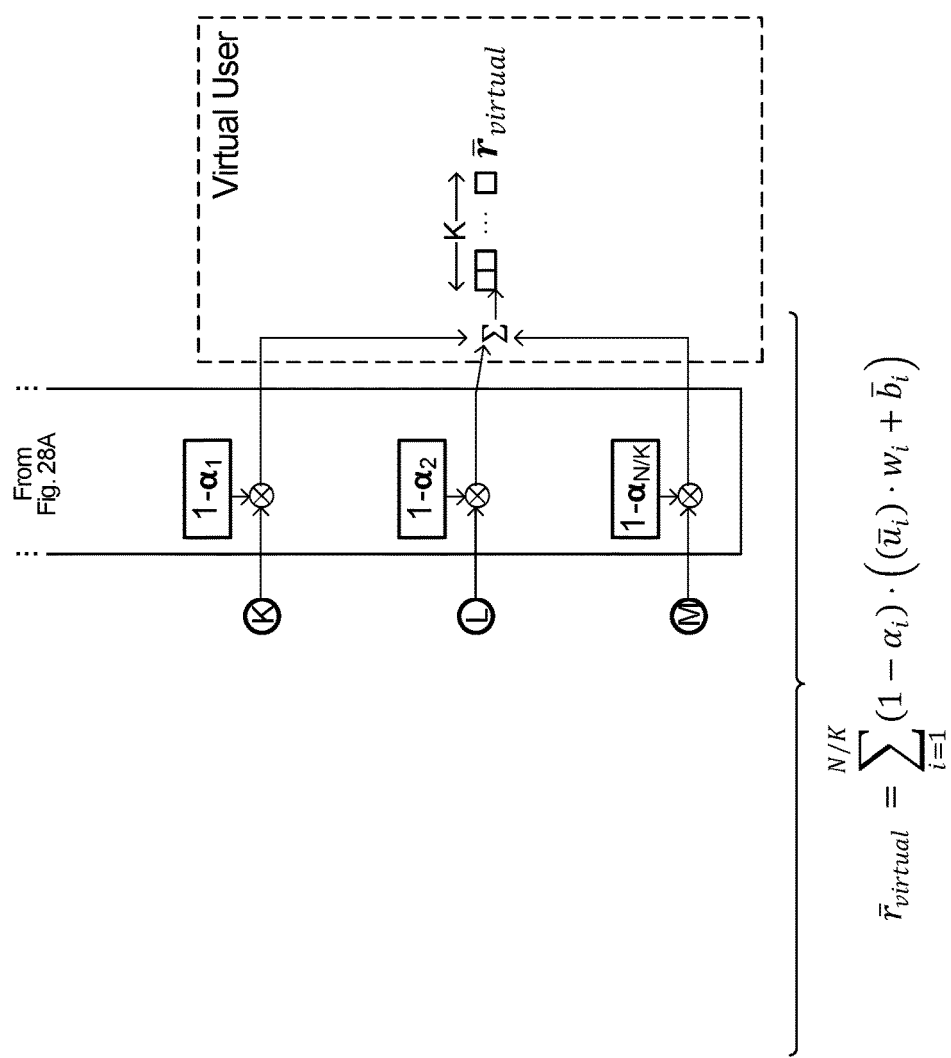
FIG. 28C is a block diagram depicting the reception of transmissions by a channel attenuated virtual user.

FIGS. 28A, 28B and 28C show the system of FIGS. 21A and 21B, which includes the virtual user, where the virtual user is defined to be an ideal user without attenuation, either negative or positive. The system of FIGS. 28A, 28B and 28C shows channel attenuations 2800 applied to the outputs for the true user only. The entire neural network is:

$$\begin{cases} \vec{U} = [\vec{u}_1, \vec{u}_2, \ldots, \vec{u}_{N/K}] = f(a) \\ \forall i: \vec{s}_i = (\vec{u}_i) \cdot w_i + \vec{b}_i \\ [\alpha_1, \alpha_2, \ldots \alpha_{N/K}] = MPA(\vec{S} = [\vec{s}_1, \vec{s}_2, \ldots, \vec{s}_{N/K}]) \\ \vec{r}_{true} = \sum_{i=1}^{N/K} \left(\overrightarrow{h\_s_l} + \Delta\tilde{h}\_d_l + \Delta\tilde{h}\_m_l\right) \otimes \alpha_i \cdot \vec{s}_i \\ \vec{v} = \dfrac{\vec{r}_{true}}{\|\vec{r}_{true}\|} + \vec{n} \\ \hat{a} = g(\vec{v}) \end{cases}$$

where $[\alpha_1, \alpha_2, \ldots \alpha_{N/K}] = MPA(\vec{S} = [\vec{s}_1, \vec{s}_2, \ldots, \vec{s}_{N/K}])$ during the training stage.

During training, the following approach is taken:

$\Delta\tilde{h}\_d_l(t) \sim N(m_{hd}, \sigma_{hd})_{i,k}$ and $\Delta\tilde{h}\_m_l(k) \sim N(m_{hm}, \sigma_{hm})_{ik}$ $$\forall i: \alpha_i = \frac{1}{2} \qquad (1)$$

$$\vec{r}_{true} = \sum_{i=k}^{N/K} \left(\overrightarrow{h\_s_l} + \Delta\tilde{h}\_d_l + \Delta\tilde{h}\_m_l\right) \otimes \alpha_i \cdot \vec{s}_i \qquad (2.a)$$

$$\vec{r}_{virtual} = \sum_{i=k}^{N/K} (1 - \alpha_i) \cdot \vec{s}_i \qquad (2.b)$$

For iteration = 1 : r $$\forall i: \alpha_i = \dfrac{e^{\left(\frac{\vec{r}_{true}}{\|\vec{r}_{true}\|}\right) \vec{s}_i^H}}{e^{\left(\frac{\vec{r}_{true}}{\|\vec{r}_{true}\|}\right) \vec{s}_i^H} + e^{e\|\vec{r}_{virtual}\| \vec{s}_i^H}} \text{ or} \qquad (3)$$

$$\forall i: \alpha_i = \dfrac{e^{\left(\frac{\vec{r}_{true}}{\|\vec{r}_{true}\|}\right) \vec{s}_i^H}}{e^{\left(\frac{\vec{r}_{true}}{\|\vec{r}_{true}\|}\right) \vec{s}_i^H} + e^{\left(\frac{\vec{r}_{virtual}}{\|\vec{r}_{virtual}\|}\right) \vec{s}_i^H}}$$

$$\vec{r}_{true} = \sum_{i=k}^{N/K} \left(\overrightarrow{h\_s_l} + \Delta\tilde{h}\_d_l + \Delta\tilde{h}\_m_l\right) \otimes \alpha_i \cdot \vec{s}_i \qquad (4.a)$$

$$\vec{r}_{virtual} = \sum_{i=k}^{N/K} (1 - \alpha_i) \cdot \vec{s}_i \qquad (4.b)$$

// no attenuation on virtual user $\Delta\tilde{h}\_d_l(t) \sim N(m_{hd}, \sigma_{hd})_{i,k}$ and
$\Delta\tilde{h}\_m_l(k) \sim N(m_{hm}, \sigma_{hm})_{i,k}$ End // of Iteration The example described above assumes no attenuation on the virtual user; in another embodiment, the same attenuation of the true user is assumed for the virtual user. According to simulations, there is not a significant performance difference between the two approaches.

The training is the same as the described above for the AWGN channel. The goal is $$(f, g, w_i, \vec{b}_i) = \underset{f,g,w,b}{\operatorname{argmin}}\left(\|a - \hat{a}\|^2\right).$$

Figure 29:
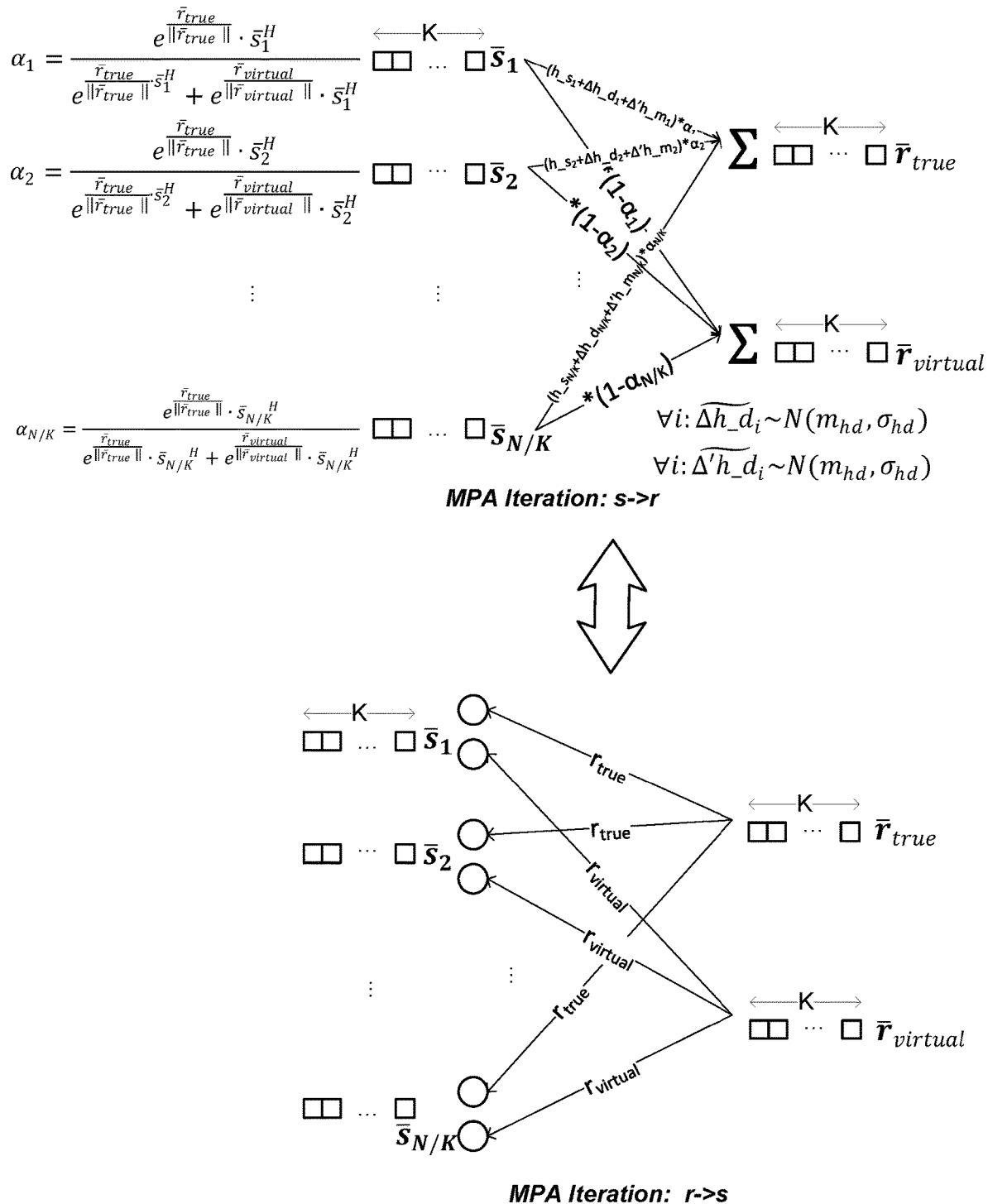
FIG. 29 is a block diagram illustrating the iterations of the MPA during training stage with channel attenuation.

The gradient descendent back propagation is training (f, g, $w_i$, $\vec{b}_i$) while fixing $[\alpha_1, \alpha_2, \ldots \alpha_{N/K}]$; MPA is training $[\alpha_1, \alpha_2, \ldots \alpha_{N/K}]$ while fixing f, g, $w_i$, $\vec{b}_i$. This MPA during training stage with attenuation is summarized in FIG. 29.

After the training, f( ), g( ), $w_i$ and $\vec{b}_i$ layers are frozen. The transmitter will use them to encode a sample a into $\vec{S} = [\vec{s}_1, \vec{s}_2, \ldots, \vec{s}_{N/K}]$. The transmitter will keep using MPA to generate $[\alpha_1, \alpha_2, \ldots \alpha_{N/K}]$ against the channel attenuation. At each transmission interval t, the transmitter receives a channel attenuation $\Delta h_d(t)$ $(\overrightarrow{\Delta h\_d_t}(t) \neq \overrightarrow{\Delta h\_d_t})$. As for the mismatch, the MPA keeps using the sample from $\overrightarrow{\Delta' h\_m_t} \sim N(m_{hm}, \sigma_{hm})$ that is updated by $\overrightarrow{\Delta' h\_m_t}(t) = \overrightarrow{\Delta h\_d_t}(t) - \overrightarrow{\Delta h\_d_t}(t-1)$. $[\alpha_1, \alpha_2, \ldots \alpha_{N/K}] = MPA(\vec{S} = [\vec{s}_1, \vec{s}_2, \ldots, \vec{s}_{N/K}])$ during the transmission stage.

Figure 30A:
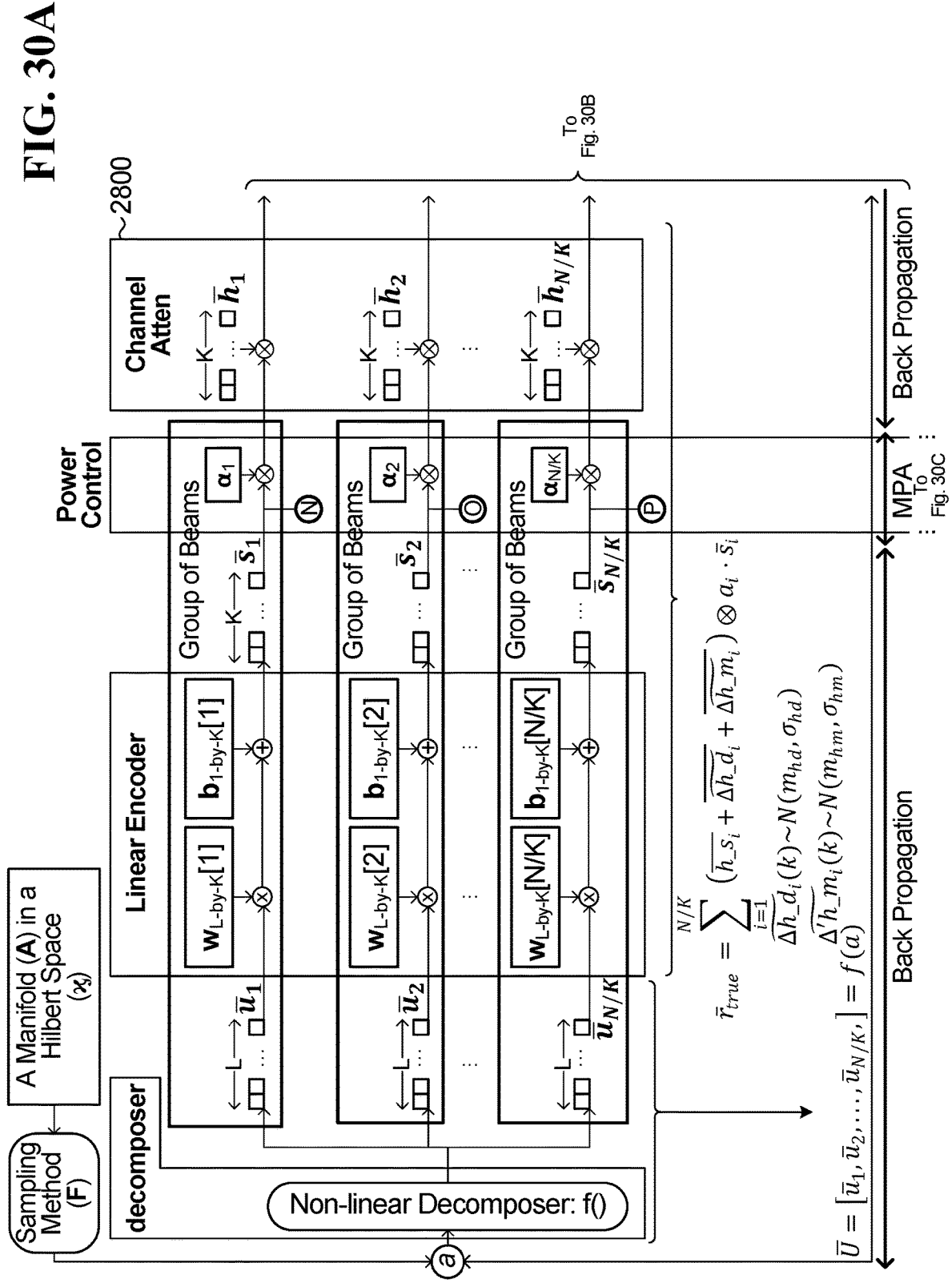
FIG. 30A is a block diagram illustrating the Tandem Training of FIGS. 23A and 23B with the addition of channel attenuation.
Figure 30B:
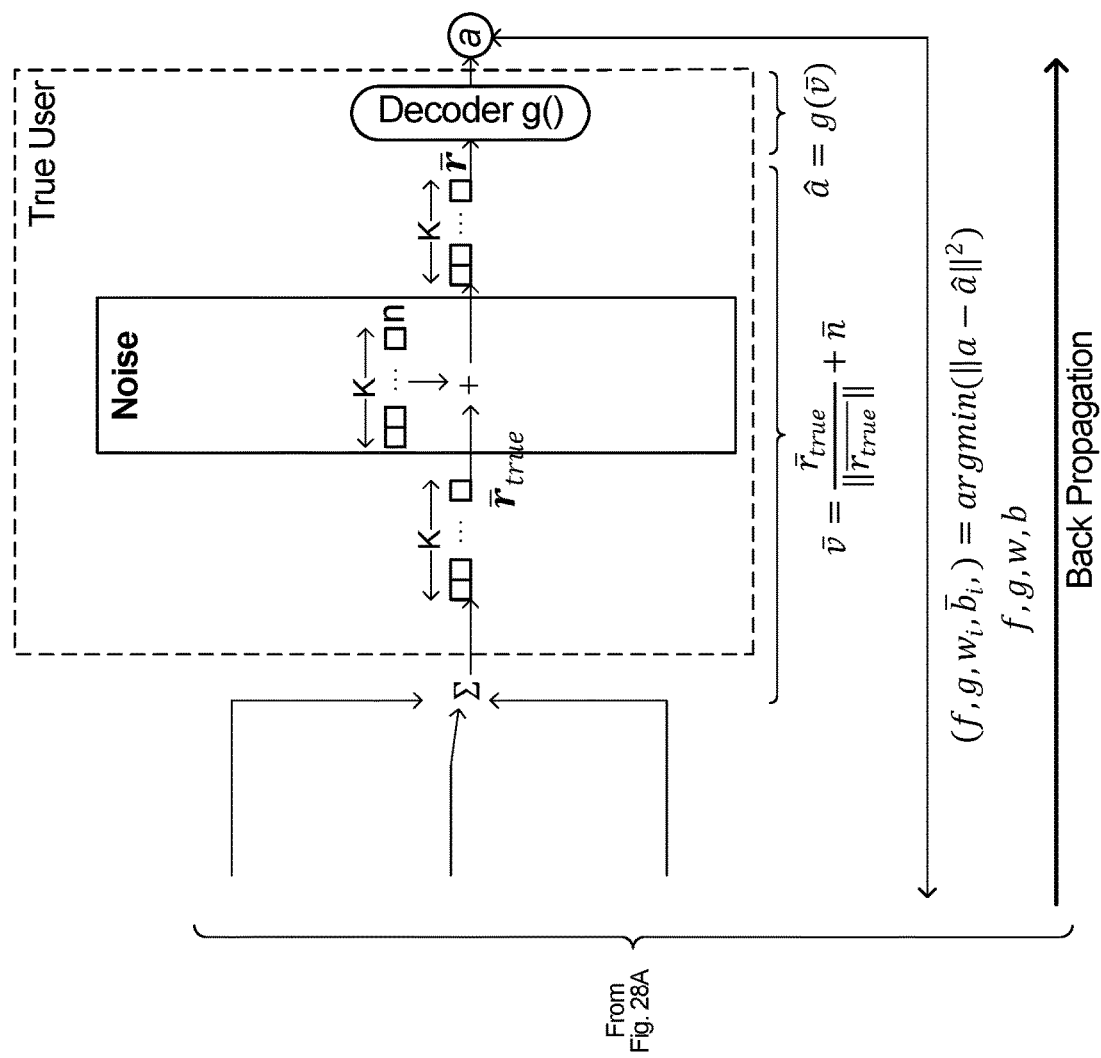
FIG. 30B is a block diagram illustrating the Tandem Training of FIGS. 23A and 23B with the addition of channel attenuation.
Figure 30C:
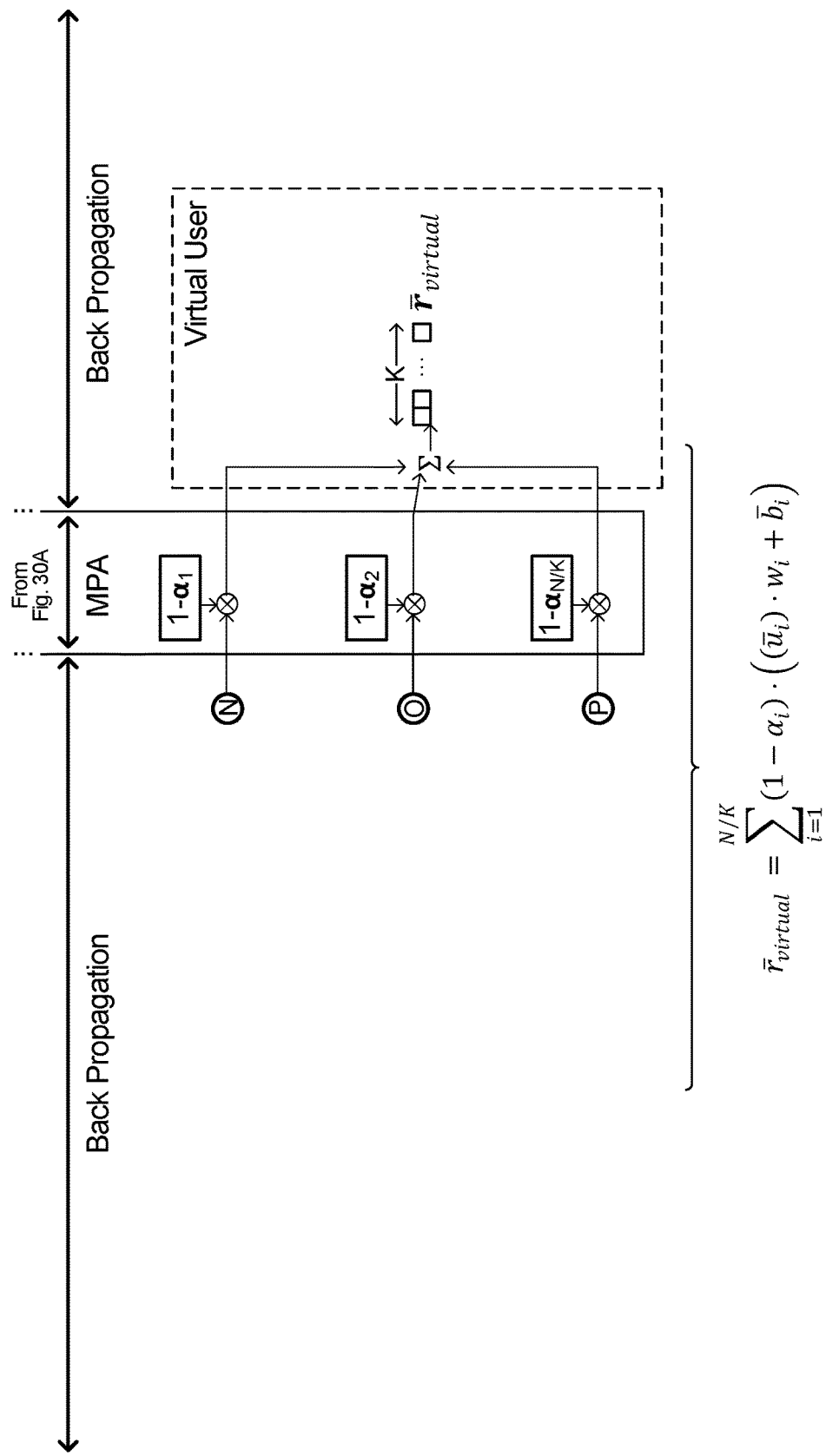
FIG. 30C is a block diagram illustrating the Tandem Training of FIGS. 23A and 23B with the addition of channel attenuation.
Figure 31A:
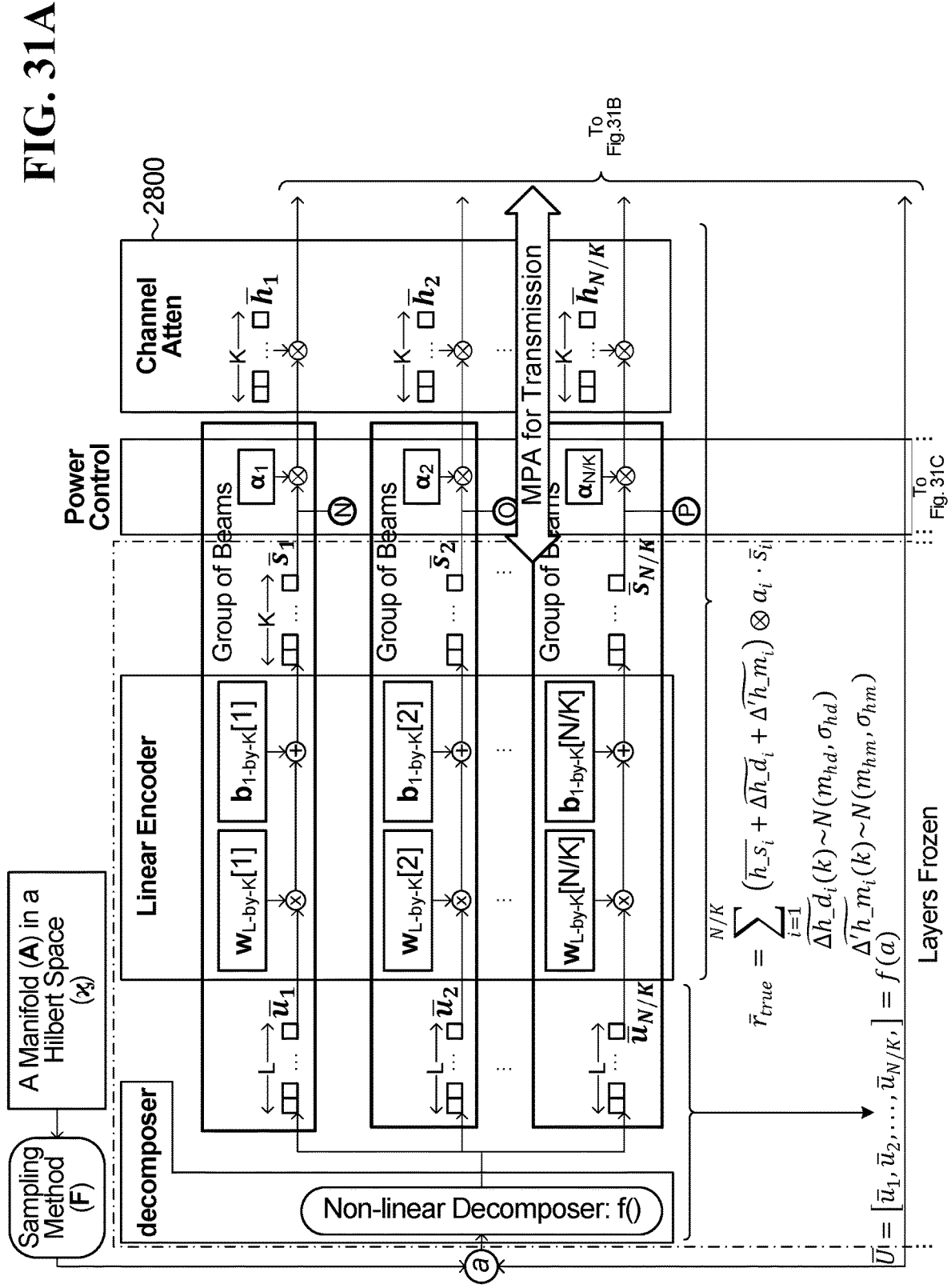
FIG. 31A is a block diagram depicting a transmission with channel attenuation during which the MPA keeps running.
Figure 31B:
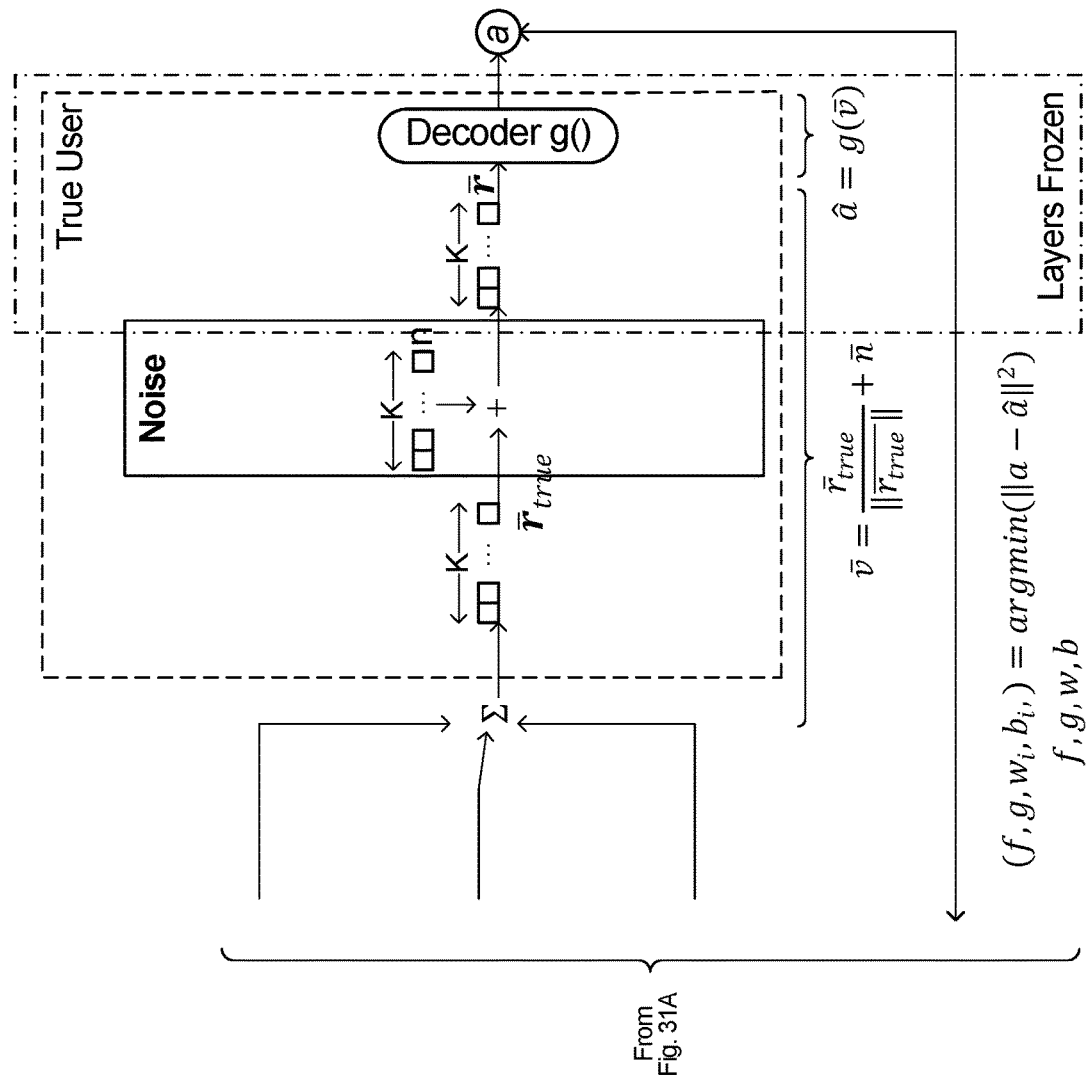
FIG. 31B is a block diagram depicting a transmission with channel attenuation during which the MPA keeps running.
Figure 31C:
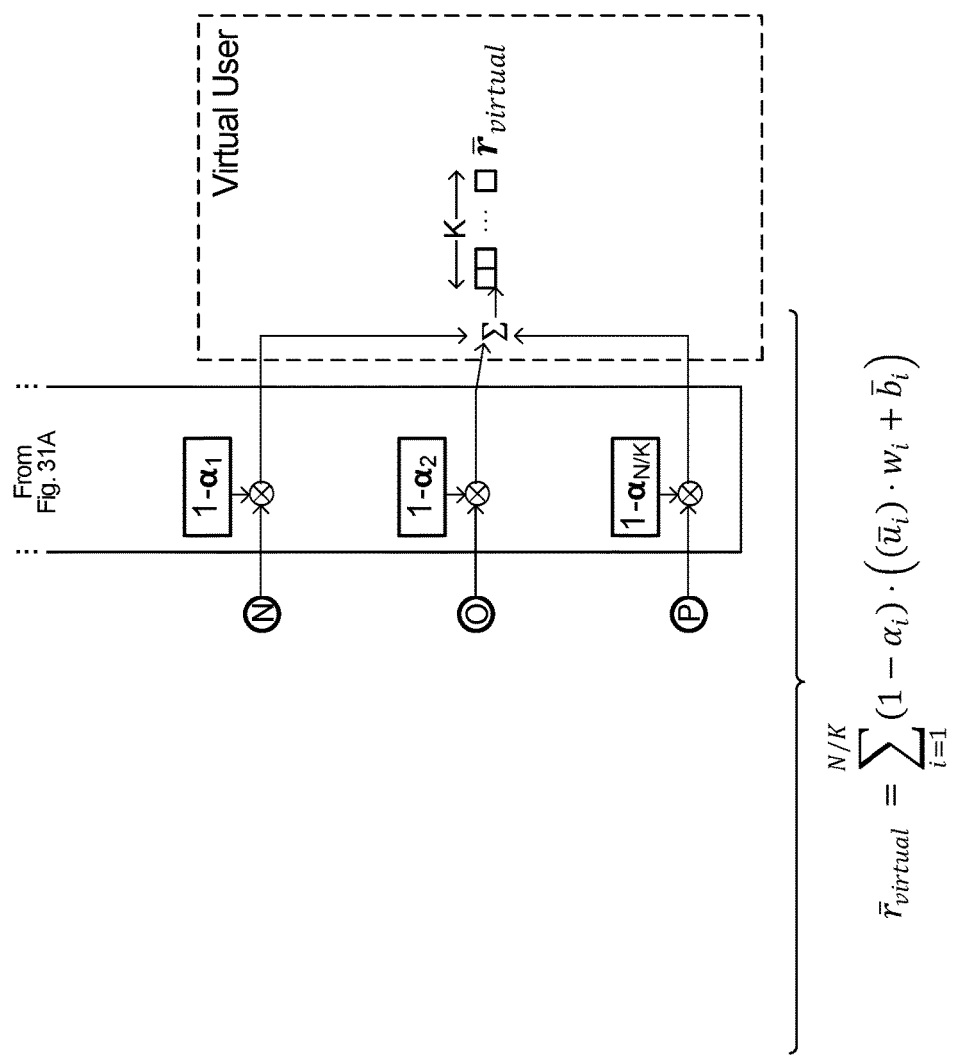
FIG. 31C is a block diagram depicting a transmission with channel attenuation during which the MPA keeps running.

FIGS. 30A, 30B and 30C show how the training is split between back propagation and MPA, as described previously for the embodiment of FIGS. 23A and 23B. As shown in FIGS. 31A, 31B and 31C, the gradient descent layers are frozen while MPA is used for transmission to update the power control coefficients.

Following training, the following approach is taken:

$\Delta\tilde{h}\_m_l(k) \sim N(m_{hd}, \sigma_{hd})_{i,k}$ $$\forall i: \alpha_i = \frac{1}{2} \qquad (1)$$

$$\vec{r}_{true} = \sum_{i=k}^{N/K} \left(\overrightarrow{h\_s_l} + \overline{\Delta h\_d_l} + \Delta \tilde{h}\_m_l\right) \otimes \alpha_i \cdot \vec{s}_i \quad (2.a)$$

$$\vec{r}_{virtual} = \sum_{i=k}^{N/K} (1-\alpha_i) \cdot \vec{s}_i \quad (2.b)$$

For iteration = 1 : r $$\forall i: \alpha_i = \frac{e^{\left(\frac{\vec{r}_{true}}{\|\vec{r}_{true}\|}\right)\vec{s}_i^H}}{e^{\left(\frac{\vec{r}_{true}}{\|\vec{r}_{true}\|}\right)\vec{s}_i^H} + e^{\left(\frac{\vec{r}_{virtual}}{\|\vec{r}_{virtual}\|}\right)\vec{s}_i^H}} \quad \text{or} \quad (3)$$

$$\forall i: \alpha_i = \frac{e^{\left(\frac{\vec{r}_{true}}{\|\vec{r}_{true}\|}\right)\vec{s}_i^H}}{e^{\left(\frac{\vec{r}_{true}}{\|\vec{r}_{true}\|}\right)\vec{s}_i^H} + e^{\left(\frac{\vec{r}_{virtual}}{\|\vec{r}_{virtual}\|}\right)\vec{s}_i^H}}$$

$$\vec{r}_{true} = \sum_{i=k}^{N/K} \left(\overrightarrow{h\_s_l} + \overline{\Delta h\_d_l} + \Delta \tilde{h}\_m_l\right) \otimes \alpha_i \cdot \vec{s}_i \quad (4.a)$$

$$\vec{r}_{virtual} = \sum_{i=k}^{N/K} (1-\alpha_i) \cdot \vec{s}_i \quad (4.b)$$

// no attenuation on virtual user $$\Delta \tilde{h}\_m_l(k) \sim N(m_{hd}, \sigma_{hd})_{i,k}$$

End of Iteration

Figure 32:
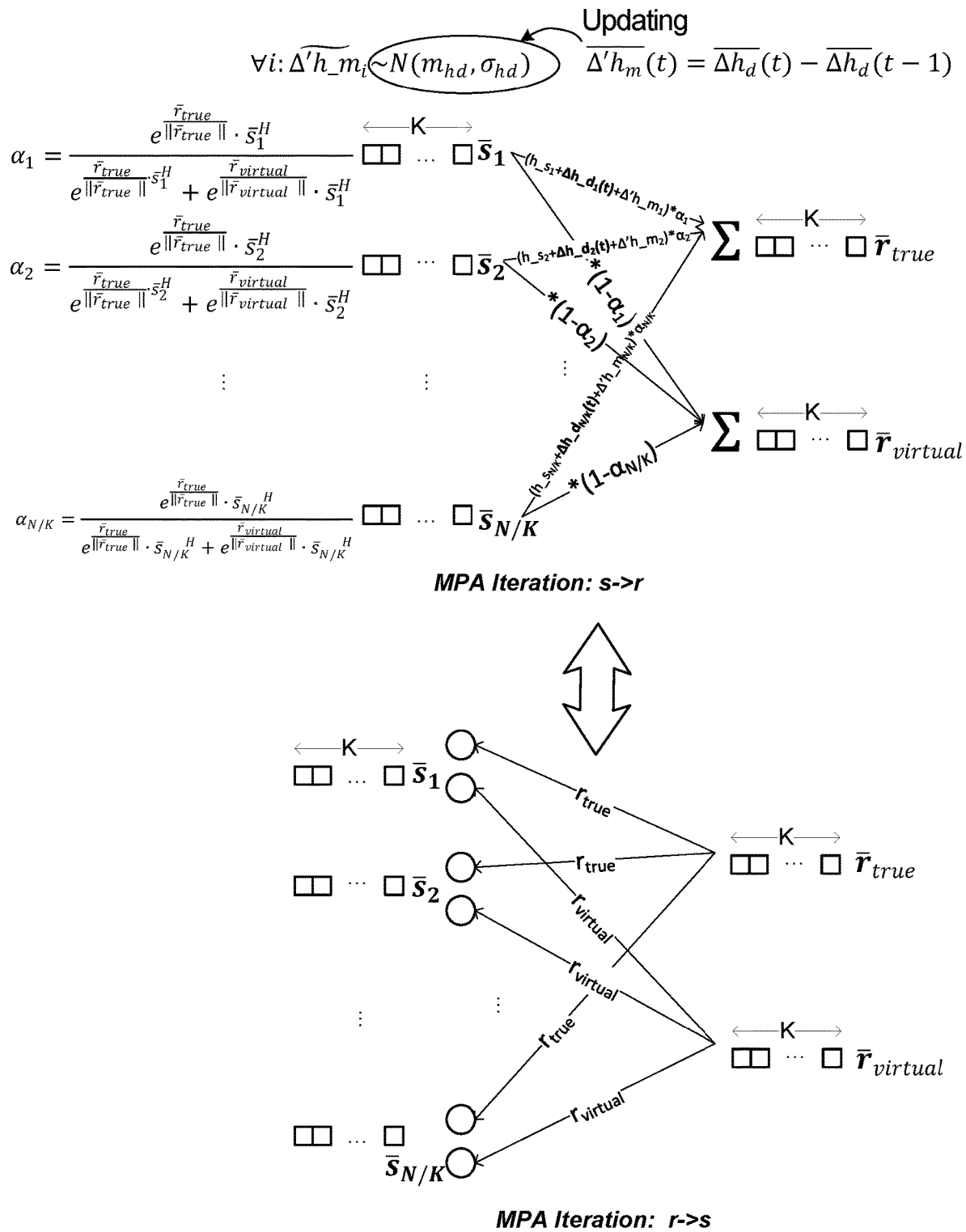
FIG. 32 is a block diagram illustrating the iterations of the MPA with time-varying channel attenuation during the transmission.

The operation of the MPA after the training stage, during transmission with attenuation, is summarized in FIG. 32.

Returning to the example of one 64QAM encoded into 3 dimensions, in a first simulation, only $\overrightarrow{h_{s_l}}$ and $\overrightarrow{\Delta h_{d_l}}$ are considered. During the training stage, the attenuation is $(\overrightarrow{h_{s_l}} + \overrightarrow{\Delta h_{d_l}})$, where $\overrightarrow{\Delta h_{d_l}}$ is the sampled one from a known distribution $N(m_{hd}, \sigma_{hd})_{i,k}$. During the transmission, MPA uses the attenuation $(\overrightarrow{h_{s_l}} + \overrightarrow{\Delta h_{d_l}}(t))$, where $\overrightarrow{\Delta h_{d_l}}(t)$ is a time-varying random variable but known to the transmitter. Neither $\overrightarrow{h_{s_l}}$ nor $\overrightarrow{\Delta h_{d_l}}(t)$ is known to the receiver that simply uses the decoder $g(\cdot)$.

Figure 33:
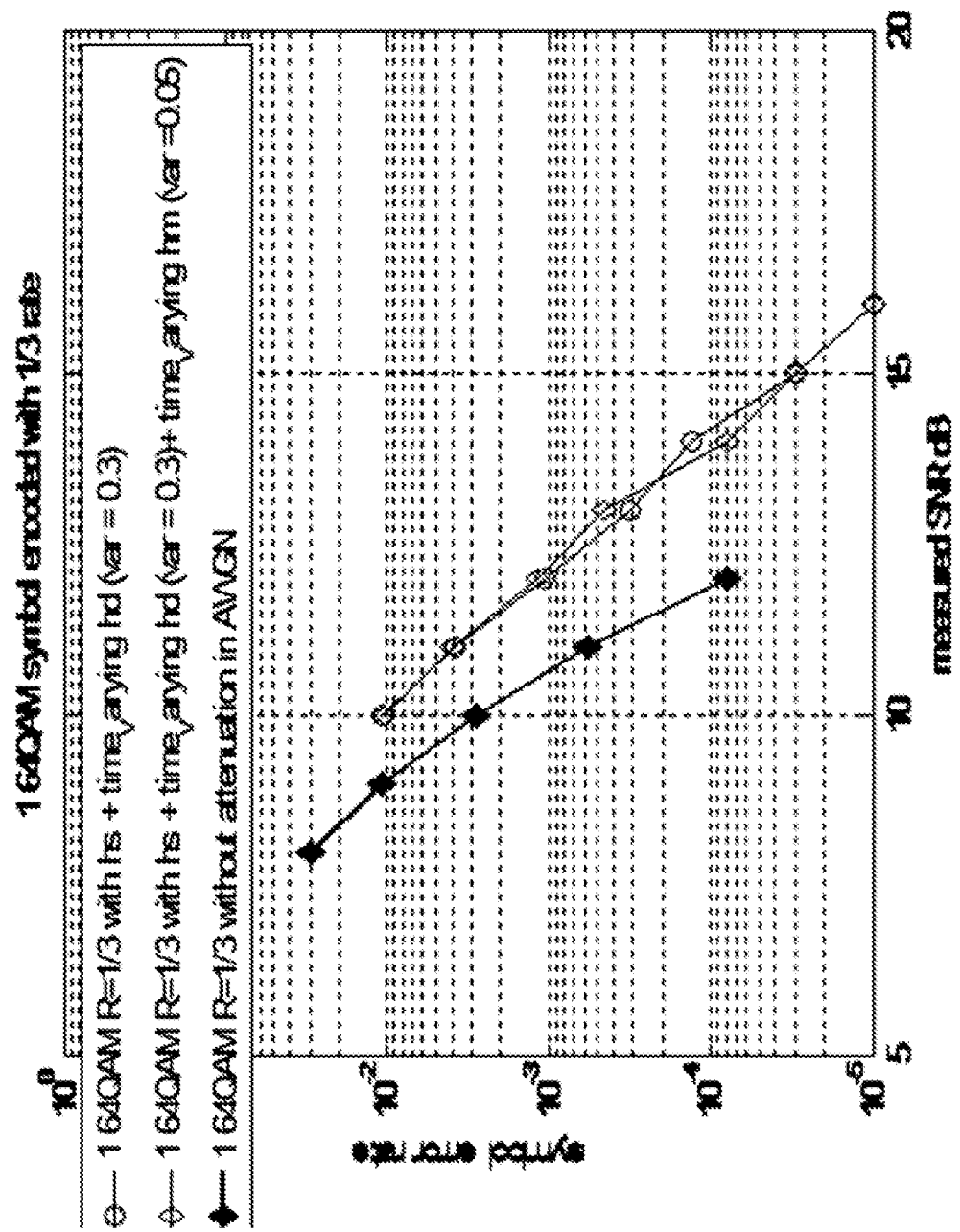
FIG. 33 is a plot showing the simulations of attenuated, with uncertainty, one 64QAM encoded with 1/3 rate.

In a second simulation, $\overrightarrow{h_{s_l}}$, $\overrightarrow{\Delta h_{d_l}}$, and $\overrightarrow{\Delta h_{m_l}}$ are considered. During the training stage, the attenuation is $(\overrightarrow{h_{s_l}} + \overrightarrow{\Delta h_{d_l}} + \overrightarrow{\Delta h_{m_l}})$, where $\overrightarrow{\Delta h_{d_l}}$ is the sampled one from a known distribution $N(m_{hd}, \sigma_{hd})_{i,k}$ and $\overrightarrow{h_{m_l}}$ is the sampled one from a known distribution $N(m_{hm}, \sigma_{hm})_{i,k}$. During the transmission, the MPA uses the attenuation $(\overrightarrow{h_{s_l}} + \overrightarrow{\Delta h_{d_l}}(t) + \overrightarrow{\Delta h_{m_l}})$, where $\overrightarrow{\Delta h_{d_l}}(t)$ is a time-varying random variable but known to the transmitter and $\overrightarrow{\Delta h_{m_l}}$ is the sampled one from the distribution $N(m_{hm}, \sigma_{hm})_{i,k}$ updated by $\overrightarrow{\Delta h_{m_l}}(t) = \overrightarrow{\Delta h_{d_l}}(t) - \overrightarrow{\Delta h_{d_l}}(t-1)$. Simulation results are shown in FIG. 33.

In a randomly attenuated channel, the virtual user (without attenuation) plays an important role for MPA to generate the power control factors $[\alpha_1, \alpha_2, \ldots \alpha_{N/K}]$. For each group (including K beams), the MPA has two connections: one for the true user with attenuation and the other for the virtual one without attenuation. The goal of the MPA is to move the maximum information to the true user and the rest to the virtual one.

More importantly, in N-to-K scenario, as described previously, it is difficult or impractical to insert the pilots on each beam, because all the beams are summed up at the receiver (the pilots of the beams are interfering to each other). With the described approach, no (or much fewer) pilots are needed. All the varying attenuations are transparent for the receiver that uses the $g(\cdot)$ as decoder to estimate the a. No synchronization, channel estimation, and equalization is needed by the receiver so that a very high throughput and short latency can be achieved.

Embodiment 5—Applications to mmWAVE

In some embodiments, one or more of the above described approaches are adapted for mmWAVE applications.

In some embodiments, the base-station includes a beam-on-chip system. One chip includes a large number (e.g. hundreds or thousands) of mmWAVE antennas.

Figure 34:
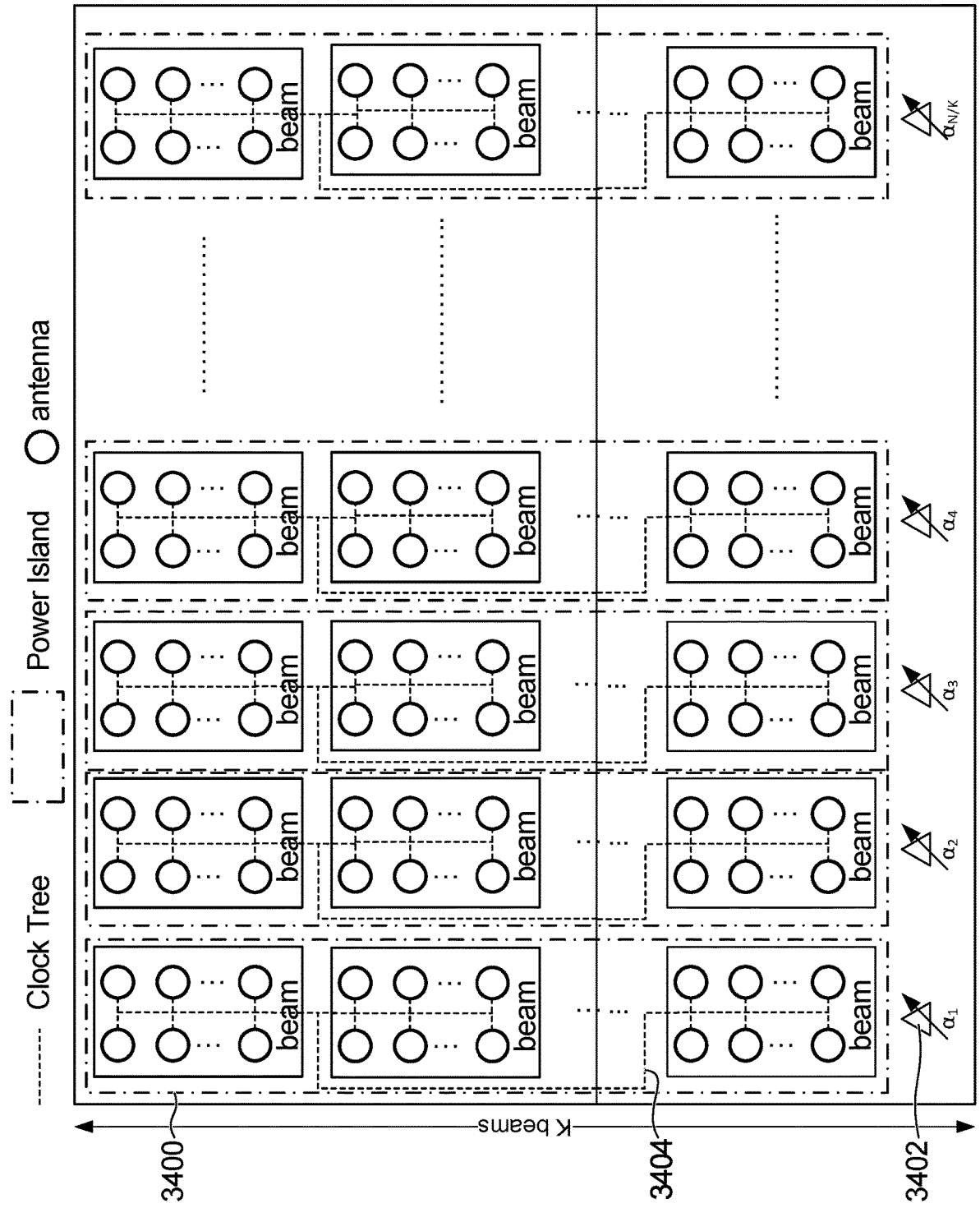
FIG. 34 is a block diagram depicting an example configuration of Beams-on-Chip.

In order to address routing issues that might lead to time offset among antennas, several nearby antenna circuits on the chip can be coordinated into a set for generating a beam. The antennas of one beam are chip-wisely and physically close and synchronous with each other because they can be connected to the same clock tree node. In order to address power density, the antennas of one beam can be chosen from within the same power island. An example is depicted in FIG. 34 which shows sets of K neighboring beams grouped together. For a given group of beams, their clock is derived from the same clock tree node, and they are within the same power island. For one power island, there is a power control tuner that controls all K beams on this island. In FIG. 34, one group is indicated at 3400, which has power control tuner 3402 that controls all the K beams, and has a clock tree 3404 connected to all of the beams. One group of K beams are always scheduled together to point to the same receiver. Although they are close to each other, they would be "synchronized", uniformly and equally powered, and parallel in space (no interference). A group of the beams is the basic scheduling granularity. One beam-on-chip may contain hundreds or thousands of the groups of the beams. If a large number of beams are implemented over one chip or system on chip (SoC), conventional methods to synchronize the clocks of all of them would present a challenge to chip design, in particular in designing a routing clock tree. As a result, a large and fully-synchronized chip would consume a significant portion of power (over 30%) for the routing clock tree. And large power consumption would inevitably increase the area of the chip for ventilation purpose. Therefore, for chip design, if a large fully-synchronized clock tree can be divided into several unsynchronized sub-clock-trees, this would dramatically reduce the power and area and cost. This is because the time offsets due to the chip routing among these groups of the beams are allowed so that the routing issue could be significantly alleviated. However, the time offsets among the groups are different from one chip to another. They are fixed and can be measured. The static time offsets may be included in the static attenuation which will be integrated into (f, g, $w_i$, $\vec{b}_i$).

Multiple beam-on-chips may be used together to reach simultaneous N/K groups of beams. The time offsets among the beam-on-chips are static and can be measured and then taken into account for the static attenuation which will be integrated into (f, g, $w_i$, $\vec{b}_i$). Multiple beam-on-chips can be installed separately and connected by wired connections. Given a terminal's position, the time delays over the air can be determined and taken into account for the static attenuation which will be integrated into (f, g, $w_i$, $\vec{b_i}$).

Figure 35:
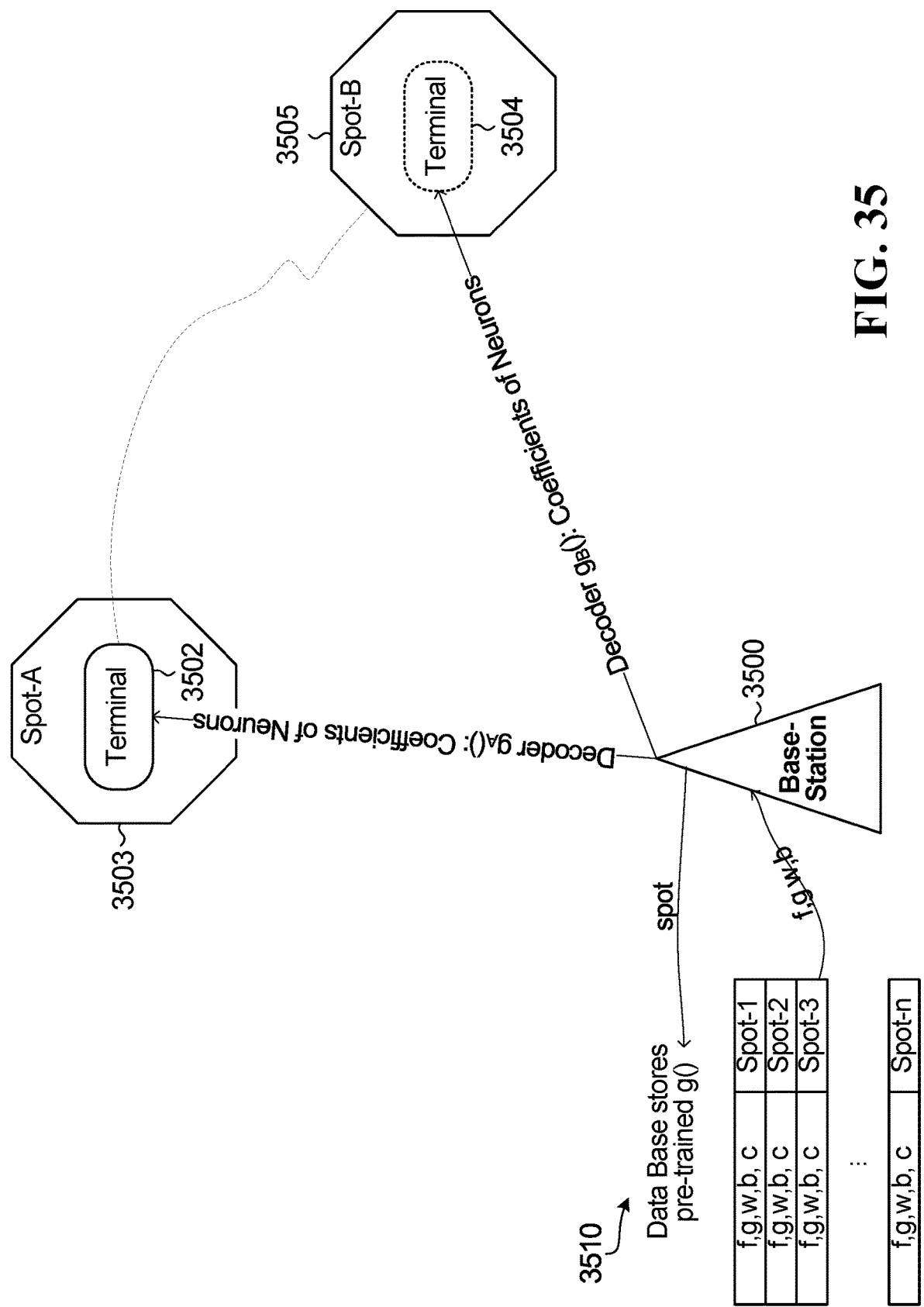
FIG. 35 is a block diagram depicting a base station sending a pre-trained and stored decoder g( ) neural network to the receiver in terms of the terminal's position.

An example is shown in FIG. 35 which shows a base station 3500 and two terminals, including first terminal 3502 located at Spot-A 3503, and second terminal 3504 located at Spot-B 3505.

The position of a terminal is a known to the base station. Given its position, user type, and available K uncorrelated dimensions, the $\vec{h_s}$ (static delays and attenuations), distributions of $N(m_{hd}, \sigma_{hd})$ and $N(m_{hm}, \sigma_{hm})$ can be obtained. In some embodiments, these are stored in memory of the base station, or in a database; alternatively, they are predicted, for example, using a deep neural network. In some embodiments, (f, g, $w_i$, $\vec{b_i}$) may be already trained in term of position, user type, and available K uncorrelated dimensions, and stored in the memory. An example is shown in FIG. 35, where a database 3510 stores pretrained g( ) for various spots within the coverage area of the base station. In this case, the base-station does not need to train g( ) again but rather simply sends the coefficients and architecture of g( ) to the terminal. If the terminal moves to be in a different spot, the coefficients and architecture need to be updated. Ideally, the coverage areas associated with each spot are large enough so that this does not have to happen too frequently.

In operation, the receiver starts by sending reference signals over the uplink that will be detected/received by N beams of the base-station. The base-station then estimates the channel attenuation over each beam. The base station applies the UL/DL reciprocity assumption to form $\overrightarrow{\Delta h_d}(t)$. The base-station the uses MPA to compute the power $[\alpha_1(t), \alpha_2(t), \ldots \alpha_{N/K}(t)]$ for each group of K beams against the current attenuation $((\vec{h_s} + \overrightarrow{\Delta h_d}(t))$ and $\overrightarrow{\Delta' h_m}$ or $\overrightarrow{\Delta' h_m}(t))$. With the updated $[\alpha_1(t), \alpha_2(t), \ldots \alpha_{N/K}(t)]$, the transmitter runs f( ), $w_i$, $\vec{b_i}$ and tunes power to the granularity of group of beams, and finally sends the signals over the air in downlink. The receiver receives the signals from the K uncorrelated antennas and inputs them to g( ). Then, the terminal keeps transmitting the reference signals on the uplink so that the base-station will have updated values for $\overrightarrow{\Delta h_d}$ (t+1) for the next iteration.

In operation, the base station stores $\overrightarrow{\Delta h_d}(t)$ (t) to tune the distribution of $N(m_{hd}, \sigma_{hd})$ by either a conventional statistical method or a deep neural network based method. The base station uses $\overrightarrow{\Delta' h_m}(t) = \overrightarrow{\Delta h_d}(t) - \overrightarrow{\Delta h_d}(t-1)$ to tune the distribution of $N(m_{hm}, \sigma_{hm})$ by either a conventional statistical method or a deep neural network based method.

The base-station monitors $\overrightarrow{\Delta h_d}(t)$. and $\overrightarrow{\Delta' h_m}(t)$ by computing their relativity to the $$\vec{h_s}: \gamma_d(t) = \frac{\sum_{i=1}^{N/K} \alpha_i(t) \cdot \|\overrightarrow{\Delta h\_d_i}(t)\|^2}{\sum_{i=1}^{N/K} \alpha_i(t) \cdot \|\overrightarrow{hs_i}\|^2} \text{ and } \gamma_m(t) = \frac{\sum_{i=1}^{N/K} \alpha_i(t) \cdot \|\overrightarrow{\Delta' h\_m_i}(t)\|^2}{\sum_{i=1}^{N/K} \alpha_i(t) \cdot \|\overrightarrow{\Delta h\_d_i}(t)\|^2}.$$

If $\gamma_d(t)$ was beyond a predefined limitation and the user stayed in the position, $\vec{h_s}$ might not be representative enough for this position so that $\vec{h_s}$ should be updated by more recent $\overrightarrow{\Delta h_d}(t)$. However, an updated $\vec{h_s}$ would trigger a re-training of (f, g, $w_i$, $\vec{b_i}$). In some embodiments, a transferring learning concept is used: this involves training from the current neurons rather than from a set of undefined neurons. If retraining converged, the base-station sends the new g( ) to the receiver. If retraining didn't converge, it is possible that this position may be a "blind spot", i.e. N beams may be insufficient, and more beams should be used to communicate with a receiver in that part of the coverage area. In this case, the base station may allocate more beams for this area. Because the overall system dimension is changed, a new training is needed. These "blind spot" situations may occur at the start-up period for a new base-station.

If $\gamma_m(t)$ is beyond the predefined limitation, more frequent and/or more pilots are needed. If more frequent and more pilots do not help the situation, then N beams may be insufficient, and more beams can be allocated to this receiver. Because the dimension as changed, a new training is needed.

Figure 36A:
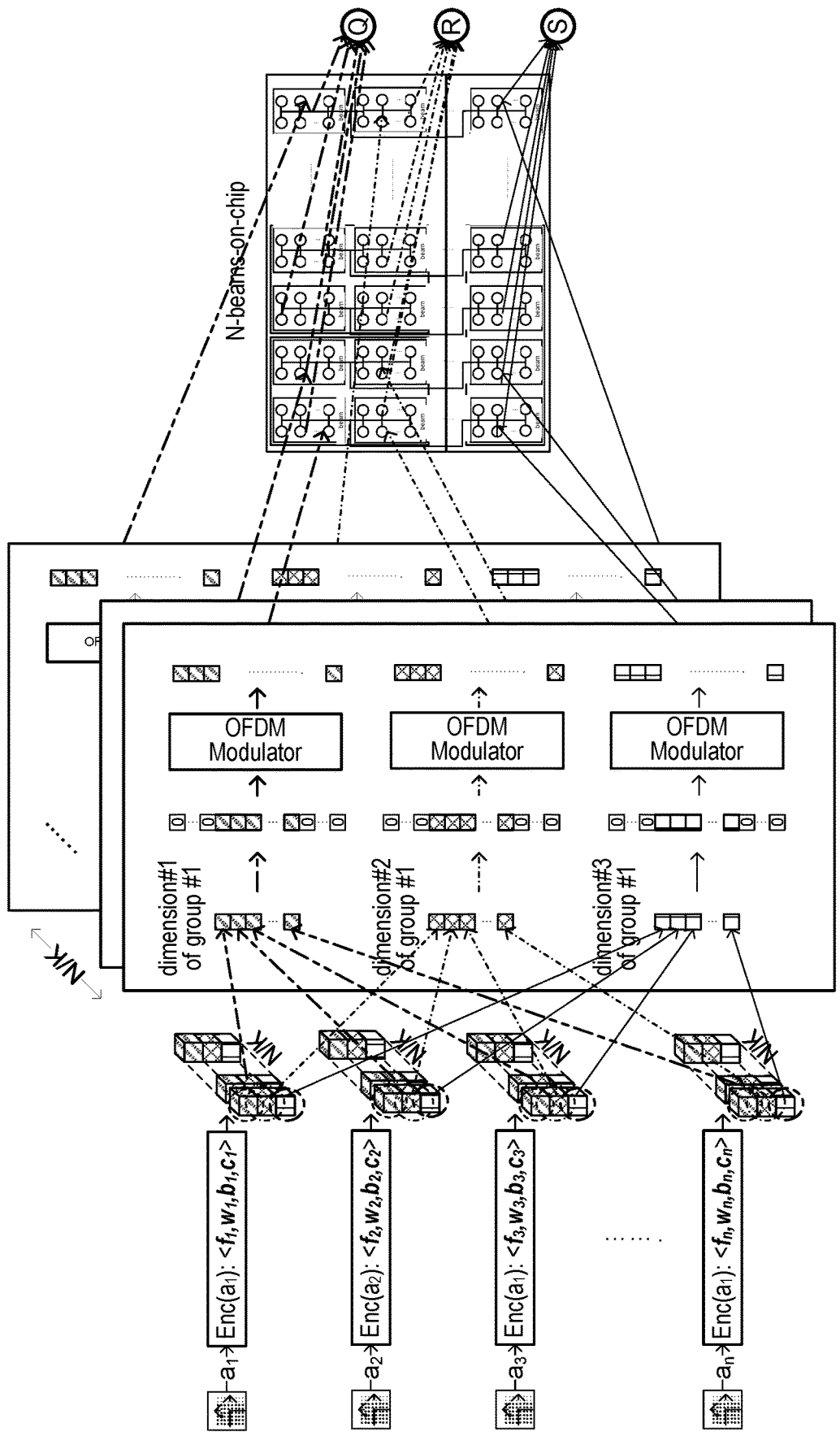
FIG. 36A is a block diagram depicting transmission by an OFDM system to reach high throughput.
Figure 36B:
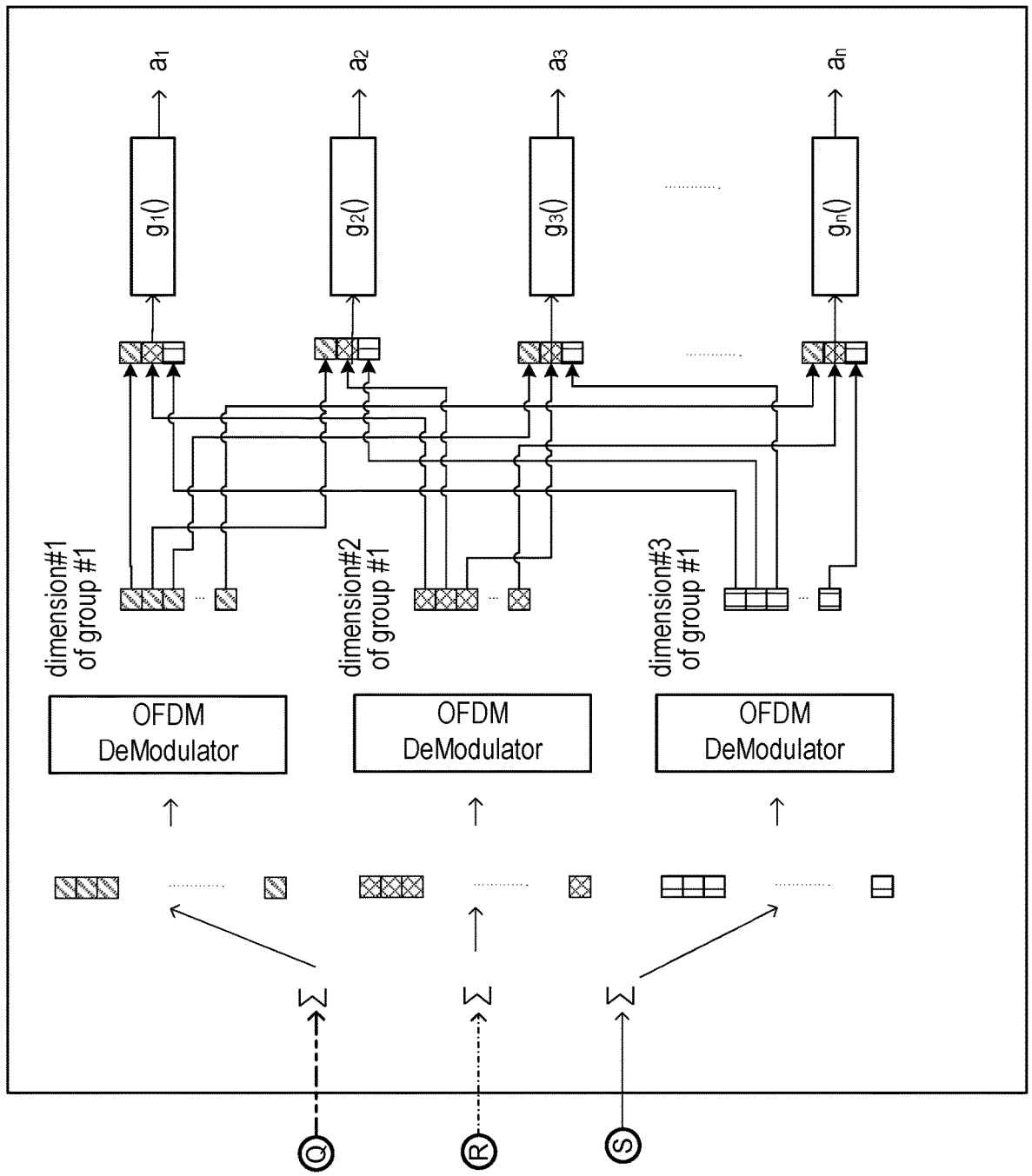
FIG. 36B is a block diagram depicting transmission by an OFDM system to reach high throughput.

Although the detailed examples have focused on one symbol, in some embodiments OFDM is used, and multiple symbols are transmitted in parallel by the OFDM system. Each symbol has its own (f, g, $w_i$, $\vec{b_i}$). In some embodiments, an encoder is used that encodes more than one symbol together to have more coding gain. The procedure is the same when two QAM symbols are treated as one "symbol". An example of an OFDM based system is shown in FIGS. 36A and 36B.

Embodiment 6—Incremental Redundancy

In this embodiment, an incremental redundancy based retransmission system and method are provided. The retransmission can be a general concept, not limited to the time domain. The "retransmission" means that the incremental information is transmitted from another independent dimension. For example, the $1^{st}$ transmission is over the 3 dimensions; and the retransmission is over the 4th dimension. Although there may be multiple retransmissions, the examples below employ one retransmission as an example. In reality, there may be three, four or even more retransmissions.

Define the maximum number of dimensions to be K. In the first transmission, the first (K−1) dimensions are used; in the $2^{nd}$ transmission (first retransmission), incremental information is transmitted over the K-th dimension. The deep neural network is almost the same as that without the retransmission except that there are two decoders (DNN): g1( ) for the first (K−1) dimensions and g2( ) for the Kth dimension that combines the K-th dimension with the previous K−1 dimensions.

The training goal is to $$(f, g1, g2, w_i, \vec{b_i})\underset{f, g1, g2, w, b}{=} \operatorname{argmin}(\gamma \cdot \|a_1 - \hat{a}_1\|^2 + (1-\gamma) \cdot \|a_2 - \hat{a}_2\|^2),$$

where γ a weight coefficient used in the receiver to weight the transmission, and (1−γ) is a weight coefficient for the second transmission. With a higher γ value, for example, 0.9, the expectation would be that most of the time the first transmission can be decoded successfully. If there are more than 2 transmissions, the sum of their weights should be 1.

After the training, the receiver will have two decoders, g1( ) and g2( ). During the 1$^{st}$ transmission, the receiver will receive the K−1 dimensional signal and input it into g1( ) to estimate the symbol a. During the re-transmission, the receiver will receive the K-th dimensional signal and combine it with the previous K−1 dimensions into a K-dimensional vector for g2( ). Training can be used to control the likelihood that the first transmission is successfully decoded. By setting the parameter γ higher, this will result in more essential information being pushed towards being included in the signal processed by g1( ).

Figure 37A:
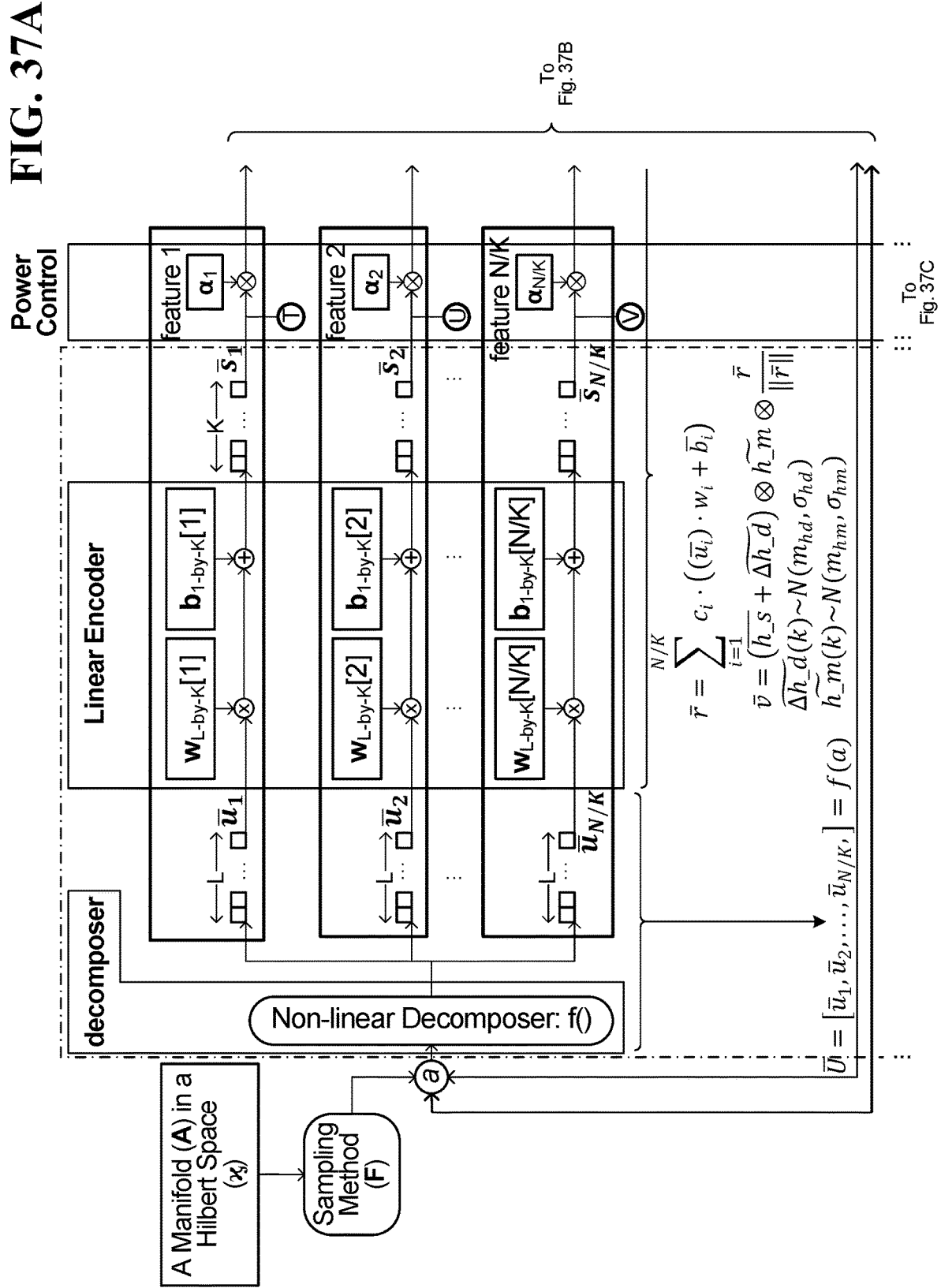
FIG. 37A is a block diagram depicting training with incremental-information retransmission.
Figure 37B:
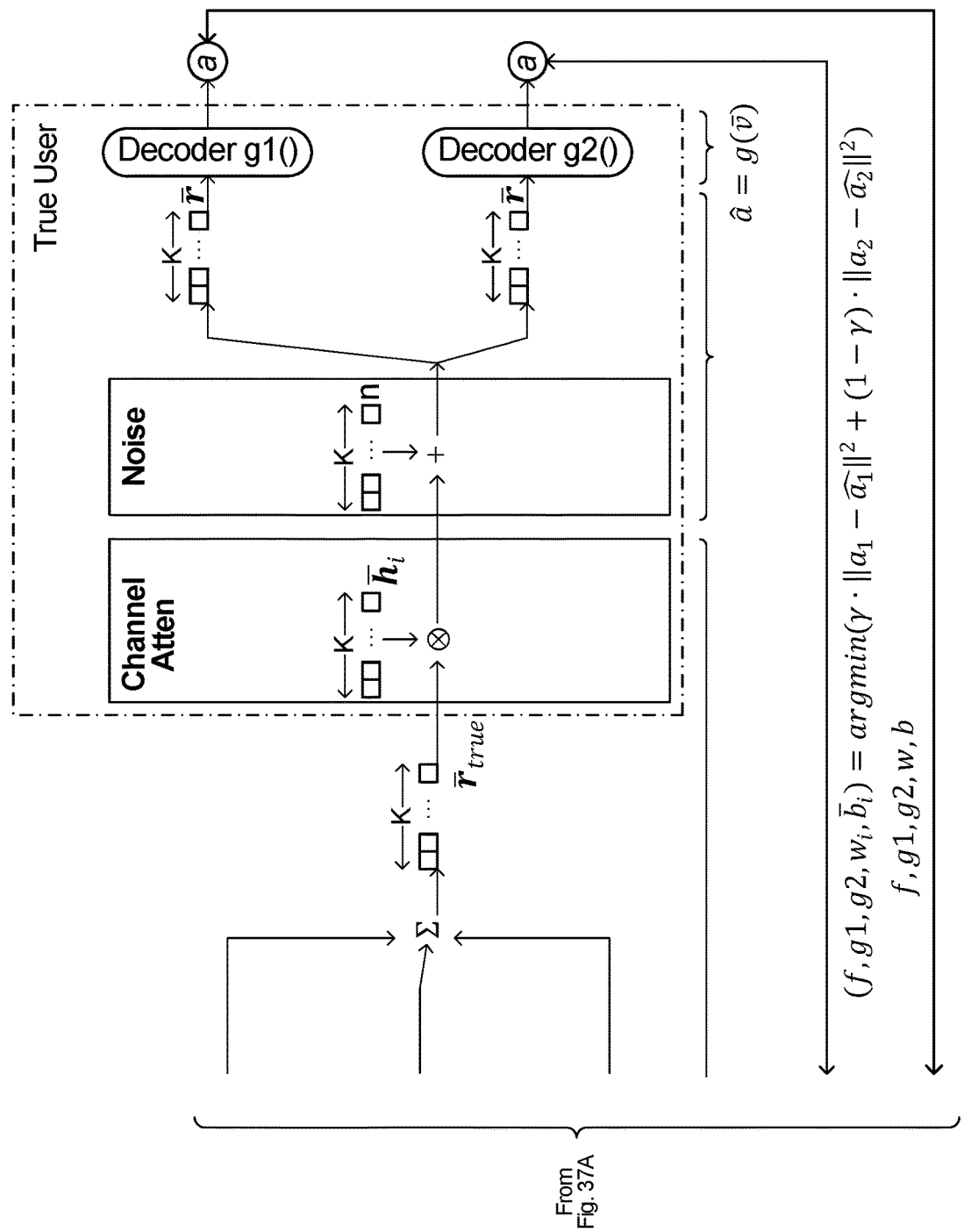
FIG. 37B is a block diagram depicting training with incremental-information retransmission.
Figure 37C:
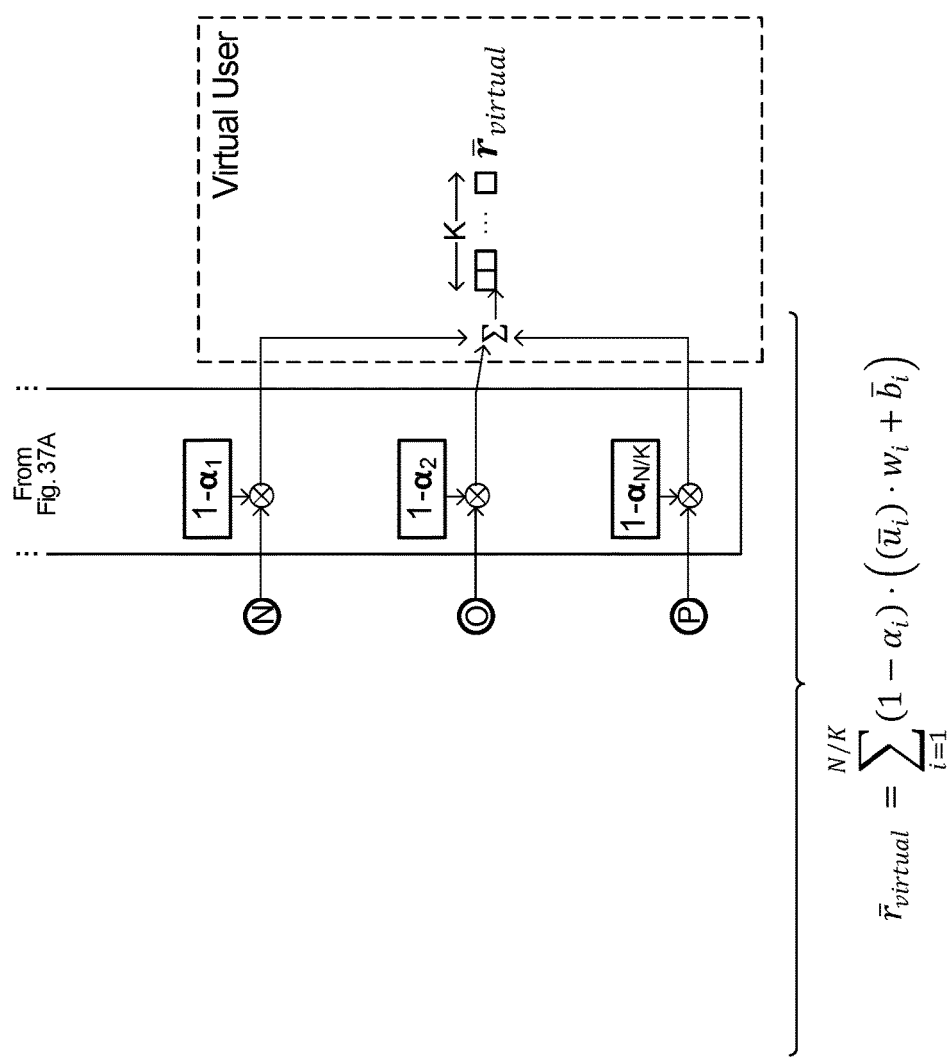
FIG. 37C is a block diagram depicting training with incremental-information retransmission.

FIGS. 37A, 37B and 37C are block diagrams depicting training with incremental-information retransmission.

Figure 38:
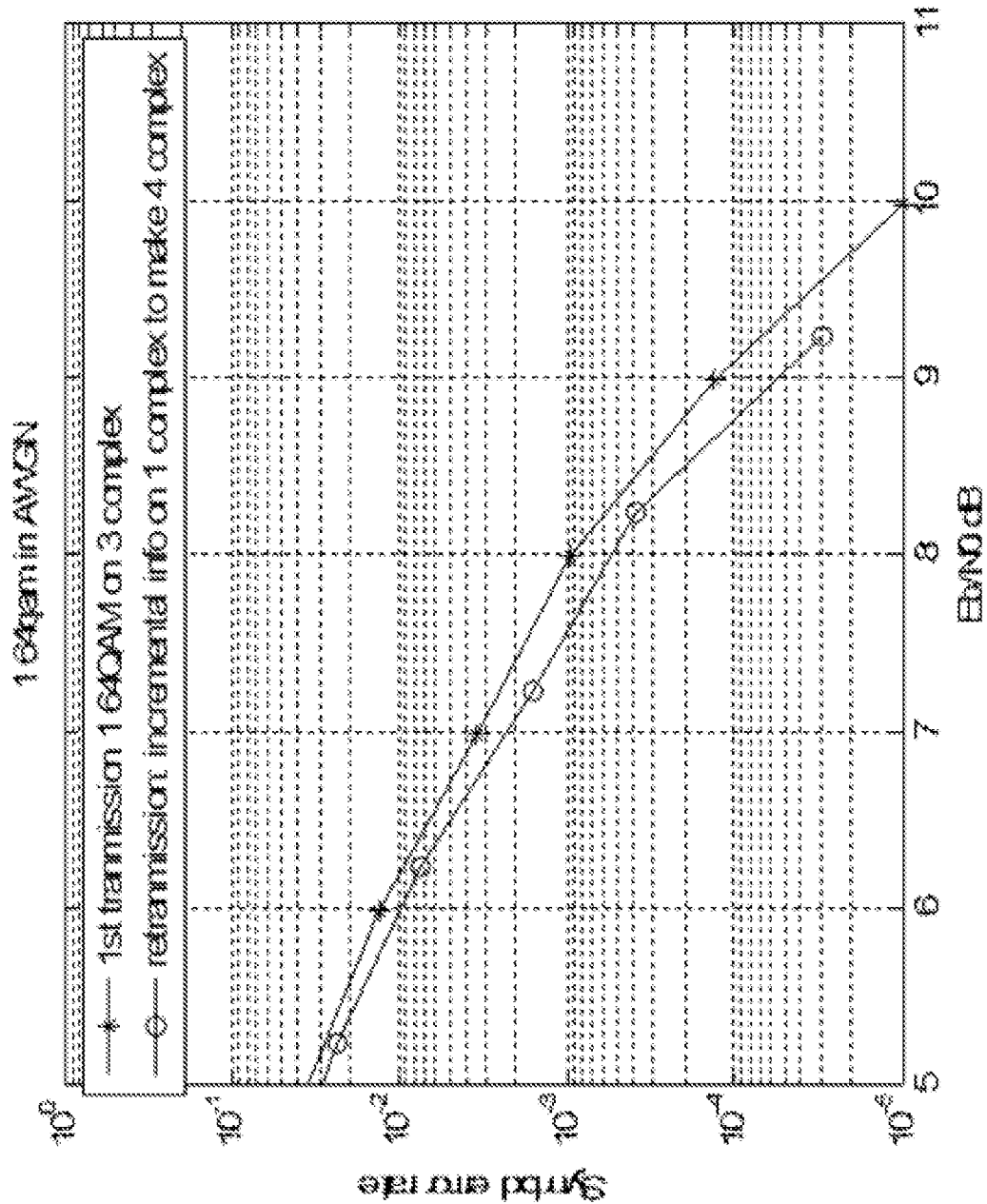
FIG. 38 is a plot showing simulations of the coding gain (Eb/No) with incremental-information retransmission.

In a specific simulation example γ=0.8 for the initial transmission, and (1−γ)=0.2 is used for a retransmission. The simulation result is shown in FIG. 38.

The result shows about 0.3 dB of coding gain from the incremental information on the 1 dimension.

Figure 39:
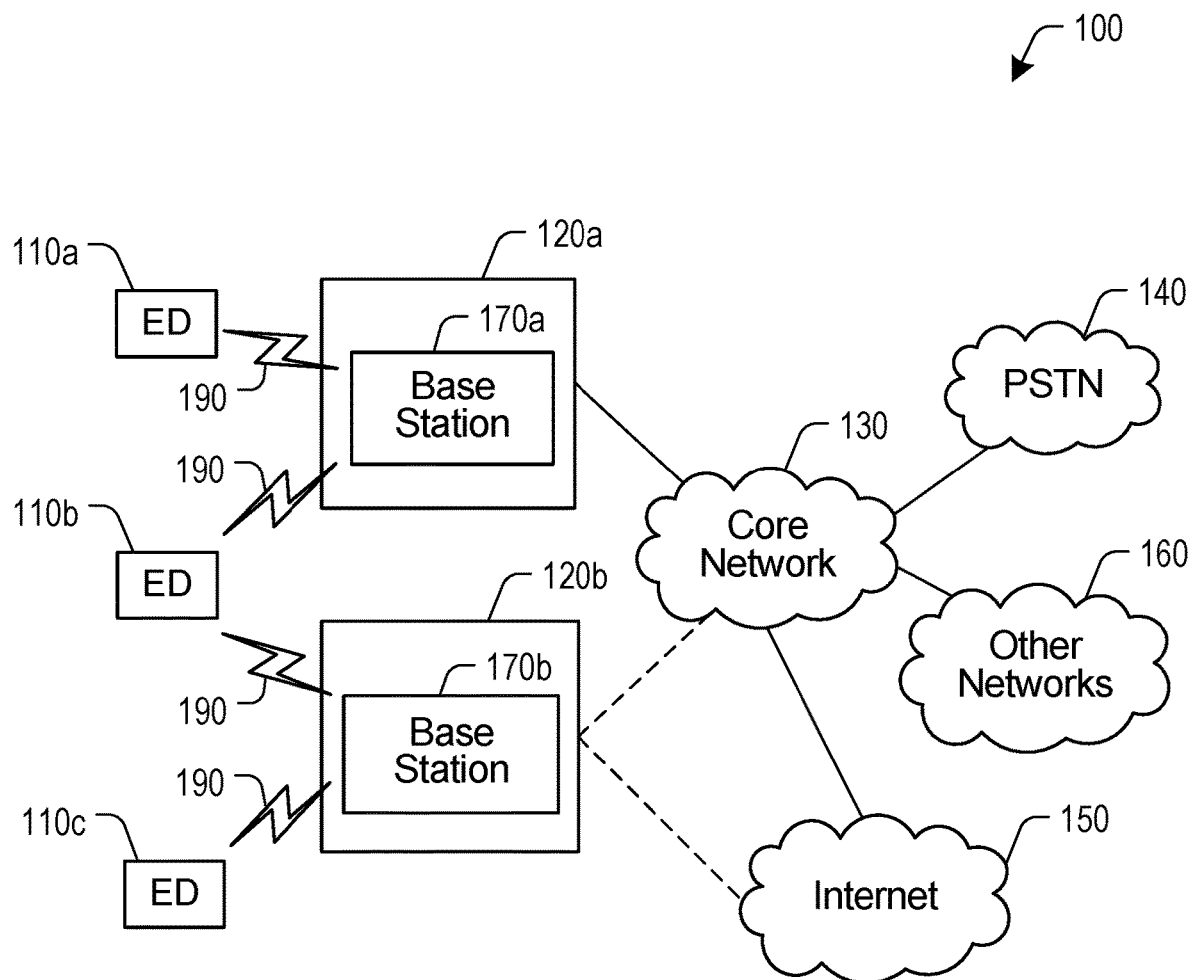
FIG. 39 shows an example of a network for implementing one or more embodiments of the disclosure.

FIG. 39 illustrates an example communication system 100 in which embodiments of the present disclosure may be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 39, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 39, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown. The detailed embodiments described herein make reference to TPs, but more generally, any type of base station can be used for any of the embodiments described herein.

The EDs 110a-110c and base stations 170a-170b are examples of communication equipment that can be configured to implement some or all of the functionality and/or embodiments described herein. In the embodiment shown in FIG. 39, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared, etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, LTE-B and/or New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 40A:
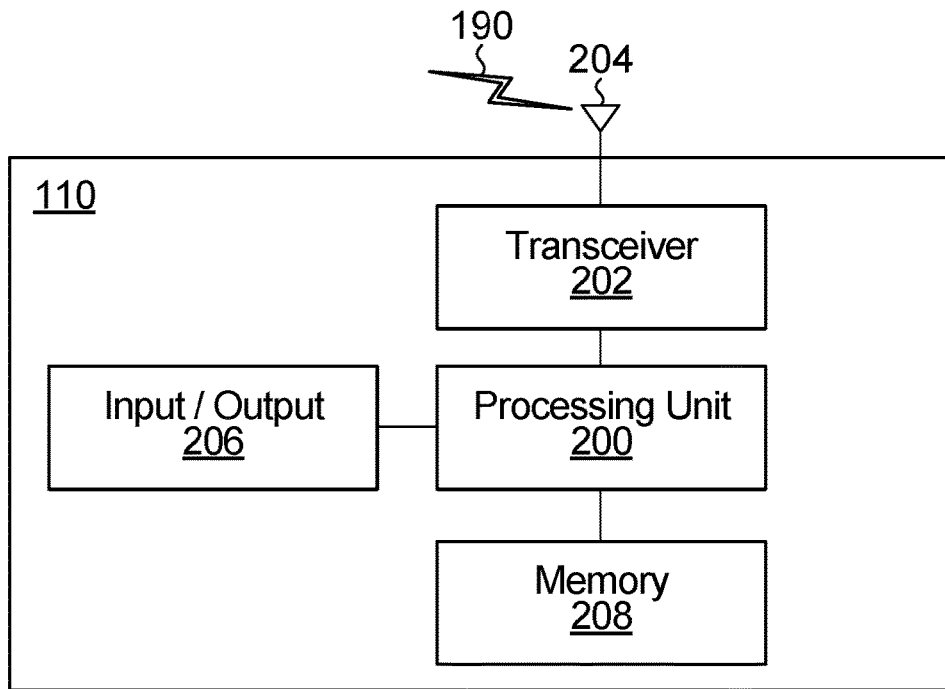
FIG. 40A is a block diagram of an example electronic device.
Figure 40B:
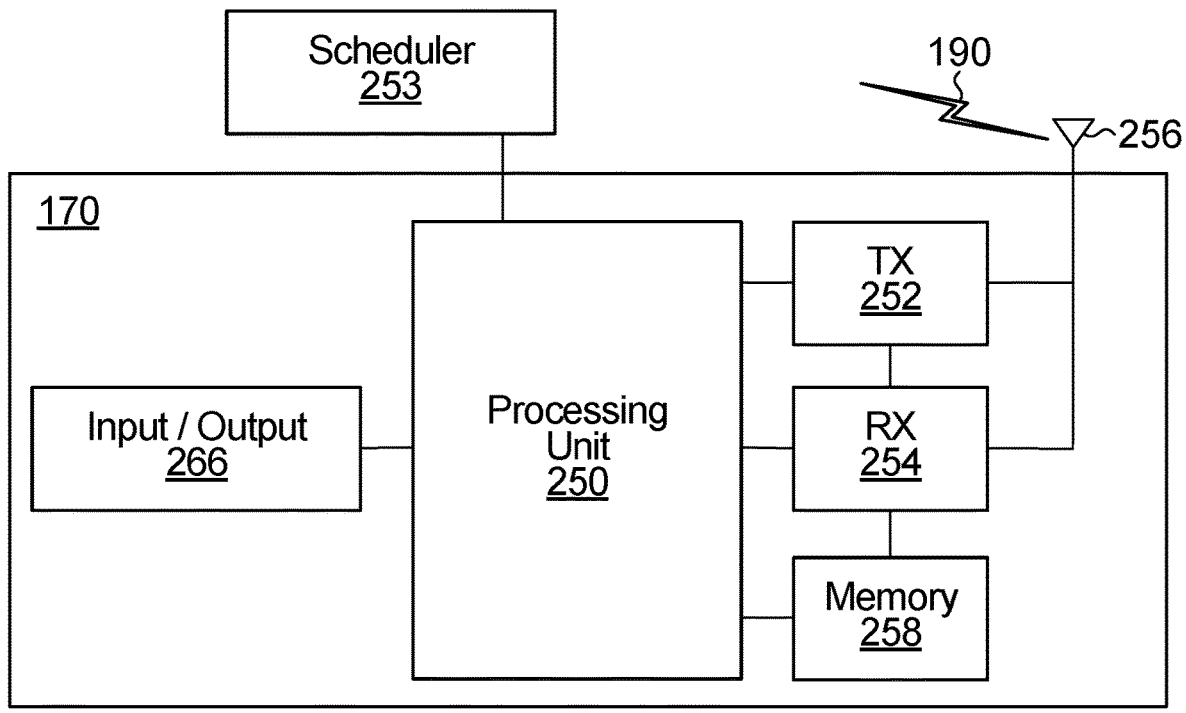
FIG. 40B is a block diagram of an example electronic device.

FIG. 40A and FIG. 40B illustrate example devices that may implement the methods and teachings according to this disclosure. In particular, FIG. 40A illustrates an example ED 110, and FIG. 40B illustrates an example base station 170. These components could be used in the communication system 100 or in any other suitable system.

As shown in FIG. 40A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 40B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity.

Numerous modifications and variations of the present disclosure are possible in light of the above teachings. It is therefore to be understood that within the scope of the appended claims, the disclosure may be practiced otherwise than as specifically described herein.

The invention claimed is:

1. A multi-beam transmission method for transmitting using an N-beam transmitter to a receiver having K receive beams, the method comprising:
   training a machine learning block and a linear encoder using gradient descent back propagation that relies on feedback from the receiver, wherein the machine learning block implements a non-linear encoder;
   for each input to be transmitted:
      using the machine learning block to process an input to produce N/K sets of L outputs;
      using the linear encoder to perform linear encoding on each set of L outputs to produce a respective set of K encoded outputs so as to produce N/K sets of K encoded outputs overall and N encoded outputs overall; and
   transmitting a transmission comprising a respective one of the N/K sets of K encoded outputs from a respective set of K beams.

2. The method of claim 1 wherein the machine learning block is a deep neural network.

3. The method of claim 1 wherein said training the linear encoder is performed for each input to be transmitted.

4. The method of claim 1 wherein:

$$\begin{cases} \vec{U} = [\vec{u}_1, \vec{u}_2, \ldots, \vec{u}_{N/K}] = f(a) \\ \vec{r} = \sum_{i=1}^{N/K} (\vec{u}_i) \cdot w_i + \vec{b}_i \\ \vec{v} = \dfrac{\vec{r}}{\|\vec{r}\|} + \vec{n} \\ \hat{a} = g(\vec{v}) \end{cases}$$

where "a" is an input to be transmitted;
$f(a)$ is a non-linear encoding operation executed by the non-linear encoder;
$\vec{U}$ = is an output of the non-linear encoding operation;
$w_i$ and $\vec{b}_i$ are parameters of the linear encoder;
$\vec{r}$ is a set of K recomposed entities produced at the output of the N-beam transmitter;
$\vec{n}$ is noise;
$g(\vec{v})$ is a non-linear decoding operation executed by a machine learning block in the receiver; and
$\vec{v}$ is an input to the non-linear decoding operation.

5. The method of claim 1 further comprising:
applying a respective weight to each of the N/K sets of K encoded outputs to produce a weighted set of K encoded outputs;
wherein transmitting a respective one of the N/K sets of K encoded outputs from each beam comprises transmitting the respective weighted set of K encoded outputs;
the method further comprising training the weights using a message passing algorithm.

6. The method of claim 1 further comprising:
driving each group of K antennas from a respective common clock tree; and
powering each group of K antennas with a respective uniform power.

7. The method of claim 1 wherein transmitting a respective one of the N/K sets of K encoded outputs from a respective set of K beams comprises:

in a first transmission, transmitting T of the respective set of K encoded outputs from T beams of the respective set of K beams, where T<K;
in a second transmission, transmitting a remaining K-T of the respective set of K encoded outputs from remaining K-T beams of respective set of K beams.

8. The method of claim 5 wherein:

$$\begin{cases} \vec{U} = [\vec{u}_1, \vec{u}_2, \ldots, \vec{u}_{N/K}] = f(a) \\ \vec{r} = \sum_{i=1}^{N/K} c_i \cdot ((\vec{u}_i) \cdot w_i + \vec{b}_i) \\ \vec{v} = \dfrac{\vec{r}}{\|\vec{r}\|} + \vec{n} \\ \hat{a} = g(\vec{v}) \end{cases}$$

where "a" is an input to be transmitted;
$f(a)$ is a non-linear encoding operation executed by the non-linear encoder;
$\vec{U}$ = is an output of the non-linear encoding operation;
$w_i$ and $\vec{b}_i$ are parameters of the linear encoder;
$\vec{r}$ is a set of K recomposed entities produced at the output of the N-beam transmitter;
$\vec{n}$ is noise;
$\vec{c} = [c_1, c_2, \ldots c_{N/K}]$ are the weights that are trained using the message passing algorithm;
$g(\vec{v})$ is a non-linear decoding operation executed by a machine learning block in the receiver; and
$\vec{v}$ is an input to the non-linear decoding operation.

9. The method of claim 5 further wherein applying a respective weight to each of the N/K sets of K encoded outputs to produce a weighted set of K encoded outputs comprises applying a respective weight $\alpha_i$ to an ith one of the N/K sets of K encoded outputs; and
determining $\alpha_i$ using a message passing algorithm so as to optimize, based on an optimization criterion, an amount of useful information in the outputs of the linear encoder that is included in the transmission compared to an amount of useful information in the outputs of the linear encoder that are included in another virtual signal calculated using weights $1-\alpha_i$.

10. The method of claim 9 further comprising:
during initial training:
fixing the weights $\alpha_i$ while training the machine learning block and the linear encoder;
treating parameters of the machine learning block and the linear encoder as constants while training weights $\alpha_i$;
following training, using message passing algorithm to update the weights for each transmission.

11. The method of claim 10 wherein during initial training fixing the weights $\alpha_i$ while training the machine learning block and the linear encoder comprises:
performing the initial training based on an estimate for channel attenuation=an estimate for static channel attenuation+a probability distribution for dynamic attenuation+a probability distribution for mismatch channel attenuation;
following training, using message passing algorithm to update the weights for each transmission comprises based on updated values for channel attenuation.

12. The method of claim 11 further comprising:
storing training results for the machine learning block and the linear encoder for each of a plurality of different parts of a coverage area of the N-beam transmitter, the training results comprising parameters for the non-linear encoding operation of the transmitter and parameters of the linear encoder of the transmitter, and parameters for a non-linear decoder located within the part of the coverage area; and
determining a location of the receiver;
wherein using the machine learning block and the linear encoder comprises using the stored training results based on the determined location of the receiver.

13. The method of claim 12 further comprising:
transmitting the parameters for the non-linear decoder for the determined location to the receiver.

14. The method of claim 13 further comprising:
based on an analysis of dynamic attenuation compared to static attenuation, determining that a value for static attenuation is not representative of the part of the coverage area:
updating the value for static attenuation to a more recent estimate of static attenuation;
retraining the non-linear encoder and the linear encoder using the more recent estimate;
if retraining did not converge, increasing a number of beams, and retraining the non-linear encoder and the linear encoder for the larger number of beams.

15. The method of claim 13 further comprising:
based on an analysis of mismatch attenuation compared to static attenuation, increasing a number and/or frequency of pilots.

16. The method of claim 15 further comprising:
based on a further analysis of mismatch attenuation compared to static attenuation after increasing the number and/or frequency pilots, determining more beams:
increasing a number of beams; and
retraining the non-linear encoder and the linear encoder for the larger number of beams.

17. An apparatus for transmitting to a receiver having K receive beams, the apparatus comprising:
a processor and memory;
wherein the processor and memory implement a machine learning block with a non-linear encoder and implement a linear encoder;
wherein the processor and memory are configured to:
train the machine learning block and the linear encoder using gradient descent back propagation that relies on feedback from the receiver;
for each input to be transmitted:
use the machine learning block to process an input to produce N/K sets of L outputs; and
use the linear encoder to perform linear encoding on each set of L outputs to produce a respective set of K encoded outputs so as to produce N/K sets of K encoded outputs overall and N encoded outputs overall;
the apparatus further comprising an N-beam transmitter for transmitting a transmission comprising a respective one of the N/K sets of K encoded outputs from a respective set of K beams.

18. The apparatus of claim 17 further configured to:
apply a respective weight to each of the N/K sets of K encoded outputs to produce a weighted set of K encoded outputs;
wherein transmitting a respective one of the N/K sets of K encoded outputs from each beam comprises transmitting the respective weighted set of K encoded outputs;
the apparatus further configured to train the weights using a message passing algorithm.

19. The apparatus of claim 17 further configured to:
drive each group of K antennas from a respective common clock tree; and
power each group of K antennas with a respective uniform power.

20. The apparatus of claim 17 configured to transmit a respective one of the N/K sets of K encoded outputs from a respective set of K beams by:
in a first transmission, transmitting T of the respective set of K encoded outputs from T beams of the respective set of K beams, where T<K;
in a second transmission, transmitting a remaining K-T of the respective set of K encoded outputs from remaining K-T beams of respective set of K beams.

21. The apparatus of claim 18 configured to apply a respective weight to each of the N/K sets of K encoded outputs to produce a weighted set of K encoded outputs by:
applying a respective weight $\alpha_i$ to an ith one of the N/K sets of K encoded outputs; and
determining $\alpha_i$ using a message passing algorithm so as to optimize, based on an optimization criterion, an amount of useful information in the outputs of the linear encoder that is included in the transmission compared to an amount of useful information in the outputs of the linear encoder that are included in another virtual signal calculated using weights $1-\alpha_i$.

* * * * *